(12) United States Patent  (10) Patent No.: US 7,578,615 B2
Ahmad et al.  (45) Date of Patent: Aug. 25, 2009

(54) METHOD AND SYSTEM FOR DETERMINING WIND CHILL TEMPERATURE

(76) Inventors: Rashid A. Ahmad, 975 W. 885 South, Brigham City, UT (US) 84302; Stanton Boraas, 48493 N. Terry Rd., Talmoon, MN (US) 56637

( * ) Notice: Subject to any disclaimer, the term of this patent is extended or adjusted under 35 U.S.C. 154(b) by 0 days.

(21) Appl. No.: 12/291,787

(22) Filed: Nov. 12, 2008

(65) Prior Publication Data

US 2009/0076764 A1    Mar. 19, 2009

Related U.S. Application Data

(62) Division of application No. 11/481,684, filed on Jul. 6, 2006, now Pat. No. 7,481,576.

(51) Int. Cl.
  *G01K 3/00* (2006.01)
  *G01K 17/00* (2006.01)
(52) U.S. Cl. .......... 374/109; 374/43; 374/29; 703/2; 702/131; 600/549
(58) Field of Classification Search ............. 374/100, 374/109–112, 121, 126, 137, 20–30, 43; 73/170.1, 170.12, 170.16; 702/131; 703/2, 703/3; 600/474, 549

See application file for complete search history.

(56) References Cited

U.S. PATENT DOCUMENTS

| 3,753,371 | A | * | 8/1973 | Anderson | 374/109 |
| 3,954,007 | A | * | 5/1976 | Harrigan | 374/109 |
| 4,047,431 | A | * | 9/1977 | Mulvaney et al. | 374/109 |
| 4,106,339 | A | * | 8/1978 | Baer | 374/109 |
| 4,261,201 | A | * | 4/1981 | Howard | 374/109 |
| 4,504,157 | A | * | 3/1985 | Crabtree et al. | 374/109 |
| 7,239,974 | B2 | * | 7/2007 | Gulati | 702/131 |
| 2006/0193369 | A1 | * | 8/2006 | O'Neill et al. | 374/109 |

* cited by examiner

*Primary Examiner*—Gail Verbitsky
(74) *Attorney, Agent, or Firm*—Morriss O'Bryant Compagni

(57) ABSTRACT

The present invention includes methods, systems and computer-readable media for more accurately determining wind chill temperature, $T_{wc}$, equivalent temperature, $T_{eq}$, time to freeze, $t_f$, facial temperature, $T_f^{m+\Delta t}$, as a function of time and the altitude correction factor, $\Delta t_s/1000$. The wind chill model of the present invention accounts for the two major heat losses (forced convection, radiation) and a minor heat loss (evaporative cooling) from the facial surface and is also capable of accounting for the two major heat gains (metabolic, solar) at the facial surface due to the individual's physical activity and the presence of sunshine. The wind chill model of the present invention also provides a more accurate value for the wind velocity at head level.

9 Claims, 30 Drawing Sheets

METHOD AND SYSTEM FOR DETERMINING WIND CHILL TEMPERATURE

CROSS-REFERENCE TO RELATED APPLICATIONS

This is a divisional patent application of U.S. nonprovisional patent application Ser. No. 11/481,684, filed Jul. 6, 2006, now U.S. Pat. No. 7,481,576 titled: "METHOD AND SYSTEM FOR DETERMINING WIND CHILL TEMPERATURE", the contents of which are herein incorporated by reference for all purposes.

BACKGROUND OF THE INVENTION

1. Field of the Invention

The invention relates generally to methods and systems for determining wind chill temperature. More specifically, the invention includes methods and systems for determining the wind chill temperature and the time to freeze for the facial temperature.

2. Description of Related Art

The sensation upon exposed skin that the ambient temperature in the presence of wind feels colder than the actual measured temperature is often referred to as the wind chill temperature. The concept of "wind chill" was first proposed by Siple, P. A., and C. F. Passel, "Measurements of dry atmospheric cooling in subfreezing temperatures", *Proc. Amer. Phil. Soc.*, Vol. 89, No. 1, pp. 177-199, 1945. The Siple and Passel experiments and model have been criticized by investigators as being primitive, flawed and lacking a theoretical basis. However, the Siple and Passel experiments yielded results that have proven useful for six decades. One criticism of the Siple and Passel model is that it incorrectly assumes a constant skin temperature of 33° C. (91.4° F.) during the entire time of skin exposure. This assumption was known to result in predicted values of the wind chill temperatures that would be colder than the actual values.

Despite this criticism, Osczevski, R. J., "The basis of wind chill", *Arctic.*, Vol. 48, No. 4, pp. 372-382, 1995, gave credence to these predictions when he stated that the test cylinder used by Siple and Passel was nearly the perfect size to represent the human head. This may explain, at least partially, why these predictions have served so well over the intervening years.

Wind chill temperature is an actual temperature that it is not restricted to the winter season. The wind chill temperature sensed by an individual on a windy, cold winter day is, conceptually, no different than that which he senses in front of an electric fan on a hot summer day. From a health or safety standpoint, the wind chill temperature sensed in the winter is the one which causes concern. The reason for this is the subjective nature of this temperature, i.e., the temperature sensed by one person may be quite different from that sensed by another. This is believed to be especially true at very low temperatures where a noticeable difference between the actual and perceived temperatures may be quite difficult.

Individual differences in sensing these low temperatures have led to proposed solutions on how the subjective nature of this temperature could be minimized. Suggestions have been made that the wind chill temperature should be replaced with categories such as "cold", "very cold" and "extremely cold" or combining it with the heat index to come up with comfort index categories ranging from "minus to plus 10". However, these approaches are also very subjective. Fortunately, neither of these proposed solutions has prevailed.

The subjective nature of the wind chill temperature has led to suggestions that it should be combined with clothing distributions to define a comfort level to which an individual can more easily relate. Because the comfort level is determined by the warmer temperatures sensed by the clothed surface of the body, this approach could mask a potentially dangerous situation. This could occur if the individual feels so comfortable, as a result of being adequately dressed, that he is unaware that his face may be subjected to the most imminent hazard of extended exposure, i.e., frostbite.

A more recent development is the wind chill model disclosed in Bluestein, M. and Zecher, J., "A new approach to an accurate wind chill factor", *Bull. Amer. Meteor. Soc.*, Vol. 80, No. 9, pp. 1893-1899, 1999. The National Oceanic & Atmospheric Administration's National Weather Service adopted the Bluestein and Zecher wind chill model on Nov. 1, 2001. Developed as an analytical counterpart to the Siple and Passel experiment, the Bluestein and Zecher model corrected for the constant skin temperature assumption by allowing it to vary, i.e., decrease with increasing exposure time. This was expected to give correct wind chill temperatures that were warmer than the Siple and Passel values. In addition, Bluestein and Zecher used a wind speed reduction at head level based upon the assumption that the free-stream velocity is always 50% greater. With this assumption and the skin temperature correction, the Bluestein and Zecher model does indeed predict wind chill temperatures that are as much as 15° F. (8.33° C.) warmer than the corresponding Siple and Passel values. However, a close examination of the Bluestein and Zecher results shows that essentially all of this warming is due to the wind reduction at head level with, at most, 2° F. (1.1° C.) being due to the varying skin temperature. At very low temperatures and high velocities the Bluestein and Zecher results show no moderation whatsoever. Instead of a moderation, their wind chill temperatures are approximately 1° F. (0.56° C.) colder than the Siple and Passel values. This result calls into question the accuracy of the Bluestein and Zecher model. Unfortunately, the Bluestein and Zecher model assumes that the free-stream velocity is always 50% greater than that at head level. Boundary layer calculations for all individuals in real life situations show that this 33% reduction in the velocity at head level is a unique condition which will almost never exist; in fact analyses will show that in all instances the reduction will be at or near zero. Without this incorrect velocity reduction, Bluestein and Zecher's results are actually no different than those of Siple and Passel.

Various devices have been proposed for determining wind chill temperature using the conventional methods disclosed by Siple and Passel, Bluestein and Zecher and others. Such conventional wind chill temperature devices are disclosed in U.S. Pat. No. 3,753,371 to Anderson, U.S. Pat. No. 3,954,007 to Harrigan, U.S. Pat. No. 4,047,431 to Mulvaney et al., U.S. Pat. No. 4,106,339 to Baer, U.S. Pat. No. 4,261,201 to Howard and PCT Patent Application No. WO 81/00462 to Howard. Generally, these devices are based on measurements of air temperature and wind speed only. Moreover, none of these conventional devices appears to correct for the above-noted errors in the prior art methods. Furthermore, the inventors are not aware of any methods or systems that account for other important factors such as altitude, insolation, and metabolic heat generation.

For the above reasons, it would be highly advantageous to provide a more accurate and complete wind chill model. It would also be advantageous to provide a system and method for wind chill determination based on a more accurate and complete wind chill model.

SUMMARY OF THE INVENTION

The present invention includes methods for more accurately determining wind chill temperature, $T_{wc}$, equivalent temperature, $T_{eq}$, time to freeze, $t_f$, facial temperature, $T_f^{m+\Delta t}$, as a function of time and the altitude correction factor, $\Delta t_f/1000$. Methods for determining a wind reduction factor, WRF, are also disclosed.

Embodiments of computer-readable media storing computer-executable instructions for performing the various methods of the present invention are also disclosed.

A system for implementing one or more of the methods of determining wind chill temperature, $T_{wc}$, equivalent temperature, $T_{eq}$, time to freeze, $t_f$, facial temperature, $T_f^{m+\Delta t}$, as a function of time and the altitude correction factor, $\Delta t_f/1000$, according to the present invention is also disclosed.

Additional features and advantages of the invention will be set forth in the description which follows, and in part will be apparent from the description, or may be learned by the practice of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1A:
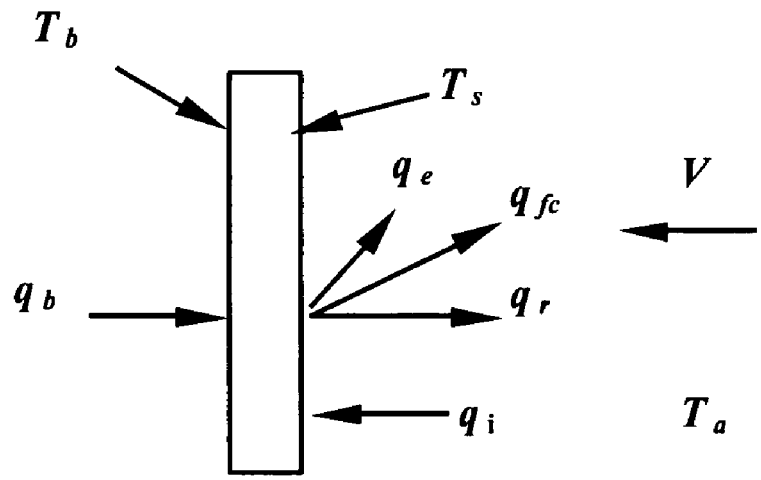
FIG. 1A is a diagram of a two-dimensional segment used in the determination of the equivalent temperature ($T_{eq}$), heat losses and gains on the segment, according to the present invention.

The wind chill model disclosed herein is confined to the facial surface since the face of even a properly dressed individual will most likely be uncovered. Furthermore, the individual senses the wind chill temperature by way of the sensory nerves located within the intermediate skin layer (dermis) of the exposed facial surface and not from the surface of the clothed body. The wind chill model disclosed herein consists of an equation for the wind chill temperature and a second equation called the time to freeze. The latter defines the length of the exposure time at the wind chill temperature when facial freezing occurs. The time to freeze feature eliminates much of the controversy associated with wind chill by reducing the subjective nature of the wind chill temperature and at the same time provide a warning to the individual of a safe exposure time.

The wind chill model disclosed herein may be viewed as a complete model in that it is not restricted to the two major heat losses (forced convection, radiation) from the facial surface but is also capable of accounting for the two major heat gains (metabolic, solar) at the surface due to the individual's physical activity and the presence of sunshine. A lesser heat loss (evaporation) resulting from the physical activity is also included. The model incorporates two changes in the forced convection heat loss expression. One aspect of wind chill that has escaped attention in the prior art is the dependency of this heat loss on the ambient pressure and consequently altitude. The reason for this may have been due to both oversight and the belief that the effect of pressure was negligible. However, such is not the case and the present model shows that this effect can be quite significant. Since altitude, rather than ambient pressure, will generally be the known quantity in wind chill calculations, the forced convection term was expressed in terms of altitude. The second change involves defining an accurate value for the wind velocity at head level. Bluestein and Zecher correctly noted that this velocity might be less than that at the NWS 10 m level, but incorrectly used a value that is referred to in this model as the wind reduction factor (WRF). Their value of WRF was 0.33 based upon the velocity profile acquired in a test by Steadman (1971). This WRF reflects their assumption that the NWS 10 m velocity would always be 50% greater than the velocity at head level. Bluestein and Zecher made the error of assuming the boundary layer profile at the Steadman test site as being the same for all individuals at all times irrespective of their location. Clearly, this is not so since the wind-generated boundary layer adjacent to an individual is dependent upon individual's distance from the nearest wind obstruction. The wind chill model of the present invention, which provides a procedure for determining the WRF for each specific case, uses the WRF as a multiple of the NWS 10 m velocity value in the forced convection heat loss term.

This model, which has been validated experimentally, is believed to provide the most accurate prediction of the wind chill temperature and the only means of predicting the corresponding time to freeze. It is applicable to all individuals engaged in a wide range of physical activity in either the presence or absence of sunshine. Finally, the model is adaptable over a wide range of ambient temperatures, wind velocities, altitudes, and geographical locations worldwide.

Development of the Model Equations: The model consists of two analytically derived equations, one for the wind chill temperature, and one for the time to freeze. Each of these equations was derived from a previous equation. Because wind chill is not restricted to humans but applies to inanimate objects as well, the wind chill temperature equation was obtained from its basic counterpart, the equivalent temperature for objects. The time to freeze equation is a curve fit of extensive results from a time dependant facial temperature equation in which facial freezing times were determined over a wide range of ambient conditions. The equations are described below in the order in which they were developed.

Figure 1B:
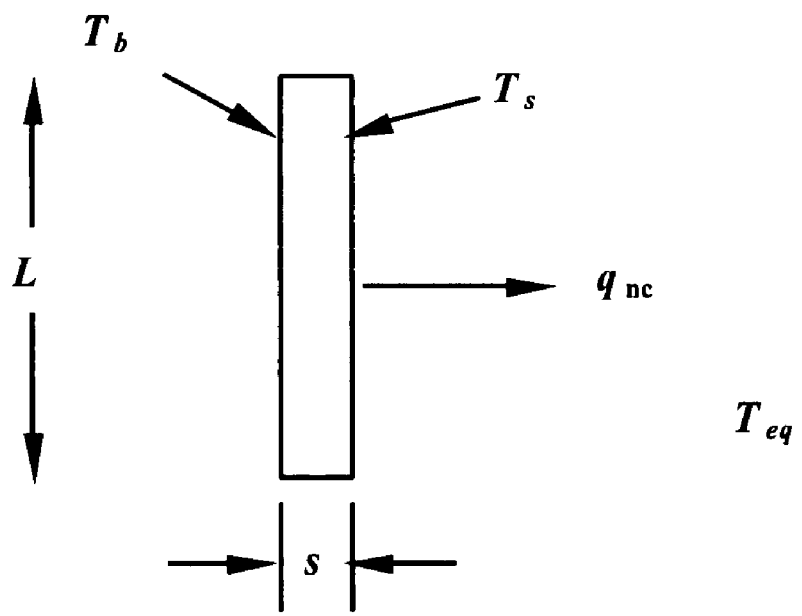
FIG. 1B is a diagram of the two-dimensional segment shown in FIG. 1A illustrating equivalent heat loss ($q_{nc}$) on the segment when V=0, according to the present invention.

Equivalent Temperature Equation: To really understand the meaning and significance of the equivalent temperature and appreciate the scope of its application, its expression was derived analytically. This was done through the use of the two-dimensional surface segment as shown in FIGS. 1A-B. In FIG. 1A, the right side of the segment is exposed to a wind velocity V and an ambient temperature $T_a$ which is presumed to be less than the right surface temperature $T_s$. This wind results in a forced convection heat loss ($q_{fc}$) from the segment. If this same heat loss was assumed to exist in the absence of the wind, the right surface would be "sensing" a temperature less than $T_a$. This sensed temperature is by definition the equivalent temperature ($T_{eq}$) in its most basic form. But since $T_s > T_a$, there is also a radiation heat loss ($q_r$) and possibly evaporation heat loss ($q_e$) from the surface. These two heat losses augment the forced convection heat loss so as to decrease the $T_{eq}$. However, the right side being exposed to the ambient temperature $T_a$ may also receive heat due to solar radiation or insolation ($q_i$). In the case where the left surface temperature $T_b > T_a$, the right surface will also receive heat ($q_b$) due to conduction through the segment. Both of these heat gains ($q_i$, $q_b$) have a moderating effect on $T_{eq}$ and will tend to increase its value.

FIG. 1B shows the summation of all these heat losses and gains into one natural convection heat loss ($q_{nc}$) when V=0. From the temperature difference ($T_s - T_{eq}$) that results in this natural convection heat loss, one can determine $T_{eq}$. This was the procedure used in the development of this model. It is described in the following paragraphs:

The forced convection heat loss, $q_{fc}$, may be expressed as:

$$q_{fc} = h_{fc}(T_s - T_a) \quad (1)$$

Where $h_{fc}$ is forced convection heat transfer coefficient and the radiation heat loss, $q_r$, is:

$$q_r = \epsilon \sigma (T_s^4 - T_a^4) \quad (2)$$

where $\epsilon$ is the emissivity of the surface and $\sigma$ is the Stefan-Boltzmann constant. The evaporation heat loss, $q_e$, for a wetted surface is:

$$q_e = \dot{w} l_e \quad (3)$$

where $\dot{w}$ is the water evaporation flux rate and $l_e$ is the latent heat of evaporation of the wetting liquid. The heat addition due to insolation, $q_i$, is:

$$q_i = \alpha G \quad (4)$$

where $\alpha$ is the thermal absorptivity of the surface and G is the local insolation value. The heat addition due to conduction into the segment, $q_b$, is:

$$q_b = \frac{k}{s}(T_b - T_s) \quad (5)$$

where k and s are the thermal conductivity and total thickness, respectively, of the segment. The natural convection heat loss, $q_{nc}$, in the absence of velocity is equal to the sum of all the heat losses and gains as shown in FIG. 1A and is:

$$q_{nc} = q_{fc} + q_r + q_e - q_i - q_b \quad (6)$$

which can now be expressed as follows in terms of the previously defined equivalent temperature ($T_{eq}$):

$$q_{nc} = h_{nc}(T_s - T_{eq}) \quad (7)$$

The natural convection heat transfer coefficient ($h_{nc}$) disclosed in Jakob, M. and Hawkins, G. A., *Elements of Heat Transfer and Insulation*, John Wily & Sons, p. 107, 1954, can be expressed as:

$$h_{nc} = C_1 \left(\frac{T_s - T_{eq}}{L}\right)^\phi \quad (8a)$$

where the exponent $\phi=0.25$ for a heated vertical plane or cylindrical surface and where the sole source of heat is within the surface itself. In instances where additional heat is being conducted through the surface, from inside to outside, $\phi$ is expected to take on other values. The coefficient $C_1$ is a function of air density, thermal conductivity, specific heat, dynamic viscosity and the coefficient of thermal expansion and where L is the length of the segment. The air density ($\rho$), dynamic viscosity ($\mu$), specific heat ($C_p$) and thermal conductivity (k) are calculated at the film temperature ($T_{film}$) which is defined as the average of the surface and air temperatures, that is $T_{film}=(T_s+T_a)/2$. The expression for $C_1$ as disclosed in Chapman, A. J. *Heat Transfer*, 3rd ed., Macmillan, p. 384, 1974, is:

$$C_1 = 0.59k\left(\frac{g\beta\rho^2 C_p}{\mu k}\right)^{0.25} \quad (8b)$$

where g is the gravitational constant and the coefficient of thermal expansion ($\beta$) of the air is $\beta=(T_{film})^{-1}$. Values of $C_1$ were calculated over a wide range of ambient temperatures ($-291.4°$ F.$\leq T_a \leq 108.6°$ F. ($-179.67°$ C.$\leq T_a \leq 42.56°$ C.)) plotted as a function of the film temperature expressed in terms of the surface and ambient temperature ($T_s$, $T_a$) and then curve fitted using TableCurve 2D™ to obtain the following expression:

$$C_1 = 0.3268 - 9.5500 \times 10^{-5}(T_s + T_a) \quad (8c)$$

and where the correlation coefficient $r^2=0.9953$. TableCurve 2D™ is available from Systat Software, Inc., 501 Canal Blvd, Suite E, Point Richmond, Calif.

Substituting Eqs. (1), (2), (3), (4), (5), (7), and (8a) into Eq. (6), and solving for the equivalent temperature, $T_{eq}$, gives:

$$T_{eq} = T_s - \left\{\frac{L^\phi}{C_1}\left[\frac{h_{fc}(T_s - T_a) + \varepsilon\sigma(T_s^4 - T_a^4) +}{\dot{w}l_e - \alpha G - \frac{k}{s}(T_b - T_s)}\right]\right\}^{1/(1+\phi)} \quad (9)$$

where $C_1$ is calculated from Eq. (8c). Equation (9) is the most basic equation for the equivalent temperature of a planar surface. The conductive, insolative and radiative heat transfer quantities (k, s, $\alpha$ and $\varepsilon$) in the equation depend upon the material properties of the surface while the forced convective heat transfer coefficient ($h_{fc}$) does not. Therefore, by substituting an expression for $h_{fc}$ into this equation, it can be made applicable to all two-dimensional surfaces. This was done by selecting convective heat transfer coefficients for a flat surface segment disclosed in Harms et al., *Aerodynamic Heating of High-Speed Aircraft*, Bell Aerosystems Company, Report No. 7006-3352-001, Vol. 1, pp. 14-16, 1959. Harms et al. expresses the incompressible form of the forced convection coefficient ($h_{fc}$) in terms of the Nusselt (Nu), Reynolds (Re), and molecular Prandtl (Pr) numbers. The forms are:

$$Nu = h_{fc}\frac{x}{k} = 0.332(Re_x)^{0.5}(Pr)^{0.33} \quad (10a)$$

for laminar flow, and $$Nu = h_{fc}\frac{x}{k} = 0.0296(Re_x)^{0.8}(Pr)^{0.33} \quad (10b)$$

for turbulent flow, where the characteristic length (x) in the Re number is the length L of the segment. Because the surface temperature of the segment may differ from the free-stream temperature and because of the absence of a pressure gradient within the surface boundary layer, the density varies across the layer and the flow is considered compressible. A solution for the compressible laminar boundary layer is disclosed in Crocco, L., *The laminar boundary layer in gases*, Translation, North American Aviation, Aerophysics Laboratory, AL-684, 1948, while van Driest, E. R., "Turbulent boundary layer in compressible fluids," *J. of Aero. Sciences*, Vol. 18, pp. 145-160, 1951, discloses a similar solution for a turbulent boundary layer. Harms et al. describes and uses a successful correlation of the Crocco and van Driest results by evaluating all of the transport and fluid properties in Eqs. (10a) and (10b) in terms of the following reference temperature, $T^l$, as suggested in Eckert, E. R. G. *Survey on heat transmission at high speeds*, USAF Wright Patterson, WADC TR 54-70, 1954:

$$T^l = 0.5(T_s + T_a) + 0.22\left(\frac{\gamma-1}{2}\right)M^2 T_a \quad (10c)$$

In Eq (10c), the first term on the right side represents a static temperature component and the second term is a recovery temperature or a dynamic temperature component expressed as a function of the Mach number (M). By using $T^l$ as the reference temperature, the resulting forced convection heat transfer coefficients for laminar flow ($h_{fc,l}$) and turbulent flow ($h_{fc,t}$) are applicable to all velocities (V) and all surface temperatures ($T_s$). For wind chill calculations, where generally M<0.1, the dynamic term in $T^l$ can be neglected. Thus, it is possible to reduce Eqs. (10a) and (10b) to the following forms of the forced convection coefficient:

$$h_{fc,l,s} = \frac{0.00963(PV)^{0.5}}{[0.5(T_s + T_a)]^{0.04} L^{0.5}} \quad (11a)$$

for the laminar flow along the segment, and $$h_{fc,t,s} = \frac{0.0334(PV)^{0.8}}{[0.5(T_s + T_a)]^{0.576} L^{0.2}} \quad (11b)$$

for turbulent flow. In these equations P is the ambient pressure, and the ambient ($T_a$) and surface temperatures ($T_s$) are both expressed in ° F. absolute (or ° R). In this form, values of $h_{fc}$ can be readily expressed in terms of the variables P, V, $T_a$, and $T_s$, which are primary variables in this study.

Flow along a portion or possibly the entire length of the segment will be laminar. Substitution of the laminar forced convection coefficient in Eq. (11a) into Eq. (9) gives $$T_{eq} = T_s - \left\{ \frac{L^\phi}{C_1} \left[ \frac{\frac{0.00963(PV)^{0.5}}{[0.5(T_s + T_a)]^{0.04} L^{0.5}} (T_s - T_a) +}{\varepsilon\sigma(T_s^4 - T_a^4) + \dot{w} l_e - \alpha G - \frac{k}{s}(T_b - T_s)} \right] \right\}^{1/(1+\phi)} \quad (12)$$

which is a detailed expression for the equivalent temperature, $T_{eq}$. If the surface flow had been turbulent, substitution of Eq. (11b) into Eq. (9) would have resulted in a similar equation for $T_{eq}$. In either case, it is obvious that an inanimate object cannot "sense" the chilling effect represented by this equivalent temperature. This temperature is not a fictitious temperature but an actual temperature encountered by the object in a cooling environment. Consequently, Eq. (12) becomes useful in determining not only the magnitude of this cooling but also providing guidelines as to what human actions might be taken in certain situations to minimize the cooling. Such is the situation as described in the following paragraphs along with two additional and potentially useful applications of Eq. (12), one of which may already exist.

Consider a motor vehicle that must be parked outdoors overnight in a cold winter environment. The owner is fully aware of the added difficulty of starting a very cold engine the following morning, and therefore is likely to take some action to minimize the overnight cooling of the engine. In doing so, he is attempting to "maximize the engine's $T_{eq}$". His first action is likely to be a covering of the engine, whereby any wind-generated forced convection heat loss in Eq. (12) is eliminated and the radiation heat loss is reduced if not completely eliminated. An alternative to covering the engine, but not as effective, would be the parking of the vehicle on the leeward side of a wind obstruction. In this instance, the convective heat loss would be reduced if not completely eliminated and the radiation heat loss would remain unchanged. As far as the other terms in Eq. (12) are concerned, the evaporation ($\dot{w} l_e$) and solar radiation ($\alpha G$) terms will play no part, but the conductive heat term $(k/s)(T_b - T_s)$ will. It can be viewed as residual engine heat remaining from the previous day's operation, which will partly counteract the heat losses due to forced convection and radiation, and thus aid in the subsequent starting of the engine. In this case where a conduction of heat takes place from the engine's interior to its surface, the actual value of $\phi$ is neither known nor easily determined. However, an estimate of the $T_{eq}$ could be made by assuming $\phi=0.25$ and solving for $T_{eq}$ from Eq. (12). Individuals experienced in winter living in the northern US latitudes can testify to the validity of these actions as it pertains to vehicle operation.

The above paragraph clearly shows an application of the equivalent temperature in Eq. (12) to a stationary vehicle. But Eq. (12) would also apply if in its development the segment in FIG. 1A was not stationary but rather was moving with a velocity (V). Now if this moving segment is viewed as a vehicle in motion and if $T_{eq}$ and $T_s$ were measured on the windward and leeward sides of the moving vehicle, respectively, and the evaporative, solar and heat conduction values were known and accounted for, it would be possible to determine the value of the ambient temperature ($T_a$). This may be the approach used in present day vehicles to measure the ambient temperature when the vehicle is in motion.

Eq. (12) offers the real possibility of being used to predict the onset of icing on aircraft surfaces, see e.g., Wilson, J. R., "Icing research heats up", *Aerospace America*, pp. 38-43, May Issue, 2006. This can be viewed as the counterpart to the onset of facial freezing as discussed in detail herein. Therefore, the analytical development that was necessary to arrive at a "time to freeze" as disclosed herein, could be repeated to determine a corresponding onset time for ice formation. Such a development is possible because Eq. (12) realistically treats all modes of heat transfer that contribute to the equivalent temperature of the wing and fuselage surfaces prior to takeoff (V=0) and in flight (V>0). The laminar forced convection term in Eq. (12) could be replaced by the turbulent forced convection term in the event high angle of attack flight causes localized turbulence. In either convection term, the ambient pressure (P) would be expressed as a function of altitude (H) making Eq. (12) readily adaptable to all flight altitudes. The radiation heat loss term of Eq. (12) would remain unchanged and would be the only means of aircraft surface cooling prior to takeoff. The evaporative heat loss term, $q_e$, (see Eq. 3) would not exist while the solar insolation heat gain term ($\alpha G$) would correct for the absence or presence of sunshine. A key term is the heat conduction term, $k/s$ $(T_b - T_s)$, which represents heat flow from inside the aircraft structure to the outer surfaces. This heat flow would delay ice formation; after ice formation it would be the necessary heat flow required to loosen the ice such that it could be swept from the surfaces by windshear. In its final form Eq. (12) would calculate the equivalent surface temperature ($T_{eq}$) as a function of flight conditions (H, V, $T_a$) and the initial surface temperature ($T_s$). This surface temperature will decrease due to the surface cooling during flight. Since it is desired to know the time when the value of $T_s$ decreases to the point that the water component in the air freezes on the surface, presumably at 32° F., an expression for $T_s$ as a function of time (t) would have to be determined. Temperature distributions along surfaces in laminar or turbulent flows are available in forms of analytical solutions with respect to wing de-icing. More accurate solutions may be obtained using computational fluid dynamics (CFD). This development would parallel the development of a similar expression for the facial temperature ($T_f$) as a function of time as developed in this application. With the final expression $T_s$ vs. t, the predicted onset of ice formation would take place at the time (t) when $T_s = 32°$ F.

Wind Chill Temperature Equation: Eq. (12) is the basic equation for the equivalent temperature of a two-dimensional surface. The wind chill model developed herein essentially modifies this equation for the equivalent temperature ($T_{eq}$) to derive a corresponding equation for the wind chill temperature ($T_{wc}$) as it applies to humans. It is natural to assume that the human head can best be simulated by a cylindrical surface. Osczevski correctly recognized that the real sensation of wind chill relates to cooling of the exposed face, see Osczevski, R. J., "The basis of wind chill", *Arctic.*, Vol. 48, No. 4, pp. 372-382, 1995. Osczevski used a cylindrical face simulator in a wind tunnel to obtain forced convection heat transfer coefficients. The Siple and Passel experiment also used a cylinder. A comparison of Siple and Passel's results with those of Osczevski showed an agreement that prompted Osczevski to observe that "[a]lthough the cylinder used by Siple and Passel was too small to represent a human body or even a head, it was nearly the perfect size to represent a face in the wind." The agreement was partly due to Siple and Passel's fortuitous choice of cylinder size. Buettner had also shown some agreement between measured and computed facial temperatures due to forced convection cooling of a cylinder representing the human head, see Buettner, K., "Effects of extreme heat and cold on human skin, I., Analysis of temperature changes caused by different kinds of heat application, II., Surface temperature, pain and heat conductivity in experiments with radiant heat", *J. Appl. Physiology*, Vol. 3, No. 12, pp. 691-713, 1951. The Bluestein and Zecher wind chill model also assumed the face to be the surface of a cylinder.

The assumption that the human head can be viewed as a cylinder was also made by the inventors in the wind chill model of the present invention, and this assumption resulted in changes in the heat loss/gain terms of Eq. (12). There was a significant change in the forced convection term ($q_{fc}$) where the characteristic dimension (L) of the two-dimensional surface now becomes the vertical length or height of the cylinder. The coefficients in the radiation ($q_r$), evaporation ($q_e$), insolation ($q_i$) and conduction ($q_b$) terms take on special meanings, not because of the surface change, but because they now apply to humans. The following sections discuss each of these changes after defining the cylindrical equivalent of a human head.

The cylinder is viewed as being vertical with its longitudinal axis normal to the wind. Its length (L) and diameter (D) must be specified. Because it can be demonstrated that an adult human head can be closely approximated by a 7 in. (17.78 cm) diameter cylinder that is 8.5 in. (21.59 cm) in length, the selected dimensions for a cylindrical model of a human head were D=7 in. and L=8.5 in. These are essentially the same dimensions as used by Bluestein and Zecher in the development of their wind chill model. The flat surface segment shown in FIGS. 1A-B in the determination of the equivalent temperature now becomes a segment of facial skin comprising the surface of the cylinder.

Figure 2:
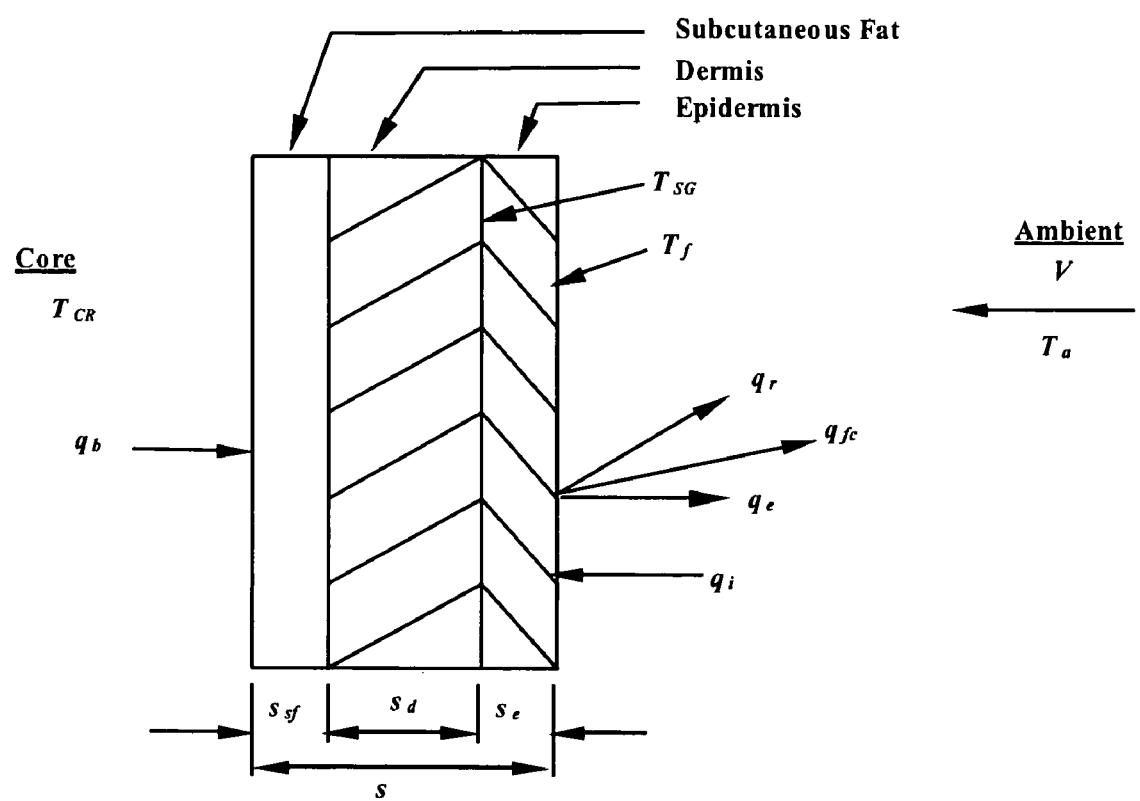
FIG. 2 is a diagram of a segment of cylindrical facial surface used in the determination of the wind chill temperature ($T_{wc}$), according to the present invention.

FIG. 2 is a diagram of a segment of a cylindrical facial surface used in the determination of the wind chill temperature ($T_{wc}$), according to the present invention. FIG. 2 illustrates the facial temperature ($T_f$) on the exposed surface and all the attendant heat losses and gains. The skin is composed of an outer layer called the epidermis, an adjacent inner layer called the dermis and an innermost layer called the subcutaneous fat. Some difficulty was encountered in finding well-defined values for the thickness of each layer. This may be partly due to the fact that skin thickness depends on its location on the body.

A cross-sectional sketch of the skin drawn to scale, may be found in World Book Encyclopedia, Vol. 17, 404d, p. 405, 1978. The World Book Encyclopedia states that the thickness of the dermis varies from 3 mm (0.0098 ft) on an individual's back to 1.6 mm (0.0052 ft) on the eyelid. From this it was assumed that the thickness of the dermis on the face was $s_d$=2.5 mm. Based upon the sketch, the corresponding thickness of the epidermis was $s_e$=0.87 mm and that of the subcutaneous fat was $s_{sf}$=1.96 mm. From these values, the cylindrical wall thickness corresponding to total skin thickness in FIG. 2 was determined to be s=5.33 mm.

The outer part of the epidermis consists of layers of lifeless fat cells that provide the body with a protective covering and a barrier to prevent loss of water through the skin. The inner part, at the epidermis-dermis interface, consists of live cells including nerve cells through which the effects of the wind chill are sensed. The dermis/subcutaneous fat interface is the location of the glands that produce the sweat in the evaporative heat loss.

It is important to note that the ratio of the facial skin height (L) of 7 in. to the total skin thickness (s) of 5.33 mm (0.2098 in.), i.e., L/s, is approximately 33. Since this skin thickness (s) is small relative to the facial skin height, it is reasonable to assume that conduction through the skin occurs exclusively in one direction. The reasonableness of this assumption and the accuracy of this one-dimensional treatment will be verified below when comparing the facial freezing time as calculated here with an infinite series solution of the one-dimensional transient heat conduction in a plane wall.

Forced Convection Heat Loss ($q_{fc}$): The laminar forced convection coefficient ($h_{fc, l, s}$) for the two-dimensional segment shown in Eq. (11a) and used in Eq. (12) for the equivalent temperature, $T_{eq}$, must now be replaced with the corresponding equation for a cylinder. At this point it should be noted that for a cylinder there is no need for an equivalent expression of the turbulent forced convection coefficient ($h_{fc, t, s}$) in Eq. (11b) since laminar flow will extend circumferentially outward to about 80 degrees on either side of the wind stagnation point. This laminar region is essentially the entire facial portion of the head that is directly exposed to the wind.

From Harms et al., the incompressible form of the laminar forced convection coefficient ($h_{fc}$) for this laminar stagnation region on a cylinder may be expressed as:

$$Nu = h_{fc}\frac{x}{k} = 1.14(Re)^{0.5}(Pr)^{0.4} \tag{13a}$$

where the characteristic length (x) in the Re number is the cylinder diameter (D). Equation (13a) is a special case of the general equation for forced convection over a cylinder, $Nu_D = h D/k = C (Re_D)^m (Pr)^n$. Selecting the exponent m to be 0.5 reduces the general relation to laminar flow. Furthermore, selecting the coefficient C to be 1.14 reduces the general relation to the laminar flow to the stagnation point. Thus, this special case applies to laminar stagnation heat transfer for all velocities. Neglecting the compressibility effects and the usage of the reference temperatures (T') of Eq. (10c), as done before, Eq. (13a) reduces to the following form for the laminar forced convection coefficient for a cylinder as used in this study:

$$h_{fc,l,c} = \frac{0.03238(PV)^{0.5}}{[0.5(T_s + T_a)]^{0.04} D^{0.5}} \tag{13b}$$

where again the temperatures ($T_s$ and $T_a$) are expressed in ° F. absolute (or ° R). Note the similarity of Eq. (13b) to that for the two-dimensional segment as shown in Eq. (11a).

Suppose the diameter (D) of a cylinder is equal to the length (L) of a segment. Then the ratio of the coefficients ($h_{fc,l,c}/h_{fc,l,s}$), is 3.36, which shows that the forced convection cooling of the cylinder with its longitudinal axis normal to the wind direction is 3.36 times greater than that for a two-dimensional surface aligned so as to be parallel to the wind. Perhaps this explains why a person facing into the wind on a cold winter day may instinctively turn his head to the side to lessen the cold sensation.

Eq. (13b), like Eq. (11a), clearly shows the dependency of the forced coefficient on the wind velocity (V) and the ambient pressure (P). This velocity, V, must be that at head level, and must also be expressed in ft/sec. However, in dealing with wind chill, it is more convenient to express velocity, V, in mph. Since the velocity at head level may under certain situations be less than that at the National Weather Service (NWS) standard 10 m level, the concept of a wind reduction factor (WRF), as discussed more fully below, was introduced.

Making these changes, the velocity in ft/sec at head level becomes (1.467) (1−WRF) V where V is the velocity in mph at the NWS 10 m (32.81 ft) level. The ambient pressure, P, is a function of altitude. Expressed in lbf/ft$^2$ in terms of its sea level value (2116.8 lbf/ft$^2$ (1 atm)) and altitude (H) in ft using the correlation disclosed in John, J. E. A. and Haberman, W. L., *Introduction to Fluid Mechanics*, 2nd ed., Prentice Hall, pp. 24-26, 1980, the pressure is $2116.8[1−(6.92×10^{−6})H]^{5.21}$. Putting these expressions for V and P into Eq. (13b), the final form of the forced convection coefficient for the cylindrical surface becomes:

$$h_{fc} = \frac{(1.8062)\{(1 - WRF)V[1 - (6.92 \times 10^{-6})H]^{5.21}\}^{0.5}}{[0.5(T_s + T_a)]^{0.04} D^{0.5}} \quad (13c)$$

It can be shown that the absolute humidity is a function of ambient pressure, ambient temperature, and the relative humidity. The above expression for the convective heat transfer coefficient is a function of the ambient pressure and ambient temperature, and therefore accounts for the effects of humidity.

Radiation Heat Loss ($q_r$): The radiation heat loss ($q_r$) as shown in Eq. (2) and used in Eq. (12) remains the same but is expressed in terms of a radiation coefficient ($h_r$) which applies to humans. Upon expansion, Eq. (2) becomes:

$$q_r = \epsilon\sigma(T_s+T_a)(T_s^2+T_a^2)(T_s-T_a) = h_r(T_s-T_a) \quad (14a)$$

where the radiation heat loss coefficient is:

$$h_r = \epsilon\sigma(T_s+T_a)(T_s^2+T_a^2) \quad (14b)$$

The surface emissivity of the human head was determined to be $\epsilon=0.8$ based upon a dynamic model disclosed in Fiala, D., Lomas, K. J. and Stohrer, M., "A computer model of human thermoregulation for a wide range of environmental conditions: the passive system", *J. Appl. Phys.*, Vol. 98, pp. 1957-1972, 1999. The Fiala et al. model was developed for evaluating the human response to a cold, cool, neutral, warm, or hot environment. With this value of $\epsilon$ and with the Stefan-Boltzmann constant $\alpha=1.714\times10^{-9}$ Btu/hr-ft$^2$-° R$^4$ ($5.670\times10^{-8}$ W/m$^2$-° K$^4$), the radiation heat loss coefficient becomes:

$$h_r = (1.3712\times10^{-9})(T_s+T_a)(T_s^2+T_a^2) \quad (14c)$$

Evaporation Heat Loss ($q_e$): The evaporation heat loss ($q_e$) from the skin segment as shown in Eq. (3) is the total heat loss resulting from the evaporation of sweat from the skin surface and from a natural diffusion of water through the skin layer. In this expression, $\dot{w}$ is the total water evaporation flux rate and $l_e$ is the latent heat of evaporation for water. It is known that $l_e=539.49$ cal/gm (971.08 Btu/lbm) so that $q_e=971 \dot{w}$, see, e.g., Eshbach, O. W., *Handbook of Engineering Fundamentals*, John Wiley & Sons, Inc., pp. 1-142 and 7-119, 1952.

The problem here is the determination of this total water evaporation flux rate which is based upon the sweat rate and the diffusion rate. From the 1993 ASHRAE (American Society of Heating, Refrigerating and Air Conditioning Engineers) Handbook, Fundamentals, sweating is shown to be a thermoregulatory process in which a risen body core temperature ($T_{CR}$) may be lowered to its equilibrium or neutral value (98.2° F. or 36.78° C.) based upon warm signals from the core and skin. Since information was lacking in the calculation of both the sweat rate and the diffusion rate, these values were obtained from Vogel, H. C. A., *The Nature Doctor*, Instant Improvement, Inc., p. 316, 1991. Vogel discloses that the diffusion rate varies from 1.7 to 2.6 pints/day (0.85 to 1.3 quarts/day). This represents a heat loss from the skin that persists at all times in the absence of perspiration. Using an average value of 2.2 pints/day (1.1 quarts/day), this value of the diffusion rate must be considered at all times in the calculation of wind chill.

Another source of water loss may be from sweat. Clayman, C. B., *The American Medical Association, Home Medical Encyclopedia*, Vol. 2, Random House, p. 1070, 1989, discloses that the sweat rate is 1.1 pints/day (0.55 quarts/day) in a cold climate and 5.0 pints/day (2.5 quarts/day) in a warm climate. Clayman notes that these are average values and as such represent cases where individuals are performing a minimum of physical activity. Based on these values, the total water loss rate, diffusion plus sweat, would be 3.3 pints/day (1.65 quarts/day) in a cold climate during minimum physical activity. But the sweat rate depends upon the severity of the physical activity. Vogel has stated that an individual perspiring under extreme conditions in a steam or sauna bath or living in the tropics can experience a total (diffusion and sweating) water loss rate that is 10 times greater than the average diffusion rate of 2.2 pints/day (1.1 quarts/day). Because even the most extreme wintertime activities are expected to result in a total water loss rate much less than this, a rather arbitrary assumption was made that this total water loss rate for maximum physical activity would be 5 times, not 10 times, the average diffusion rate. Thus, the total water loss rate from the skin surface for maximum physical activity would be $5\times2.2=11.0$ pints/day (5.5 quarts/day).

Swerdlow, J. K., "Unmasking Skin", *National Geographic*, pp. 36-63, November, 2002, discloses that the total skin area of an average person is 21 ft$^2$ (1.95 m$^2$), which is close to values quoted by other sources. It was assumed that diffusion and sweating occur over the entire 21 ft$^2$ (1.95 m$^2$). If it does not, then the resultant water evaporation flux rate would be conservative. For minimum physical activity in a cold climate where the total water loss rate is 3.3 pints/day (1.65 quarts/day), the minimum evaporation flux rate is $\dot{w}_{min}=0.00655$ lbm/hr-ft$^2$ (0.032 kg/hr-ft$^2$) and for maximum physical activity in a cold climate where the total water loss rate is 11.0 pints/day (5.5 quarts/day), the maximum evaporation flux rate is $\dot{w}_{max}=0.0283$ lbm/hr-ft$^2$ (0.1066 kg/hr-ft$^2$). The choice as to which evaporation flux rate to use was determined by the degree of strenuousness of the individual's activity.

Table 1 below, shows values of the metabolic heat rate ($M_{act}$) required for various activities and which will be used later to determine the metabolic heat gain. The following assumptions were made in order to specify the evaporation flux rate for each different activity: (1) when $M_{act}\leq 40$ Btu/hr$^2$-ft$^2$ (126.18 W/m$^2$), the physical activity is at a minimum and $\dot{w}=0.00655$ lbm/hr-ft$^2$ (0.032 kg/hr-ft$^2$), and (2) when $M_{act}>40$ Btu/hr$^2$-ft$^2$ (126.18 W/m$^2$), the physical activity is at a maximum and $\dot{w}=0.02183$ lbm/hr-ft$^2$ (0.1066 kg/hr-ft$^2$). With the evaporation flux rate ($\dot{w}$) known, along with the known value of the latent heat of evaporation ($l_e$) for water, the evaporation heat loss, $q_e=(971)\dot{w}$ can be calculated. This value of $q_b$ provides an estimate of the evaporation heat loss.

TABLE 1

Metabolic heat generation $M_{act}$ for various activities

| Activity | $M_{act}$, Btu/hr-ft$^2$ (W/m$^2$) |
|---|---|
| Standing relaxed | 22 (69.40) |
| Walking about | 31 (97.79) |
| Walking on level surface | |
| 2 mph (3.22 Km/hr) | 37 (116.72) |
| 3 mph (4.83 Km/hr) | 48 (151.42) |
| 4 mph (6.44 Km/hr) | 70 (220.82) |
| Driving | |
| Snowmobile | 18 to 37 (56.8 to 116.72) |
| Heavy vehicle | 59 (186.12) |
| Pick and shovel work | 74 to 88 (233.44 to 277.60) |
| Skiing | |
| Cross country | 83 (261.83)* |
| Downhill | 96 (302.84)* |

*Estimated by the inventors

Solar Heat Gain ($q_s$): The solar heat ($q_s$) received by the skin segment as shown in Eq. (4) depends on the insolation value (G). If sunshine is present, G>0, in darkness G=0. In the present case, where the major concern is an excessive wind chill leading to possible facial freezing, insolation or solar radiation heating of the face has a moderating effect. Because the heating of the face is maximized on a clear day when the sun's rays are perpendicular to the facial surface, this maximum value depends on the latitude of the individual's location. The value also depends on the season of the year. Consider, for example, the case of an individual at a northern latitude angle (LAT). In the summer, when the sun is high in the sky the angle of incidence of the sun's rays upon an upright individual's face may be small, resulting in relatively little solar heating of the face. Contrast this with the winter season when the sun is low in the sky and the sun's rays may be nearly perpendicular to the face, thus maximizing the facial heating. It is fortunate that this radiation heating is at its maximum in the winter season when its benefit can best be utilized. Finally, the insolation value at a given location is dependent upon the daily number of hours of sunshine at the location.

New England Solar Electric Inc., The Solar Electric Independent Home Book, New England Solar Electric Inc., Chap. 8, pp. A18-A39, 1998, discloses insolation data by the month for 221 cities across the 50 states as compiled by the U.S. Department of Energy. The data in this reference was used to devise a method for selecting the correct value of insolation to be used in the calculation of wind chill. This was done by dividing the portion of the lower 48 states that would most likely be subjected to wind chill into three latitude (LAT) regions of 50 each. These regions are 35°<LAT<40°, 40°<LAT<45° and 45°<LAT<50°, where LAT is the latitude angle of a particular location within a region. The combined span of these three regions may be visualized by noting that the 35° latitude line follows the southern boundary of Tennessee while the 50° latitude line lies close to the southern boundary of the Canadian provinces. Within each region, the average monthly insolation ($G_{av}$~KW-hr/m$^2$) was determined for four or more cities over a four month period from November through February. During this four month period, the nearly normal angle of incidence of the sun's rays on a collecting surface, in this case, an individual's head, was LAT+15°.

The values of $G_{av}$ are those corresponding to this angle of incidence. The values of $G_{av}$ were then used to obtain the average values ($G_{LAT}$) over each latitude region. These values are shown in Table 2, below, where $G_{LAT}$ has also been expressed as G in English units (Btu/hr-ft$^2$) for use in this model. It should be noted that the values for G (37.78 and 42.66 Btu/hr-ft$^2$ (119.17 and 134.58 W/m$^2$)) in the two northern regions, where severe wind chill and facial freezing is a possibility, are only 12 to 13% of the value of 240 cal/s-m$^2$ (318.53 Btu/hr-ft$^2$) used by Steadman (1971) for an upright human after he corrected his direct insolation value for a low angle solar altitude.

TABLE 2

Insolation values for latitude regions in the lower 48 states

| Latitude LAT | City | $G_{av}$ KW-hr/m$^2$ | $G_{LAT}$ KW-hr/m$^2$ | G W/m$^2$ (Btu/hr-ft$^2$) |
|---|---|---|---|---|
| 45°-50° | Bangor, ME | 2.76 | 2.86 | 119.17 (37.78) |
| | Minneapolis, MN | 2.81 | | |
| | Bismarck, Fargo, ND | 2.75 | | |
| | Miles City, Great Falls, MT | 3.12 | | |
| 40°-45° | Boston, MA | 2.62 | 3.23 | 134.58 (42.66) |
| | Chicago, IL | 2.81 | | |
| | Huron, Pierre, SD | 3.26 | | |
| | Casper, Rock Springs, Sheridan, WY | 4.21 | | |
| 35°-40° | Raleigh, Greensboro, NC | 3.70 | 4.43 | 184.58 (58.51) |
| | Kansas City, Springfield, St. Louis, MO | 3.50 | | |
| | Colorado Springs, Denver, Grand Junction, CO | 4.99 | | |
| | Prescott, AZ | 5.53 | | |

The thermal absorptivity ($\alpha$) of the human skin was determined from results of a study disclosed in Buettner, K., *The effects of natural sunlight on human skin, Proceedings of the first International Conference, Sponsored jointly by the Skin and Cancer Hospital, Temple University Health Sciences Center and the International Society of Biometeorology*, Pergamon Press, 237-249, 1969. In this study, the reflectivity of sunshine from white skin was found to be 35%. Assuming no transmissivity, the absorptivity was 65% and therefore the thermal absorption coefficient ($\alpha$) was 0.65. For dark skin, the absorptivity would be expected to be greater than 0.65; however, since this value was not known an $\alpha=0.65$ was used in this model. With G determined, the solar heat gain is $q_e=(0.65)$ G.

Metabolic Heat Gain ($q_b$): What was previously described as heat conduction ($q_b$) into the segment in Eq. (5) now becomes the metabolic heat flow from deep inside the body, called the core, into the multi-layered skin segment. This is more clearly understood in terms of the two-component model disclosed in Gagge, A. P., Stolwijk, J. A. J, and Nishi, Y., "An effective temperature scale based on a simple model of human physiological regulatory response", *ASHRAE Transactions*, Vol. 77, No. 1, p. 247, 1971, in which the human body is represented as two concentric cylinders. Described in the 1993 ASHRAE Handbook, the inner cylinder represents the body core (skeleton, muscle, internal organs) and the outer annular cylinder, the skin layer. The metabolic heat (M) produced within the core of the body is the heat required for an individual's activity ($M_{act}$) plus that required for shivering ($M_{shv}$), should that occur. Typical values of $M_{act}$ for various activities were obtained from the 1993 ASHRAE Handbook and OSHA Technical manual, Occupational Safety and Health Administration, Heat stress, Section III, U.S. Department of Labor, Chap. 4, 2003, and are shown in Table 1, above. Shivering is a thermoregulatory process through which the core temperature ($T_{CR}$) may be restored to its equilibrium or neutral value of 98.2° F. after a lowering. Although ($M_{shv}$) can be theoretically determined based on cold signals from the core and the skin, it was not considered here because of the uncertainty of its occurrence and its anticipated minimal effect on the final wind chill temperature.

If a portion of the heat produced within the core is expended as work (W) performed by the muscles, then the net heat production ($M_{act}-W$) is dissipated to the environment through the skin layer or is stored in the core causing the core temperature ($T_{CR}$) to rise. The possible rise in core temperature was not considered because most wintertime activities are not so extreme that the metabolic heat cannot be completely dissipated through the skin. Therefore, the core temperature was assumed to remain constant. Calculations using large values of $M_{act}$ verify this. In addition, work performed by the muscles cannot be specifically defined for the general populace when predicting wind chill temperatures; consequently, it too was neglected (W=0). Based on the two-cylinder concept of the human body, the metabolic heat flow ($q_b$) becomes a conductive heat transfer of heat from the core cylinder at a constant temperature ($T_{CR}$) to the skin cylinder whose outer surface is at the facial temperature ($T_f$). In FIG. 2, the skin segment which is a section of the outer skin cylinder is conveniently shown as a flat surface where the left side is the interface between the cylinders across which the metabolic heat transfer takes place. The expression for this heat transfer is:

$$q_b = K(T_{CR} - T_f) \quad (15)$$

This expression is similar to Eq. (5) except that the k/s term is replaced by a more complex conductance term (K). The 1993 ASHRAE Handbook states that this heat is transferred from the core to the skin by conductance ($\kappa$) at the interface between them and by convection due to the skin blood flux rate ($\dot{m}_{b,sk}$) within the skin segment. Therefore the complex conductance term becomes:

$$K = (\kappa + C_{p,b}\dot{m}_{b,sk})$$

with $\kappa$ specified as 0.93 Btu/hr-ft²-° F. (5.28 W/m²-° C.) and with the blood specific heat $C_{p,b}$=1.0 Btu/lbm-° F. (4.186 KJ/kg-° C.). The conductance term becomes:

$$K = (.93 + C_{p,b}\dot{m}_{b,sk}) \frac{\text{Btu}}{\text{hr-ft}^2\text{-° F.}} \quad (16b)$$

and so it is directly proportional to the skin blood flux rate which is limited to the range, 0.1 lbm/hr-ft² < $\dot{m}_{b,sk}$ < 18 lbm/hr-ft² (0.49 kg/hr-m² < $\dot{m}_{b,sk}$ < 87.88 kg/hr-m²). Increasing activity ($M_{act}$), increases the skin blood flux rate and thus increases the metabolic heat flow from the core to the skin segment.

The above conductance term (K) is defined differently in a thermoregulatory model developed by Havenith in which he determined the human response to heat and cold exposure, see Havenith, G., "Individualized model of human thermoregulation for the simulation of heat stress response", *J. Appl. Physiology*, Vol. 90, pp. 1943-1954, 2001. Havenith also used the two cylinder model developed by Gagge et al., but rather than defining the interface as in FIG. 2, Havenith defined the interface such that the outer cylinder, called the shell, consisted of muscle, fat, and skin, where fat refers to the subcutaneous fat layer and skin refers to the epidermis and dermis layers. The resistance to the heat transport from the core to the shell is therefore due to the combined resistance of the muscle, fat, and skin. When the blood vessels in the shell are constricted, heat transmission through the shell is low and mainly by conduction. This situation is typified by a state of low activity (low $M_{act}$). Increasing activity (higher $M_{act}$) increases the blood flux rate within the muscle and skin of the shell, thereby adding a convective component to the heat transfer. As already stated, the result is that the greater the activity the greater the heat flow to the skin, so that during wintertime the moderating effect on the wind chill temperature as sensed by the individual becomes greater.

Havenith determined the thermal resistance (R) of the shell, that is the inverse of the thermal conductance (1/K), by adding in series the resistance due to the skin blood flux rate ($R_b$), the resistance due to the muscle insulation and the muscle blood flux rate ($R_m$) and the resistance of the fat layer and two skin layers ($R_{sk}$) to get the following equation:

$$K = R^{-1} = (R_b + R_m + R_{sk})^{-1} \quad (17a)$$

where each of the three resistances is expressed in SI units (m²-° C./W). The resistance due to blood flux rate is:

$$R_b = \frac{1}{\eta C_{p,b}\dot{m}_{b,sk}} \quad (17b)$$

where Havenith refers to $\eta$ as a countercurrent heat exchange efficiency. This efficiency ($\eta$) is a measure of the arterial blood's ability to carry heat to the skin segment. The greater the value of $\eta$, the smaller the values of $R_b$ and R, the greater the conductance (K) and the greater the heat flow to the skin. The blood vessels in the skin are both arterial and venous in nature. The arteries carry heated blood from the core to the inner part of the epidermis but not into its outer part, which consists of multiple layers of dead cells. The veins carry the cooled returning blood to the core. The flow in the veins is counter to that in the arteries, and as a result, some of the heat in the incoming arterial flow directed toward the epidermis is absorbed by the outgoing venous flow leaving the epidermis. This heat exchange mechanism is the same principle employed in counterflow heat exchanges where their efficiency, $\eta_{cf}$ is a measure of the ability of the colder flow to remove heat from the warmer. Consequently, the greater the heat removal efficiency ($\eta_{cf}$) of the veins, the lesser the heat transport efficiency ($\eta$) of the arteries; therefore $\eta$ can be expressed as $\eta = 1 - \eta_{cf}$. Havenith assumed $\eta = 0.5$ and then calculated the specific heat of the blood ($C_{p,b}$) on the basis of what is called a "standard man" whose fat content is 15% of his total mass. Knowing the specific heat for fat as 2.51 J/gm-° C. (0.6 Btu/lbm-° F.) and that for other body tissue (skin, skeleton, muscles) as 3.65 J/gm-° C. (0.87 Btu/lbm-° F.), $C_{p,b}$=(0.15) (2.51)+(1−0.15)(3.65)=3.48 J/gm-° C. or 3480 J/kg-° C. (0.83 Btu/lbm-° F.). With these values, Eq. (17b) becomes:

$$R_b = \frac{1}{1740 \dot{m}_{b,sk}} \quad (17c)$$

where the blood flux rate ($\dot{m}_{b,sk}$) is expressed in kg/sec-m$^2$.

The resistance due to the muscle may be expressed as:

$$R_m = \frac{.05}{1 + \left(\frac{M_{act} - 65}{130}\right)} \quad (17d)$$

where 0.05 is called the maximal muscle insulation and the denominator relates muscle blood flux rate to energy consumption through the metabolic heat rate ($M_{act}$) expressed in W/m$^2$ for a given activity.

The resistance due to the subcutaneous fat layer and the two other layers (dermis, epidermis) of the skin is:

$$R_{sk} = 0.0048(s-2) + 0.0044 \quad (17e)$$

where s is the total thickness of all three layers expressed in mm. With s=5.33 mm (0.0175 ft) from FIG. 2, Eq. (17e) becomes:

$$R_{sk} = 0.02038 \quad (17f)$$

Substituting Eqs. (17c), (17d) and (17f) into Eq. (17a) the thermal resistance (R) of the core is:

$$R = \frac{1}{1740 \dot{m}_{b,sk}} + \frac{.05}{1 + \left(\frac{M_{act} - 65}{130}\right)} + .02038 \quad (17g)$$

Expressing the blood flux rate ($\dot{m}_{b,sk}$) in kg/hr-m$^2$ rather than kg/sec-m$^2$ and then expressing the conductance (K) as the inverse of Eq. (17g), K becomes:

$$K = R^{-1} \quad (17h)$$
$$= \left[\frac{2.069}{\dot{m}_{b,sk}} + \frac{1}{10 + .1538 M_{act}} + .02038\right]^{-1} \left(\frac{W}{m^2 \cdot {}^\circ C.}\right)$$

Aside from the difference in units, this conductance term by Havenith is quite different from the conductance term of Eq. (16b) as obtained from 1993 ASHRAE Handbook, Fundamentals. Each is a function of the skin blood flux rate, which in turn is dependent upon the metabolic heat ($M_{act}$) required by the activity. The following paragraphs describe the procedure used to determine which of these expressions for K would be used in the development of this model.

It has already been stated that the core temperature ($T_{CR}$) would not rise but remain constant, since all of the metabolic heat ($q_b$) flowing to the skin could be completely dissipated through the skin such that $q_b = M_{act}$. Then from Eq. (15), $$q_b = K(T_{CR} - T_f) = K\Delta T = M_{act} \quad (17i)$$

With this equation, it was possible to determine the conductance (K) term and hence the blood flux rate ($\dot{m}_{b,sk}$) that satisfies each value of $\Delta T$ and $M_{act}$. This required establishing a range of values for $\Delta T$ and $M_{act}$. With $T_{CR} = 98.2^\circ$ F. (36.78° C.) and with an initial facial temperature $T_f = 91.4^\circ$ F. (33° C.), the initial and minimum temperature differential is $\Delta T = 98.2^\circ$ F.$-91.4^\circ$ F.$=6.8^\circ$ F. (3.78° C.) at the moment of exposure to the wind. Assume, during continued exposure, the face was allowed to cool down to 40° F. (4.44° C.). The final and maximum temperature differential would be $\Delta T = 98.2^\circ$ F.$-40^\circ$ F.$=58.2^\circ$ F. (32.33° C.). Thus, the temperature differential range is 6.8° F.<$\Delta T$<58.2° F. (3.78° C.<$\Delta T$<32.33° C.).

Over this range of $\Delta T$, individuals may be engaged in various physical activities requiring differing amounts of metabolic heat ($M_{act}$). At this point, the range of $M_{act}$ was assumed to be that which existed during the Adamenko and Khairullin (1972) experiment, see Adamenko, V. N. and Khairullin, K. Sh., "Evaluation of conditions under which unprotected parts of the human body may freeze in urban air during winter", *Boundary-Layer Meteorology*, Vol. 2, pp. 510-518, 1972. In this experiment, the facial components (cheeks, nose, ears) of 40 people were instrumented to record the component temperature while the people were engaged in different levels of activity while exposed to ambient temperatures ranging from 10° C. to $-40^\circ$ C. (50° F. to $-40^\circ$ F.) and winds up to 15 m/s (33.55 mph). Their estimate of heat production by the human body, that is $M_{act}$, for all 40 people involved in the experiment ranged from 0.08 cal-cm$^{-2}$-min$^{-1}$ (17.7 Btu/hr-ft$^2$) to 0.60 cal-cm$^{-2}$-min$^{-1}$ (132.7 Btu/hr-ft$^2$). Therefore, the range of $M_{act}$ considered here was 17.7 Btu/hr-ft$^2$<$M_{act}$<132.7 Btu/hr-ft$^2$ (55.84 W/m$^2$<$M_{act}$<418.62 W/m$^2$).

Determining which expression for K to use in this model went beyond determining K itself for a given $\Delta T$ and $M_{act}$ from Eq. (17i); rather it depended upon the magnitude of the blood flux rate $\dot{m}_{b,sk}$, which is characteristic of this equation as well as Eq. (16b). Consider first the ASHRAE expression for K in Eq. (16b). Substituting it into Eq. (17i) and solving for $\dot{m}_{b,sk}$ in units of lbm/hr-ft$^2$ gives:

$$\dot{m}_{b,sk} = \frac{1}{C_{p,b}}[(M_{act}/\Delta T) - .93] \quad (17j)$$

At the moment of exposure when $\Delta T = 6.8^\circ$ F. (3.78° C.), the activity level would likely be at the lowest level, that is $M_{act} = 17.7$ Btu/hr-ft$^2$ (55.84 W/m$^2$). With these values, the blood flux rate from Eq. (17j) is $\dot{m}_{b,sk} = 1.67$ lbm/hr-ft$^2$ (8.15 kg/hr-m$^2$). Now after extended exposure, when $\Delta T = 58.2^\circ$ F. (32.33° C.), the activity level is likely to be at its maximum value of $M_{act} = 132.7$ Btu/hr-ft$^2$ (418.62 W/m$^2$) and the corresponding blood flux rate is $\dot{m}_{b,sk} = 1.35$ lbm/hr-ft$^2$ (6.59 kg/hr-m$^2$). Thus the blood flux rate from the ASHRAE expression for K decreases as the activity level increases.

Determining the corresponding blood flux rates for the Havenith expression for K in Eq. (17h) required an iterative procedure, since this K is a function of both $\dot{m}_{b,sk}$ and $M_{act}$. For the minimum values of $\Delta T$ and $M_{act}$, the blood flux rate was found to be $\dot{m}_{b,sk} = 41$ kg/hr-m$^2$ (8.4 lbm/hr-ft$^2$). For the maximum value of $\Delta T$ and $M_{act}$, the blood flux rate was $\dot{m}_{b,sk} = 43$ kg/hr-m$^2$ (8.81 lbm/hr-ft$^2$). The Havenith values differ from the ASHRAE values in two respects. First, the larger blood flux rate for the Havenith K occurs at the higher activity level, whereas for the ASHRAE K it occurs at the lower activity level. Secondly, the Havenith blood flux rates are much larger than the ASHRAE values. These much larger values of blood flux rates may be the result of the shell concept employed by Havenith. The shell consists of muscle in addition to the three skin layers. Equation (17c) relates primarily to the resistance of the skin blood flux rate. Equation (17h) relates to skin blood flux rate plus muscle resistance and muscle blood flux rate. From this it is clear that the Havenith values include both the skin and muscle blood flux rates. This may explain why the Havenith values of $\dot{m}_{b,sk}$ are so much larger than the ASHRAE values. Furthermore, Havenith has stated that the skin blood flux rate decreases with increasing $M_{act}$, as already demonstrated by the ASHRAE result, while the muscle blood flux rate increases with increasing $M_{act}$. Intuitively, it might be reasoned that the muscle blood flux rate could be much greater than that in the skin. If that is so, then as $M_{act}$ increases, the decrease in the skin blood flux rate is more than offset by the increase in the muscle blood flux rate. The net effect is that the larger total blood flux rate (8.81 lbm/hr-ft² (43 kg/hr-m²)) would indeed occur at the higher values of $M_{act}$ as demonstrated.

The above discussion suggests that either expression for K could be used to calculate the metabolic heat flow. However, if the above assumption that the total blood flux rate in the Havenith approach is that of both the skin and the muscle, then the use of Havenith's expression might be more appropriate. The reason for this is that the metabolic heat rate ($M_{act}$) now determines the blood flux rate in the muscle as per Eq. (17d), and therefore its effect on muscle resistance ($R_m$) and consequently its contribution to the value of K. This aspect of core to skin heat transfer is not present in the ASHRAE conductance term. Nevertheless, the average value of the skin blood flux rate ($\dot{m}_{b,sk}$) of 1.5 lbm/hr-ft² (7.32 kg/hr-m²) as determined in the ASHRAE calculations was used in the evaluation of the Havenith expression for K from Eq. (17i).

The selection of the more appropriate expression for K was determined in another way, although in an unusual manner. Consider the two average blood flux rates of 1.5 lbm/hr-ft² (7.32 kg/hr-m²) for the skin and 8.61 lbm/hr-ft² (42.04 kg/hr-m²) for the muscle and skin. From the difference of these two values, the muscle blood flux rate alone becomes 7.1 lbm/hr-ft² (34.67 kg/hr-m²). With a blood density of 62.4 lbm/ft³ (999.52 kg/m³), these two blood flux rates (1.5, 7.1) correspond to blood flux rate velocities of 0.29 and 1.37 in./hr (0.74 to 3.48 cm/hr). Based on one of the inventors' personal experience with influenza inoculation, pain accompanied with shivering was felt in the center of the underarm 5 to 6 hours after inoculation. This is defined as the start of the body reaction time to the influenza strain injected into the arm. The distance between the syringe's insertion point in the arm and the center of the underarm was approximately 6.5 in. (16.51 cm). With this approximate distance, the skin blood velocity (0.29 in./hr (0.74 cm/hr)) and the muscle blood velocity (1.37 in./hr (3.48 cm/hr)) correspond to approximate body reaction times of 22.4 and 4.7 hours, respectively. Assuming no other effects that might dramatically alter this body reaction time, the time of 4.7 hours appears realistic since it is very close to the 5 to 6 hour reaction time experienced. Consequently, it lends credence to the validity of Havenith's value of K and for that reason this K was selected in the calculation of $q_b$.

Equation (17h) shows K to be dependent upon $\dot{m}_{b,sk}$ and $M_{act}$, both expressed in SI units. As already stated, the average $\dot{m}_{b,sk}$ of 1.5 lbm/hr-ft² (7.32 kg/hr-m²) obtained from the ASHRAE calculations was used in this expression for K after converting it to units of 7.32 kg/hr-m². Although $\dot{m}_{b,sk}$ takes on this constant value, $M_{act}$ depends on the individual's activity and must be specified from Table 1, above, where $M_{act}$ is listed for various wintertime activities. Listed in units of Btu/hr-ft², it is convenient to maintain $M_{act}$ in these units when substituting them into Eq. (17h). To do so, the values of $M_{act}$ in Table 1 must be multiplied by 3.1546 to convert them to W/m². Making these substitutions in Eq. (17h) and then converting the entire equation to English units, the equation for K becomes:

$$K = \left(\frac{1}{5.6784}\right)\left[.2827 + \frac{1}{10 + .1538(3.1546)M_{act}} + .02038\right]^{-1} \quad (17k)$$

$$\left(\frac{Btu}{hr\text{-}ft^2\text{-}°F.}\right)$$

or upon simplification, $$K = \{1.721 + [1.7611 + .0854(M_{act})]^{-1}\}^{-1}\left(\frac{Btu}{hr\text{-}ft^2\text{-}°F.}\right) \quad (17l)$$

This expression for K is now used in Eq. (15) to calculate the metabolic heat transfer ($q_b$).

The above defined expressions for $h_{fc}$ and $h_r$ from Eqs. (13c) and (14c), the expressions for quantities $q_e$ and $q_i$, along with $q_b$ from Eq. (15) and its conductance term from Eq. (17l) are the replacements for their counterparts in Eq. (12) when the latter is applied to humans. The surface temperature ($T_s$) in the forced convection, radiation, and metabolic heat terms is replaced with the facial temperature ($T_f$) and the equivalent temperature ($T_{eq}$) now becomes the wind chill temperature ($T_{wc}$). The above quantities and Eq. (8a) relating to the natural convection coefficient were substituted into Eq. (6) and the following equation for the wind chill temperature ($T_{wc}$) was obtained in the same manner as Eq. (9) for the equivalent temperature ($T_{eq}$), $$T_{wc} = T_f - \quad (18a)$$

$$\left\{\frac{L^\phi}{C_1}\left[\begin{array}{l}\frac{(1.8062)\{(1 - WRF)V[1 - (6.92 \times 10^{-6})H]^{5.21}\}^{0.5}}{[0.5(T_f + T_a)]^{0.04}D^{0.5} +}(T_f + T_a) \\ (1.3712 \times 10^{-9})(T_f + T_a)(T_f^2 + T_a^2) \\ (T_f - T_a) + (971)\dot{w} - (.65)G - \{1.721 + \\ [1.7611 + .0854(M_{act})]^{-1}\}^{-1}(T_{CR} - T_f)\end{array}\right]\right\}^{1/(1+\phi)}$$

where in this study, the dimensions D=7 in. (0.5833 ft, 17.78 cm) and L=8.5 in. (0.7083 ft, 0.2159 m) must be expressed in ft, and where all temperatures ($T_{wc}$, $T_f$, $T_a$, $T_{CR}$) are expressed in °F. absolute (or °R) and where $C_1$ is determined from Eq. (8c).

Equation (18a) is the final form of the wind chill temperature. At this point, exponent $\phi$ is unknown. As already stated, for natural convection from a heated vertical surface, plane or cylinder, $\phi$=0.25 if the sole source of the heat is within the surface itself. This is not the case for a human where the facial surface heat is being supplemented by the metabolic heat from the body core. In this case, $\phi$ will take on a value different from 0.25. Natural heat convection ($q_{nc}$) will occur in a no wind (V=0 mph (0 Km/hr)) environment when the facial surface heats the adjacent air layer, causing upward convection. In the absence of forced convection ($q_{fc}$) heating, the air layer will be heated by radiation ($q_r$) from the facial surface, which is not only being heated by the metabolic heat ($q_b$) but also by solar radiation ($q_i$). The evaporative heat loss ($q_e$) will have a cooling effect on the adjacent air. Therefore $q_{nc}=q_r+q_b+q_i-q_e$. With the components of $q_{nc}$ as shown in Eq. (18a) and with Eq. (8a) substituted in Eq. (7), where $T_s$ and $T_{eq}$ have been replaced by $T_f$ and $T_{wc}$, Eq. (7) becomes, $$(C_1)L^{-\phi}(T_f-T_{wc})^{(1+\phi)}=(1.3712\times10^{-9})(T_f+T_a)(T_f^2+T_a^2)$$
$$(T_f-T_a)+\{1.721+[1.7611+0.0854(M_{act})]^{-1}\}^{-1}$$
$$(T_{CR}-T_f)+(0.65)G-(971)\dot{w} \tag{18b}$$

which upon solving for $T_{wc}$ becomes, $$T_{wc}(V=0)=T_f-\left\{\frac{L^\phi}{C_1}\begin{bmatrix}(1.3712\times10^{-9})(T_f+T_a)(T_f^2+T_a^2)\\(T_f-T_a)+\{1.721+[1.7611+.0854(M_{act})]^{-1}\}^{-1}\\(T_{CR}-T_f)+(.65)G-(971)\dot{w}\end{bmatrix}\right\}^{1/(1+\phi)} \tag{18c}$$

For specified values of $T_a$, $M_{act}$ and G, Eq. (18a) with V=0 and Eq. (18c) are two equations in two unknowns ($T_{wc}$, $\phi$). To simplify the solution of these quantities, sunshine was assumed to be absent (G=0). This absence means that the values of $\phi$ so determined will reflect the lowest values of $T_{wc}$ whenever Eq. (18a) is applied even if the effect of sunshine is subsequently included. In addition, by assuming the individual's usual physical activity as "walking about", then from Table 2 $M_{act}$=31 Btu/hr-ft² (97.79 W/m²) and $\dot{w}$=0.00655 lbm/hr-ft² (0.032 kg/hr-m²). By making these assumptions and noting that $T_f$=91.4° F. (551.09° R) and $T_{CR}$=98.2° F. (557.89° R), values of $T_{wc}$ and $\phi$ from Eqs. (18a) and (18c) were determined as functions of $T_a$, the only remaining variable. A plot of $\phi$ as a function of $T_a$ was curve fitted using TableCurve 2D to give the following expression for $\phi$:

$$\phi=a+b\exp[-(T_a/C)] \tag{18d}$$

where a=0.46259934, b=0.077254543 and c=−59.573525, and where the correlation coefficient is r²=0.998884458. The wind chill temperature ($T_{wc}$) at a given ambient temperature ($T_a$) can now be determined from Eq. (18a) after determining $\phi$ from Eq. (18d).

Equation (18a) can be viewed as a complete expression for the wind chill temperature, since it considers all heat losses and gains that contribute to it. It is applicable to any individual engaged in one of a variety of physical activities from merely standing to being engaged in a strenuous activity. Knowing the specific location of the individual, the solar radiation (G) is known as well as the altitude (H). Thus, the wind reduction factor (WRF) can be determined as described below.

Equation (18a) is a detailed expression for the wind chill temperatures ($T_{wc}$) on the facial surface that reveals certain features of this temperature that might not be immediately apparent. These features become evident when one considers the particular situation where there is no sunshine (G=0), no wind reduction (WRF=0), and where there is negligible heat conduction (K=0) and evaporation (w=0). These features are as follows:

(1) For all values of V, if $T_a$=$T_f$ then $T_{wc}$=$T_a$=$T_f$. This means that if the facial surface temperature and the ambient temperature are the same, a wind chill temperature does not exist. Since this is true for V=0 as well, there is no longer a need to define a calm condition as 4 mph (1.79 m/s) when stating wind chill temperature in the absence of wind.

(2) For values of V>0, if $T_a$>$T_f$ then $T_{wc}$>$T_f$. This means that when the ambient temperature is greater than the facial temperature, what was a wind chill temperature now becomes a wind warming temperature. The net affect is a warming of the face rather than a cooling.

(3) A decrease in the ambient pressure as a result of an increase in altitude (H) moderates or increases $T_{wc}$.

Facial Temperature Equation: The wind chill model disclosed herein predicts the wind chill temperature immediately upon exposure and the time to freeze if exposure continues. The determination of this time to freeze required the development of a time dependent facial temperature ($T_f$) equation for the outer surface of the facial skin segment as shown in FIG. 2. This was accomplished using two different approaches.

(1) Lumped Capacitance Approach: In the lumped capacitance approach, all heat losses ($q_{fc}$, $q_r$, $q_e$) from the segment and the heat gains ($q_b$, $q_s$) to the segment are lumped together in a determination of the facial temperature. This temperature variation was determined from the time variation of the average skin segment temperature ($T_{SG}$) defined as $T_{SG}$=($T_{CR}$+$T_f$)/2 in FIG. 2. From the conservation of energy, the rate of change of the skin segment internal energy ($\dot{E}_{SG}$) is equal to the rate of change of the entering energy ($\dot{E}_{IN}$) minus the rate of change of the leaving energy ($\dot{E}_{OUT}$), that is, $$\dot{E}_{SG}=\dot{E}_{IN}-\dot{E}_{OUT} \tag{19}$$

With A as the surface area of the skin segment, using the heat loss and heat gain terms from Eq. (18a) in Eq. (19) gives, $$\rho C_p s A=\frac{dT_{SG}}{dt}=[K(T_{CR}-T_f)+(.65)G]A- \tag{20}$$

$$\begin{bmatrix}\frac{(1.8062)\{(1-WRF)V[1-\\(6.92\times10^{-6})H]^{5.21}\}^{0.5}}{[0.5(T_f+T_a)]^{0.05}D^{0.5}+(1.3712\times10^{-6})}(T_f-T_a)\\(T_f+T_a)(T_f^2+T_a^2)(T_f-T_a)+(971)\dot{w}\end{bmatrix}A$$

where $\rho$ is the skin density, $C_p$ is the skin specific heat and the skin segment thickness s=0.0175 ft (5.33 mm), as previously determined. Rationalizing Eq. (20) and noting that $T_{CR}$ remains constant as the segment cools, then, $$\frac{dT_{SG}}{dt}=\frac{1}{2}\left(\frac{dT_{CR}}{dt}+\frac{dT_f}{dt}\right)=\frac{1}{2}\frac{dT_f}{dt} \tag{21a}$$

and Eq. (20) becomes, $$\frac{dT_f}{dt}=\frac{2}{\rho C_p s}\begin{bmatrix}K(T_{CR}-T_f)+(.65)G\\(1.8062)\\-\frac{\{(1-WRF)V[1-(6.92\times10^{-6})H]^{5.21}\}^{0.5}}{[0.5(T_f+T_a)]^{0.04}D^{0.5}}(T_f+T_a)\\-(1.3712\times10^{-9})(T_f+T_a)(T_f^2+T_a^2)(T_f-T_a)+(971)\dot{w}\end{bmatrix} \tag{21b}$$

$$=\frac{2}{\rho C_p s}F(T_f)$$

Rewriting Eq. (21b) with time as the dependant variable and integrating gives, $$\int dt = \left(\frac{\rho C_p s}{2}\right) \int \frac{dT_f}{F(T_f)} \tag{21c}$$

Eq. (21c) could be used to get the facial temperature ($T_f$) at any time (t) after exposure. Unfortunately, the integral on the right side is not known to exist, at least at the time of this writing. Thus, the facial temperature was determined through a numerical integration of Eq. (21b).

In Eq. (21b), the skin density ($\rho$) and the specific heat at constant pressure ($C_p$) were taken to be the same as those for water at a facial temperature of 91.4° F. (33° C.). Choosing the values to be those for water was based on a finding by Meyer (1971) that the product $k\rho C_p$ for the skin should lie within the range of 15-60 Btu²/hr-ft⁴-° F.² (1.741×10⁶-6.964× 10⁶ kg²/s⁵-° C.²), see Meyer, G. E., W., *Analytical Methods in Conduction Heat Transfer*, McGraw-Hill Book Company, pp. 202 and 491, 1971. For water $\rho$=62.42 lbm/ft³ (999.84 kg/m³), $C_p$=1 Btu/lbm-° F. (4.1868 KJ/kg-° C.) and the thermal conductivity k=0.36 Btu/lbm-° F. (0.62 W/m-° C.). Consequently, the product $k\rho C_p$=22.47 Btu²/hr-ft⁴-° F.² (2.608× 10⁶ kg²/s⁵-° C.²) for water lies within the above range. This value of the product, $k\rho C_p$, is substantiated by similar values determined by Buettner, Yuan et al. and Valvano et al., where their values were 14.98, 17.39 and 17.37 Btu²/hr-ft⁴-° F.² (1.739×10⁶, 2.019×10⁶ and 2.016×10⁶ kg²/s⁵-° C.², respectively). See, Yuan, D. Y., Valvano, J. W., Rudie, E. N. and Xu, L. X., "2-D finite difference modeling of microwave heating in the prostate", http://www/ece/utexas.edu/~valvano/research/ASME95.pdf, 1995, and Valvano, J. W., Nho, S. and Anderson, G. T., "Analysis of the Weinbaum-Jiji model of blood flow in the canine kidney cortex for self-heated thermistors", http://www/ece/utexas.edu/~valvano/research/ASME94.pdf, 1999. With the value of $\rho$=62.42 lbm/ft³ (999.84 kg/m³) and $C_p$=1 Btu/lbm-° F. (4.1868 KJ/kg-° C.) substituted into Eq. (21b), this expression for the temperature gradient when written in an incremental form becomes, $$T_f^{m+\Delta t} = T_f^m + \tag{22}$$

$$(1.83)(\Delta t) \left[ \begin{array}{c} K(T_{CR} - T_f^m) + (.65)G \\ - \dfrac{(1.8062)\left\{\dfrac{(1-WRF)}{V[1-(6.92\times 10^{-6})H]^{5.21}}\right\}^{0.5}}{[0.5(T_f+T_a)]^{0.04} D^{0.5} -} (T_f - T_a) \\ (1.3712\times 10^{-9})(T_f + T_a) \\ (T_f^2 + T_a^2)(T_f - T_a) - (971)\dot{w} \end{array} \right]$$

With this equation, a step-by-step calculation of $T_f$ can be made for any combination of $T_a$ and V starting at time zero when m=0 and where $T_f^m$=91.4° F. (33° C.). Calculations with D=7 in. (0.5833 ft, 0.1778 m) have shown that the optimum time increment $\Delta t$=1 sec.

(2) Infinite Series Approach: Eq. (22) represents what is referred to as a lumped capacitance approach to heat transfer. It is a preferred method of treating transient conduction and indeed the only simple means when multiple modes of heat transfer exist. However, there is an error associated with a lumping of these multiple modes. It is small if the Biot number (Bi) here is defined as $h_{fc}(s/2)/k \leq 0.1$. This ratio implies that if only an external forced convection heat loss was present, and none of the other heat transfer modes, it would initiate a one-dimensional conduction of heat through the skin thickness (s) driven by the temperature difference ($T_{CR} - T_a$). With the known values for the skin thickness (s) as 5.33 mm (0.0175 ft) and thermal conductivity (k) as 0.36 Btu/hr-ft-° F. (0.62 W/m-° C.) and with the forced convection heat transfer coefficient ($h_{fc}$) calculated from Eq. (13c), the Biot number can be calculated. With the Biot number, the magnitude of the error associated with the lumped capacitance approach can be determined.

Figure 3A:
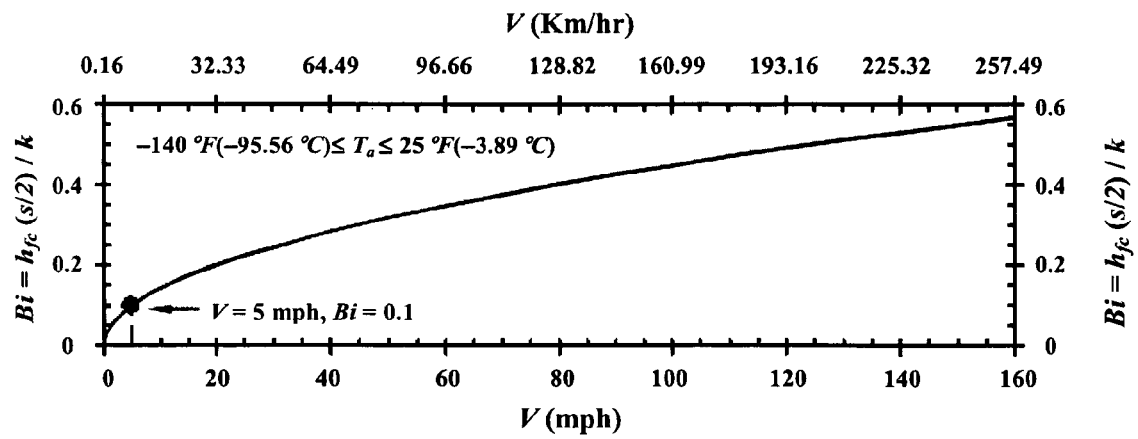
FIGS. 3A and 3B are graphs of the Biot number, Bi, as a function of wind velocity, V, and the Fourier number, $F_o$, plotted as a function of exposure time, t, respectively.

Since the $h_{fc}$ is velocity (V) dependent, a calculation of Bi as a function of velocity is shown in FIG. 3A when $-140°$ F.$\leq T_a \leq 25°$ F. ($-95.56°$ C.$\leq T_a \leq -3.89°$ C.) and 0.1 mph$\leq V \leq$160 mph (0.16 Km/hr$\leq V \leq$257.49 Km/hr). From FIG. 3A, the error associated with the lumped capacitance approach can be considered small if V$\leq$5 mph (8.05 Km/hr). Since "small" is relative, and since the wind velocity will generally far exceed 5 mph (8.05 Km/hr), it was obvious that some other means would be necessary to determine the error at the higher velocities. This was done by determining a time varying facial surface temperature ($T_f$) equation for the above described one-dimensional analyses and comparing it with the corresponding $T_f$ equation from the lumped capacitance approach. The procedure uses an existing solution to the one-dimensional transient conduction problem.

The one-dimensional facial temperature expression uses the following existing exact infinite series solution disclosed in Incropera, F. P. and DeWitt, D. P., *Introduction to Heat Transfer*, John Wiley & Sons, Chap. 5, 1985, $$\theta^* = \sum_{n=1}^{n=\infty} C_n \exp(-\zeta_n^2 F_o) \cos(\zeta_n x^*) \tag{23a}$$

With T as the skin temperature at any axial location (x) in the direction of heat flow, $\theta$ is the temperature difference ($T-T_a$) with $T_a$ being the ambient temperature. $\theta^*$ is the temperature difference $\theta$ normalized by the maximum temperature difference ($T_{CR}-T_a$) where $T_{CR}$ is the core temperature (98.2° F. (36.78° C.)). Thus, $$\theta^* = \frac{T - T_a}{T_{CR} - T_a} \tag{23b}$$

In Eq. (23a), the Fourier number, $F_o = 4\alpha t/s^2$ where $\alpha$ is the skin's thermal diffusivity ($k/\rho C_p$) and is shown plotted in FIG. 3B as a function of exposure time (t). Also in Eq. (23a), x* is the distance x from the midpoint of the segment normalized by half the skin thickness, that is x*=2x/s, x*=0 is the skin midpoint location and x*=1 is at the skin's outer surface. The coefficient $C_n$ is defined as, $$C_n = \frac{4\sin(\zeta_n)}{2\zeta_n + \sin(2\zeta_n)} \tag{23c}$$

where the discrete values (eigenvalues) of $\zeta_n$ are positive roots of the transcendental equation, $$\zeta_n \tan \zeta_n = Bi \quad (23d)$$

Figure 3B:
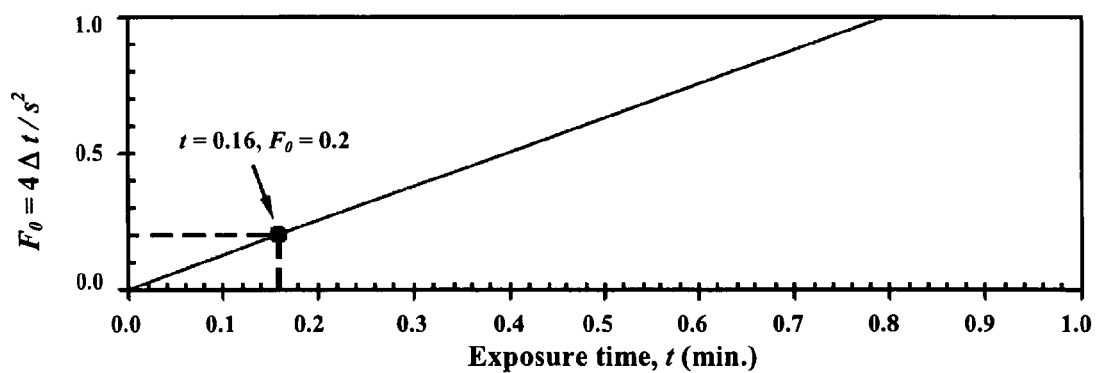

This infinite series solution can be approximated by the first term of the series solution when $F_o \geq 0.2$. FIG. 3B shows that this first term series solution is applicable to all exposure times greater than 0.16 min. A four term series solution was determined using the first four roots of this equation as given in Appendix B.3 of Incropera et al. to obtain the normalized temperature.

The normalized mid-segment temperature is, $$\theta_o^* = \frac{\theta(t, x^* = 0)}{\theta_i} = \frac{T(t, x = 0) - T_a}{T_{CR} - T_a} \quad (23e)$$

which yields the mid-segment temperature as, $$T_{x^*=o} = T_o = \theta_o^*(T_{CR} - T_a) + T_a \quad (23f)$$

The normalized surface temperature is, $$\theta^* = \frac{\theta(t, x^* = 1)}{\theta_i} = \frac{T(t, x = s/2) - T_a}{T_{CR} - T_a} \quad (23g)$$

which yields the surface or facial temperature as, $$T_{x^*=1} = T_f = \theta^*(T_{CR} - T_a) + T_a \quad (23h)$$

Equation (23h) is the facial temperature equation based on an infinite series heat conduction solution. Facial temperatures using this equation were compared with those of Eq. (22) to determine if a significant error is encountered as a result of using the lumped capacitance approach.

Time to Freeze Equation: In addition to providing a more precise prediction of the wind chill temperature ($T_{wc}$), a key feature of the wind chill model of the present invention is its capability of determining the exposure time when facial freezing will occur. The wind chill temperature, although a true sensed temperature, becomes subjective in nature, since individuals may differ greatly in their perception of its actual magnitude. When the time to freeze ($t_f$) is specified, along with the wind chill temperature, it frees the individual from becoming overly concerned with the actual value of the temperature. Instead it becomes a warning to the individual of a limiting time after exposure when facial freezing will occur. It has the added benefit of allowing preplanning of outdoor activities, so as not to exceed this time limit.

Ideally the dependence of facial temperature ($T_f$) on time (t) would be obtained through integration of Eq. (21c) to get a closed form solution for the time to freeze ($t_f$). Unfortunately, the integral shown in Eq. (21c) does not exist. Instead, the time to freeze ($t_f$) was determined from Eq. (22) through step-by-step calculations of the time for the facial temperature to decrease from the initial value of 91.4° F. to 32° F. (33° C. to 0° C.). In this manner, considerable data was generated on the time to freeze. This data was then curve fitted to obtain an explicit equation for the time to freeze ($t_f$). In the generation of this data, the evaporative heat loss ($q_e$) and the metabolic heat gain ($q_b$) were neglected in Eq. (22) since indications were that their effects would be offsetting. Only the primary heat losses ($q_{fc}$, $q_r$) were considered along with the solar heat gain ($q_i$), where the latter is based on values of $G \geq 0$ depending upon the presence or absence of sunshine. As a further simplification, sea level altitude (H=0 ft (0 m)) was assumed with the intent of developing a subsequent correction to $t_f$ for any other altitude.

Four equations for $t_f$ were derived, one when sunshine is absent (G=0) and three others when sunshine is present (G>0), the latter three values of G being those for the latitude regions of Table 2, above. Calculations were made over the widest range of ambient temperature ($-140°$ F. $\leq T_a \leq 25°$ F. ($-95.56°$ C. $\leq T_a \leq -3.89°$ C.)) and wind velocities (0 mph $\leq V \leq 160$ mph (0 Km/hr $\leq V \leq 257.49$ Km/hr)) anticipated worldwide. The following procedure was used:

(1) With G=0 and $T_a = -140°$ F. ($-95.56°$ C.), calculate the facial temperature ($T_f$) decay curves for values of V=0.1, 1, 5, 10, 20, 40, 60, 80, 100, 120, 140 and 160 mph (0.16, 8.05, 16.09, 32.19, 64.37, 95.56, 128.74, 160.93, 193.12, 225.30 and 257.49 Km/hr).

Figure 4A:
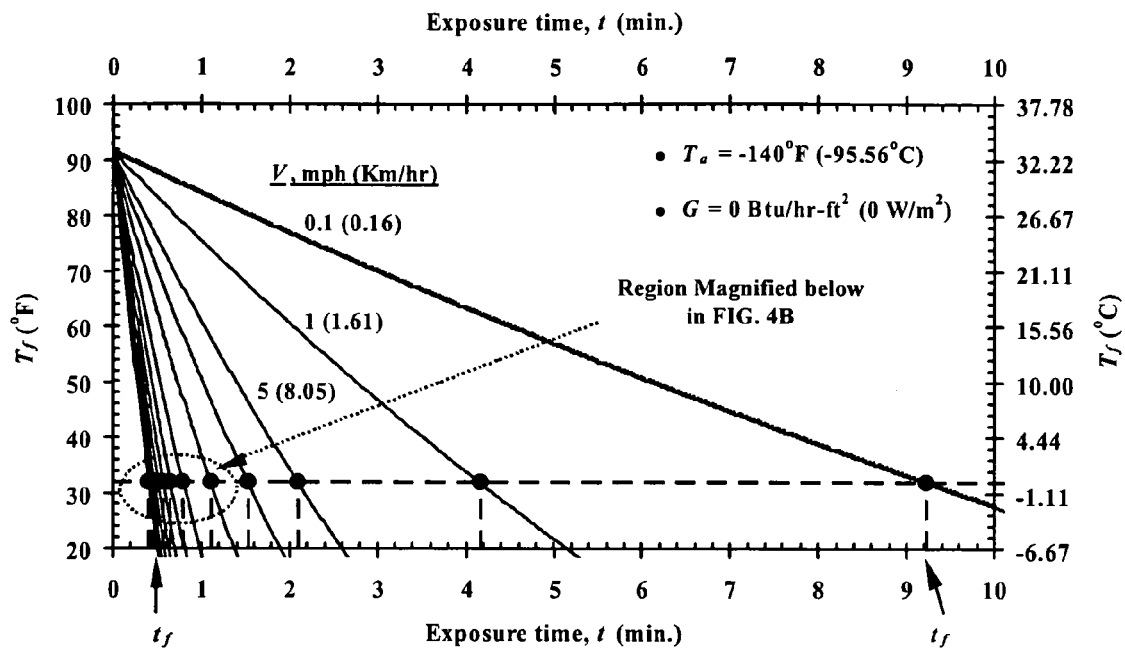
FIGS. 4A and 4B are graphs of facial temperature ($T_f$) decay curves and time to freeze ($t_f$) as a function of wind velocity.
Figure 4B:
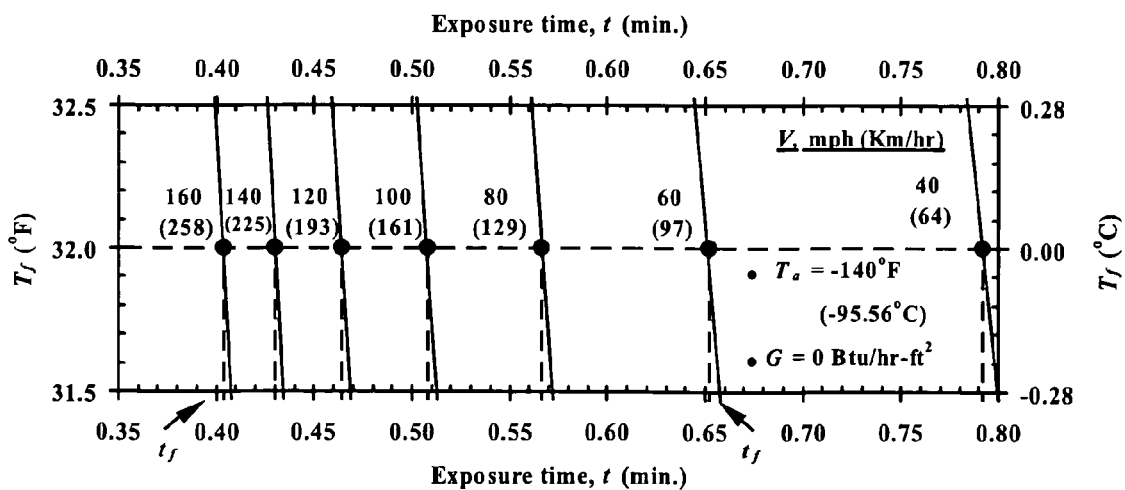

(2) Plot the $T_f$ decay curves as shown in FIGS. 4A-B and note the times to freeze ($t_f$) as their intercept points with the $T_f = 32°$ F. (0° C.) line. FIG. 4B is an enlarged graph of the region in dotted ellipse shown in FIG. 4A.

(3) Along the line $T_f = 32°$ F. (0° C.), obtain values of $t_f$ vs. V and plot $t_f$ vs. log V as a dashed line in FIG. 5 for $T_a = -140°$ F. ($-95.56°$ C.).

(4) Repeat steps (1)-(3) for each of the other values of $T_a$, $-120°$ F., $-100°$ F., $-80°$ F., $-60°$ F., $-40°$ F., $-20°$ F., 0° F., 10° F., 20° F. and 25° F. ($-84.44°$ C., $-73.33°$ C., $-62.22°$ C., $-51.11°$ C., $-40°$ C., $-28.89°$ C., $-17.78°$ C., $-12.22°$ C., $-6.67°$ C. and $-3.89°$ C.) to get the remaining dashed curves in FIG. 5.

Figure 5:
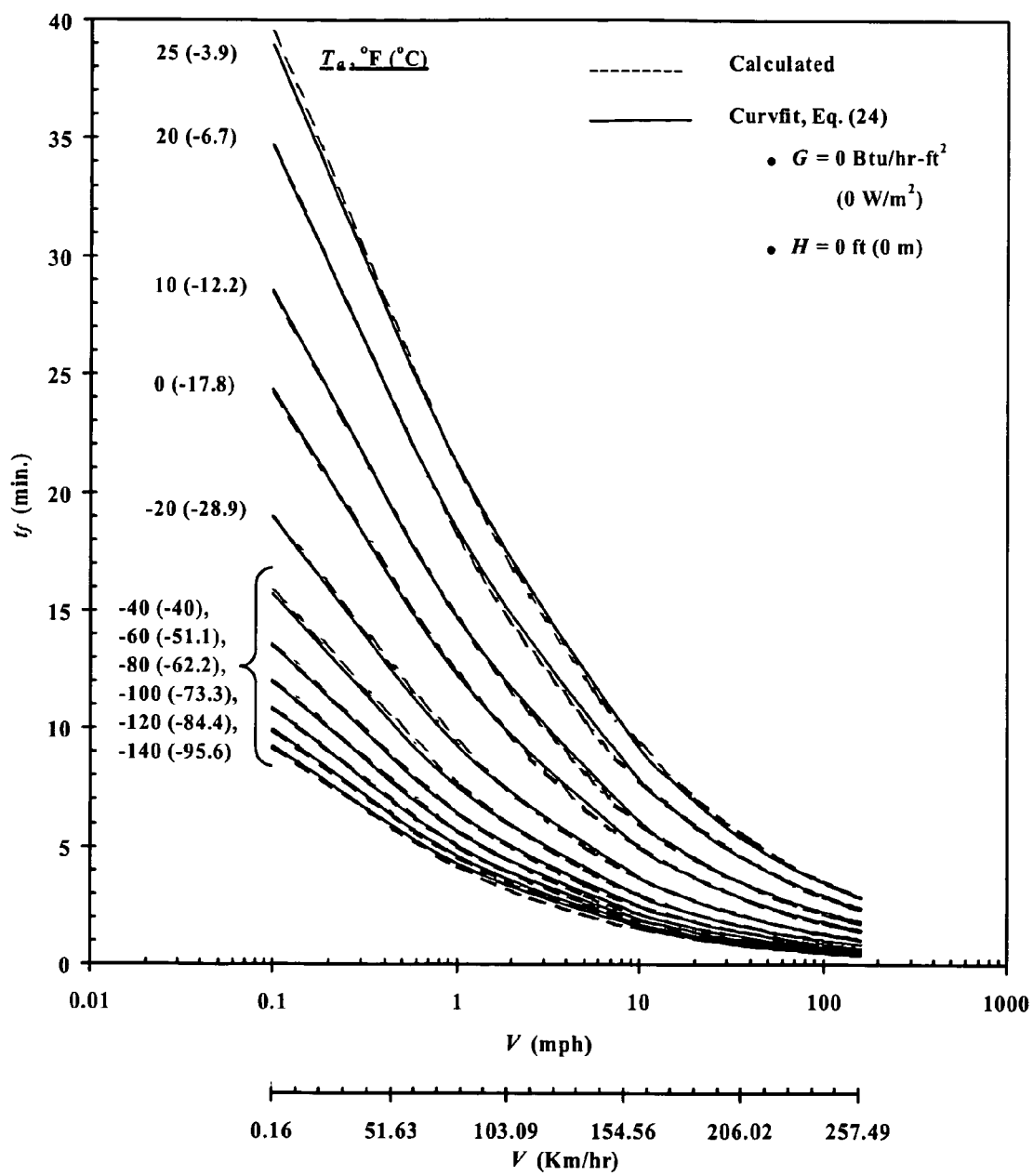
FIG. 5 is a graph of time to freeze ($t_f$) as a function of ambient conditions ($T_a$, V) and $q_e=q_b=q_i=0$.

The eleven dashed curves of FIG. 5 were curve fitted using TableCurve 3D™ to obtain the following equation for the freezing time ($t_f$) when G=0:

$$t_f = \frac{\{a + b \ln(V) + c[\ln(V)]^2 + d[\ln(V)]^3 + eT_a\}}{\{1 + f \ln(V) + g[\ln(V)]^2 + hT_a + i(T_a)^2\}} \quad (24)$$

where a=12.213472, b=$-4.7287903$, c=0.71377035, d=$-0.040374904$, e=0.0020284147, f=$-0.042770886$, g=0.0048025828, h=$-0.016212428$, i=$-2.3703809 \times 10^{-5}$ and where the correlation coefficient is $r^2$=0.99984977. The curve fitted values of $t_f$ vs. log V using Eq. (24) are shown as solid lines in FIG. 5 and show a good correlation with the calculated values shown as dashed lines. These curves show that in the absence of sunshine (G=0), the time to freeze decreases very rapidly as the velocity increases, especially at the higher temperatures. Because the presence of sunshine (G>0) has been shown to even prevent freezing, these curves would be expected to shift progressively upward as the value of G increases. Because of this pronounced effect of sunshine on $t_f$, the above calculations and curve fits were made for each of the three regional values of G in Table 2. The different set of constants (a, b, c, d, e, f, g, h, i) developed for each value of G are shown in Table 3, below:

TABLE 3

Coefficients in Eq. (24) for the time to freeze ($t_f$) in three latitude regions

| | | Latitude Region | | |
|---|---|---|---|---|
| Constants | All Latitudes $G = 0$ | 45°-50° $G = 37.78$ Btu/hr-ft² (119.17 W/m²) | 40°-45° $G = 42.66$ Btu/hr-ft² (134.58 W/m²) | 35°-40° $G = 58.51$ Btu/hr-ft² (184.58 W/m²) |
| a | 12.213472 | 18.185966 | 18.510193 | 27.201736 |
| b | −4.7287903 | −7.1895224 | −7.96409 | −10.167441 |
| c | 0.71377035 | 1.1058166 | 1.3362907 | 1.418616 |
| d | −0.040374904 | −0.065135256 | −0.084835215 | −0.07397277 |
| e | 0.0020284147 | −0.0001595948 | −0.0026299421 | −0.0014226544 |
| f | −0.042770886 | 0.092286021 | 0.011675974 | 0.36636446 |
| g | 0.0048025828 | −0.013081903 | −0.0021834205 | −0.048107247 |
| h | −0.016212428 | −0.02597853 | −0.024713305 | −0.042429888 |
| i | −2.3703809 × 10⁻⁵ | −3.1495047 × 10⁻⁵ | −1.5165097 × 10⁻⁵ | 5.740629 × 10⁻⁵ |
| r² | 0.99984977 | 0.99901459 | 0.99670162 | 0.99766982 |

As already noted, it was essential to use Eq. (22) in the determination of Eq. (24) because the integral in Eq. (21c) was nonexistent. If the integral had consisted of only one rather than five heat loss/gain terms, a closed form solution of Eq. (21c) would have been possible. This means that if either of the primary heat losses (radiation, forced convection) is present, a closed-form solution for the time to freeze ($t_f$) is possible.

Closed Form Solution of $t_f$-Radiation Only: When an individual is exposed to a cold environment, a radiation heat loss will always exist when $T_f > T_a$ even in the absence of a forced convection heat loss (V=0 mph (0 Km/hr)). Considering only the radiation heat loss as defined in Eq. (2), Eq. (21c) becomes, $$\int_{t_i}^{t_{fr}} dt = \left(\frac{\rho C_p s}{2}\right) \int_{T_{fi}}^{T_{ff}} \frac{dT_f}{\varepsilon\sigma(T_a^4 - T_f^4)} \quad (25a)$$

Integrating from the initial exposure time, $t_i=0$, when the initial facial temperature is $T_{fi}=91.4°$ F. (551.09° R) to the time to freeze, $t_{fr}$, when the final facial temperature $T_{ff}=32°$ F. (491.69° R) gives, $$t_{fr} = \left(\frac{\rho C_p s}{2\sigma\varepsilon}\right)\left[\frac{1}{4T_a^3}\ln\left|\frac{T_a + T_f}{T_a - T_f}\right| + \frac{1}{2T_a^3}\tan^{-1}\left(\frac{T_f}{T_a}\right)\right]_{T_{fi}}^{T_{ff}} \quad (25b)$$

Inserting the numerical values for the facial temperature limits into Eq. (25b) gives, $$t_{fr} = \left(\frac{\rho C_p s}{2\sigma\varepsilon}\right)\left(\frac{1}{2T_a^3}\right)\left\{\begin{array}{l}\frac{1}{2}\left[\ln\left|\frac{T_a + 491.69}{T_a - 491.69}\right| - \ln\left|\frac{T_a + 551.09}{T_a - 551.09}\right|\right] + \\ \tan^{-1}\left(\frac{491.69}{T_a}\right) - \tan^{-1}\left(\frac{551.09}{T_a}\right)\end{array}\right\} \quad (25c)$$

With the values of $\rho$, $C_p$, s, $\varepsilon$, and $\sigma$ already known, Eq. (25c) provides an exact value for the times to freeze, $t_f$, at any ambient temperature ($T_a$) when only the radiation heat loss is present.

Closed Form Solution of $t_f$-Forced Convection Only: A forced convection heat loss is not likely to exist in the absence of a radiation heat loss. However, if it does, and with the convection heat loss as defined by Eq. (1), Eq. (21c) becomes, $$\int_{t_i}^{t_{fc}} dt = \left(\frac{\rho C_p s}{2}\right) \int_{T_{fi}}^{T_{ff}} \frac{dT_f}{h_{fc}(T_f - T_a)} \quad (26a)$$

Integrating as before gives, $$t_{fc} = \left(\frac{\rho C_p s}{2h_{fc}}\right)\ln[T_f - T_a]_{T_{fi}}^{T_{ff}} \quad (26b)$$

Inserting the numerical values for the facial temperature limits into Eq. (26b) along with the expression for $h_{fc}$ from Eq. (13c) gives, $$t_{fc} = \left(\frac{\rho C_p s}{2}\right)\frac{[0.5(T_f + T_a)]^{0.04}D^{0.5}}{(1.8062)\{(1 - WRF)V[1-(6.92\times10^{-6})H]^{5.21}\}^{0.5}} \ln\left(\frac{551.09 - T_a}{491.69 - T_a}\right) \quad (26c)$$

With values of $\rho$, $C_p$, s and D known and ambient conditions ($T_a$, V) specified along with altitude (H) and wind reduction factor (WRF), Eq. (26c) provides an exact value for the time to freeze when only a convection heat loss is present.

Wind Chill Temperature: Comparisons were made between the predictions of the wind chill temperatures using Eq. (18a) and the Siple and Passel results. The Siple and Passel experiment was conducted at or near sea level (H=0) conditions at Little America, Antarctica. Because their experiment was conducted out in the open, well above ground level, there was no reduction in the wind speed (WRF=0). Neither the solar heat gain (G=0) nor the evaporative heat loss ($\dot{w}$=0) were of concern, since Siple and Passel, when referring to insolation and evaporation, stated that these factors "were almost missing in the Antarctic winter when the experiments were carried on". Finally, the metabolic heat gain was not present ($q_b$=0) because it did not exist in their experiment. Since the radiation heat loss term in Eq. (18a) and the experiment are identical, except for an emissivity factor, any major difference in the wind chill temperatures as predicted by Eq.

(18a) and the Siple and Passel results would be due to a difference in the forced convection coefficients. Determining this difference meant extracting the Siple and Passel forced convection coefficient from their test results and comparing it with the forced convection coefficient of Eq. (13c) as used in this model. This is described in the following paragraphs.

Determination of the inherent forced convection coefficient from the Siple and Passel results began with an equation that expressed their results as wind chill temperatures. This equation, $$T_{wc}=91.4-(0.04544)[10.45-0.447V+6.6858V^{0.5}] \quad (91.4-T_a) \quad (27a)$$

was obtained from *Marks' Standard Handbook for Mechanical Engineers*, 9th ed., McGraw-Hill, Chap. 12, p. 113, 1989, where it is shown as Eq. (12.4.47). In this equation, V is in mph and $T_{wc}$ and $T_a$ are in ° F. This equation can be written in terms of what has been called the wind chill index (WCI), which represents the heat loss rate ($\dot{q}$) from their test container when the container surface temperature was assumed to be at a constant 91.4° F. (33° C.). Although Siple and Passel erred in their assumption that this temperature of 91.4° F. remained constant, a simple test using a hand held thermometer in contact with the skin will verify that this was a good choice for the initial skin temperature of a human suddenly exposed to a cold environment. Their so-called wind chill index (WCI) from Eq. (27a) is, $$WCI_E=[10.45-0.447V+6.6858V^{0.5}](91.4-T_a)=\dot{q}_E \quad (27b)$$

and has English units of Btu/hr-ft². It is shown as Eq. (12.4.45) in Mark's. Siple and Passel, who initiated the term WCI, expressed it as, $$WCI_{SI}=[10.45-V+10V^{0.5}](33-T_a)=\dot{m}_{SI} \quad (27c)$$

where it has SI units in Kcal/hr-m² and is shown as Eq. (12.4.44) in Mark's. Equation (27a), as shown in Eq. (12.4.47), can be expressed in terms of $WCI_E$ as, $$T_{wc}=91.4-0.04544(WCI_E) \quad (27d)$$

and its counterpart in SI units from Eq. (12.4.44) in Mark's can be written as, $$T_{wc}=33-0.04544(WCI_{SI}) \quad (27e)$$

Since there is an equivalency in $T_{wc}$ irrespective of the units in which it is expressed, then from Eqs. (27d) and (27e), $WCI_E=WCI_{SI}$. This means that $\dot{q}_E=\dot{q}_{SI}$ where from Eqs. (27b) and (27c), $$\dot{q}_E=[10.45-0.447V+6.6858V^{0.5}](91.4-T_a)=h_E(91.4-T_a) \quad (27f)$$

and, $$\dot{q}_{SI}=[10.45-V+10V^{0.5}](33-T_a)=h_{SI}(33-T_a) \quad (27g)$$

These two equations demonstrated that over the same temperature range, $h_E$ must be made equivalent to $h_{SI}$ through a unit conversion factor. To convert from SI units in which the Siple and Passel results are expressed in English units, $h_E$ must be multiplied by 1/4.88 or 0.2049. Thus, the actual Siple and Passel WCI or heat flow rate is not the expression in Eq. (27b) but rather, $$WCI=(0.2049)[10.45-0.447V+6.6858V^{0.5}](91.4-T_a) \quad (27h)$$

The presence of this coefficient (0.2049) indicates that Eq. (12.4.45) in Mark's is in error. It also changes the existing coefficient (0.5556) in the WCI expression in Eq. (69) of 1993 ASHRAE Handbook, Fundamentals to 0.1138. Consider the case where V=4 mph (1.79 m/s) and $T_a$=0° F. (−17.78° C.). The error in Mark's will be demonstrated based on the heat flux rate followed by the convective heat transfer coefficient equivalencies. Substituting the values in English units in Eq. (27b) yields $\dot{q}_E$=2013.87 Btu/hr-ft² (6352.95 W/m²). Similarly, substituting the values in SI units in Eq. (27c) yields $\dot{q}_{SI}$=1119.15 Kcal/hr-m² or 1301.32 W/m² (412.64 Btu/hr-ft²). They are equivalent when Eq. (27b) is multiplied by a factor of 0.2049. Similarly, substituting the values in English units in Eq. (27f) yields $h_E$=22.03 Btu/hr-ft²-° F. (125.10 W/m²-° C.). Substituting the values in SI units in Eq. (27g) yields $h_{SI}$=25.63 W/m²-° C. (4.51 Btu/hr-ft²-° F.). They are equivalent when Eq. (27f) is multiplied by a factor of 0.2049.

Eq. (27h) represents the actual heat flow from the Siple and Passel container. Eq. (27h) may be expressed as, $$WCI=h_{fc,r}(91.4-T_a) \quad (27i)$$

where $h_{fc,r}$ is a combined forced convection and radiation heat transfer coefficient measured during their tests and where from Eq. (27h), $$h_{fc,r}=(0.2049)[10.45-0.447V+6.6858V^{0.5}] \quad (27j)$$

Since the radiation coefficient in the Siple and Passel tests was expected to take on the same form as that in Eq. (14c) for the human head, their radiation coefficient, assuming their emissivity of $\epsilon$=1 rather than $\epsilon$=0.8, was, $$h_r=(1.714\times10^{-9})(91.4+T_a)[(91.4)^2+T_a^2] \quad (27k)$$

Consequently, the Siple and Passel forced convection coefficient ($h_{fc}$) was determined from, $$h_{fc}=h_{fc,r}-h_r \quad (27l)$$

where upon using Eqs. (27j) and (27k), it became, $$h_{fc}=(0.2049)[10.45-0.447V+6.6858V^{0.5}]-(1.714\times10^{-9})(91.4+T_a)[(91.4)^2+T_a^2] \quad (27m)$$

Figure 6A:
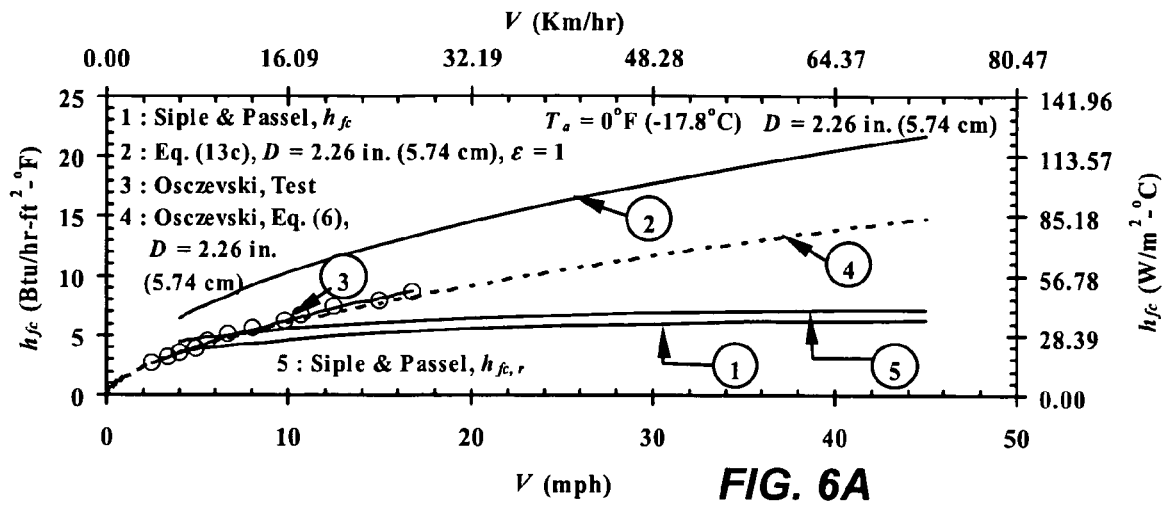
FIG. 6A is a graph comparing the forced convection coefficients as they apply to the Siple and Passel container.

A comparison was made of the forced convection coefficient values using this deduced expression of $h_{fc}$ from the Siple and Passel experiment with the corresponding values from the analytical expression ($h_{fc}$) shown in Eq. (13c). The comparison was made for an ambient temperature ($T_a$) of 0° F. (459.69° R) over the velocity range 0<V<45 mph (0<V<72.42 Km/hr) that existed during the Siple and Passel experiment. In addition to the previously mentioned conditions (WRF=H=0) in Antarctica, the surface temperature ($T_s$) in Eq. (13c) was set at 91.4° F. (33° C.) and the diameter D at 2.26 in (0.1883 ft, 0.0574 m) so as to match the container diameter used in the Siple and Passel experiment. Calculated values of the two $h_{fc}$ coefficients are plotted in FIG. 6A and the results are surprising. The Siple and Passel values (curve 1) are but a small percentage of this model's values (curve 2) over the entire velocity range. Included in FIG. 6A are two curves from FIG. 1 of Osczevski's paper. Curve 3 represents Osczevski's test results for a thermal model of the head which is assumed to have a diameter D=0.16 m (6.3 in). Curve 4 represents the results of Osczevski's calculation of the coefficient for the test cylinder (D=2.26 in. (0.1883 ft, 0.0574 m)) used by Siple and Passel. In making this calculation, Osczevski used Eq. (6) in his paper which he calls a standard empirical equation for $h_{fc}$ for a cylinder. The good agreement between Osczevski's predicted values of $h_{fc}$ for the Siple and Passel container (curve 4) and his own test results (curve 3) may have led Osczevski to state that the cylinder used by Siple and Passel was nearly a perfect representation of the head. This statement indicates that Osczevski may have believed that his calculated value of $h_{fc}$ for the Siple and Passel container actually existed in their experiment. But this was not the case, because the actual Siple and Passel values of $h_{fc}$ (curve 1) are much less than Osczevski's predicted values of their $h_{fc}$ (curve 4). In fact Osczevski's predicted values of $h_{fc}$ are even much greater than the total or combined convection/radiation coefficients ($h_{fc,r}$) in the Siple and Passel tests as represented by curve 5. Based on these findings, it appears that the measured container cooling rates in the Siple and Passel experiment were much too low. The reason for this is unclear. However, Siple and Passel in FIG. 4 of their paper note several problems encountered during their experiment, such as anemometer difficulties, turbulence, and local convection currents, all possibly leading to unreliable data.

From FIG. 6A, it is evident that the prediction of $h_{fc}$ (curve 2) using Eq. (13c) results in an increasing difference between it and the $h_{fc}$ from the Siple and Passel test data (curve 1) as the velocity increases. This difference reaches a maximum at V=45 mph (72.42 Km/hr) where the $h_{fc}$ from Eq. (13c) is 3.4 times greater than that for the test data. At this same velocity, the $h_{fc}$ calculated from Osczevski's Eq. (6) is 2.4 times greater. Although Eq. (13c) and Osczevski's Eq. (6) were derived from the same basic equation, $h_{fc} = Nu_D k/D = C\, Re_D^m (Pr)^n (k/D)$, Osczevski's choice for the coefficient (0.23) and the exponent (0.6) in Eq. (6) limits its applicability to a Reynolds number range of 4,000 to 40,000. But in reality, the Reynolds number may far exceed this range. For example, with the head diameter D=7 in. (0.5833 ft, 0.1778 m) and a velocity V=45 mph (72.42 Km/hr), the Reynolds number is 257,000, which is well beyond the useful range of Eq. (6). Equation (13c) is free of this restriction, being adaptable over the entire range of anticipated Reynolds numbers, and most likely represents what the real coefficients were in the Siple and Passel tests.

Figure 6B:
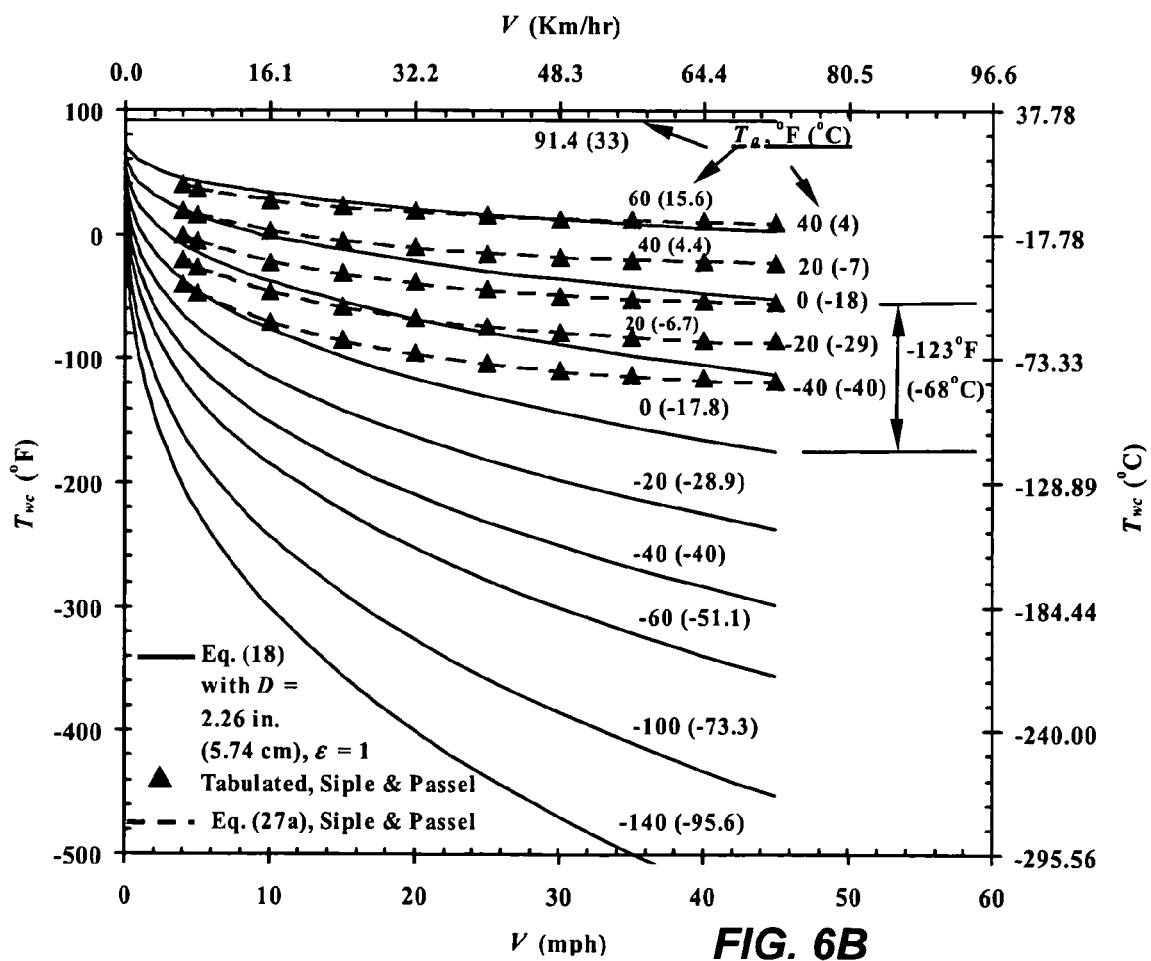
FIG. 6B is a graph comparing the Siple and Passel wind chill temperatures with those predicted by the wind chill model of the present invention using the Siple and Passel container.

FIG. 6A shows that this model's predicted forced convection coefficients (curve 2) for the Siple and Passel container were as much as 3.4 times larger at V=45 mph than those (curve 1) derived from their test results. Most likely due in part to problems they had in the recording of their data, this difference in the values of the forced convection coefficients means that the Siple and Passel values of the wind chill temperature would be higher (warmer) over the entire velocity range, but especially at the higher velocities. This confirms the previous statement that any difference in these predicted values of the wind chill temperature would be due to differences in the forced convection coefficients. This is demonstrated in FIG. 6B, where the Siple and Passel values of $T_{wc}$ from Eq. (27a), superimposed with the usually tabulated Siple and Passel results (▲), are much higher (warmer) than those calculated from Eq. (18a) using the previously mentioned Antarctic conditions. For example, at $T_a$=0° F. (−17.78° C.) and V=45 mph, Eq. (18a) predicts a wind chill temperature that is −123° F. (−68.33° C.) colder than the Siple and Passel value. What should be noted is that this difference is much less at the lower velocities. These comparisons can only be made over the ambient temperature range (−40° F.≦$T_a$≦40° F. (−40° C.≦$T_a$≦4.44° C.)) associated with the Siple and Passel experiment, whereas the calculations with this model can span a much broader range of ambient temperature (−140° F.≦$T_a$≦91.4° F. (−95.56° C.≦$T_a$≦33° C.)), over which wind chill temperatures can be of real concern.

Figure 7A:
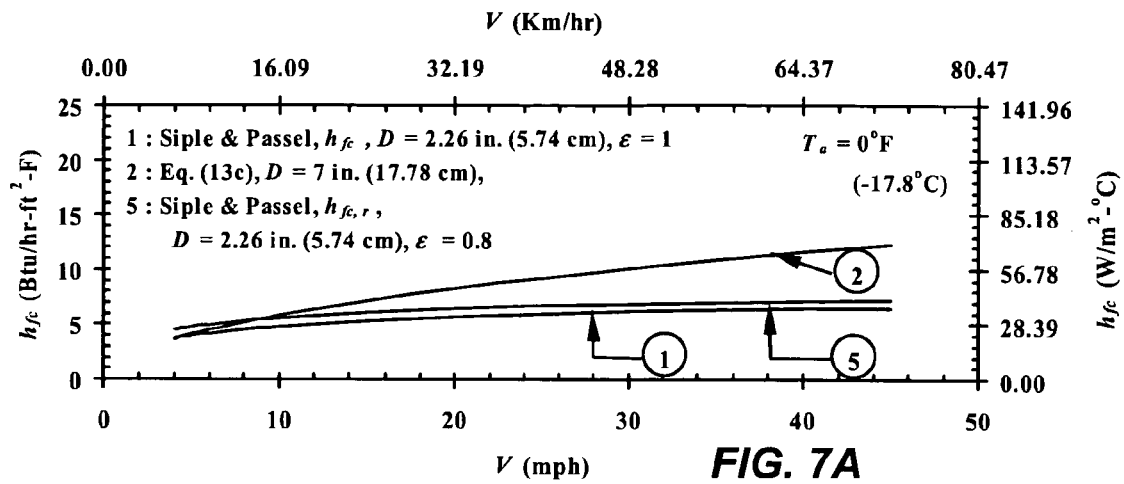
FIG. 7A is a graph comparing the predicted forced convection coefficients for the head with those of Siple and Passel.

FIG. 7A shows a comparison of the Siple and Passel coefficients (curve 1) with the wind chill model's prediction (curve 2) of the present invention for the head with D=7 in. Curve 2 shows a large decrease in the predicted value of $h_{fc}$ as the diameter is increased from 2.26 in. (5.74 cm) in FIG. 6A to 7 in. in FIG. 7A. As a result, the predicted value of $h_{fc}$ at $T_a$=0° F. and V=45 mph is now only 1.9 times, not 3.4 times, larger than the Siple and Passel value. This means that the larger difference shown in FIG. 6A was not due entirely to unreliability in the Siple and Passel data, but is also due to the fact that the forced convection coefficient varies inversely with the diameter. This suggests that if Siple and Passel had chosen a container with a larger diameter, closer to that of the human head, their test results may have shown values of $h_{fc}$ (curve 1) much closer to those predicted by the wind chill model of the present invention (curve 2). Nevertheless, the curves of FIG. 7A reflect the real differences that currently exist.

Figure 7B:
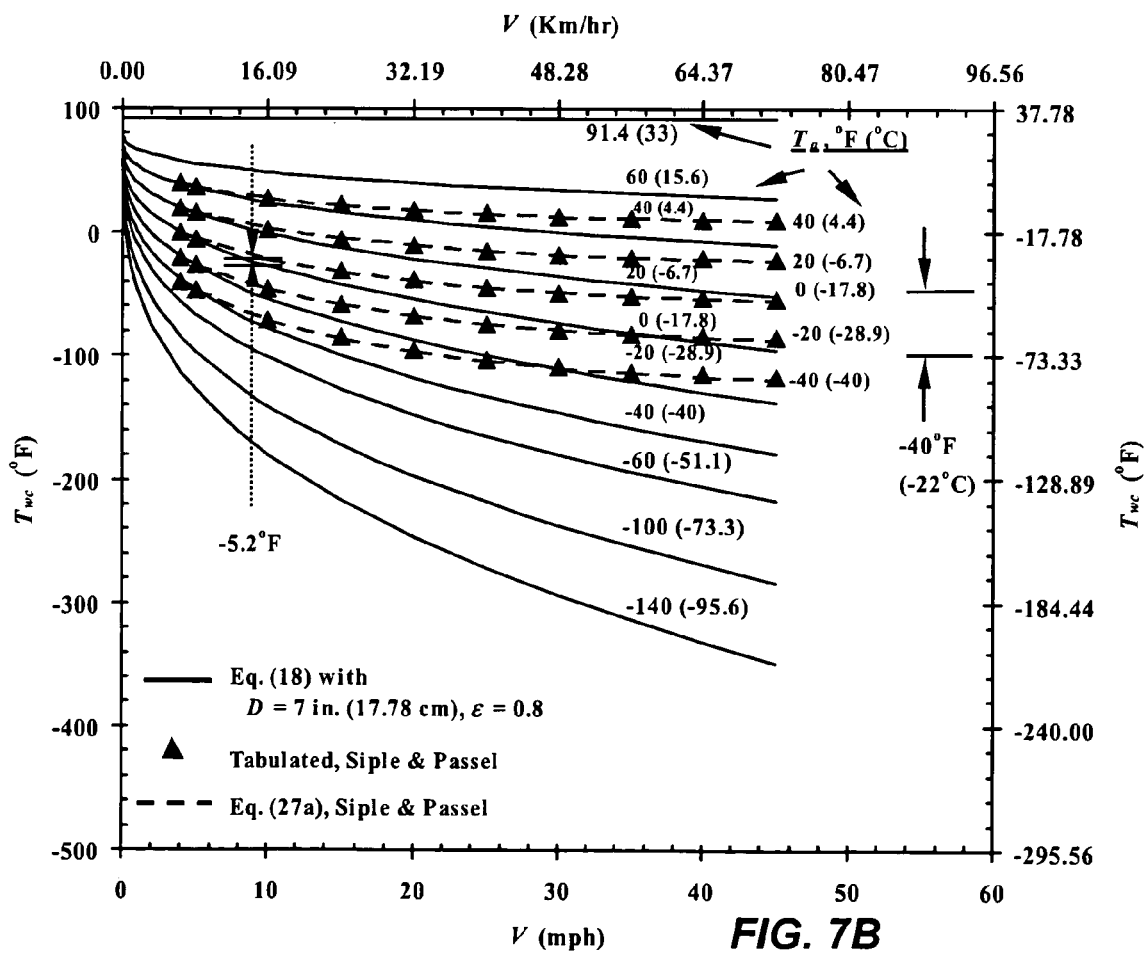
FIG. 7B is a graph comparing the Siple and Passel wind chill temperatures with those predicted by the wind chill model of the present invention for the simulated head.

The wind chill temperature was then calculated for the head (D=7 in.) using the $h_{fc}$ (curve 2) from FIG. 7B. FIG. 7B shows the difference between the wind chill temperature as predicted by the wind chill model of the present invention for the head with those obtained by Siple and Passel. The model predicts at $T_a$=0° F. and V=45 mph a wind chill temperature that is −40° F. (−22° C.) colder than that of Siple and Passel. At the same temperature, the wind chill model of the present invention predicts a temperature that is only −5.2° F. (−2.9° C.) colder at V=10 mph (16.09 Km/hr). The fact that the Siple and Passel values of $T_{wc}$ are only moderately warmer than the predicted values at the lower velocities may partly explain the usefulness of their values over the decades since they conducted their experiment. The fact that the Siple and Passel values of $T_{wc}$ are warmer than the actual values is contrary to previous criticism suggesting the opposite. This criticism was due to Siple and Passel's assumption that the skin temperature of 91.4° F. (33° C.) would remain constant during the time of exposure. This was a valid criticism, since this skin temperature would decrease from its initial value of 91.4° F. with increasing exposure time resulting in a decreased $T_{wc}$ as well. However, this criticism does not preclude the usefulness of the Siple and Passel values because they represent the maximum wind chill temperature an individual would experience during a very short exposure to the wind. This maximum value might be all the wind chill information an individual needs to refrain from a more sustained exposure that might lead to facial freezing.

Facial Temperature: No direct comparison of facial temperature as predicted by Eq. (22) was possible since no other model predictions of these temperatures were available. However, the predicted values showed good agreement with several sets of test data. The initial interest in the facial temperature stemmed from Siple and Passel's assumption of a constant body surface temperature which limited the determination of wind chill to individuals momentarily exposed to the elements. It does not apply when individuals are subjected to an extended exposure when the surface temperature must necessarily decrease. Bluestein and Zecher in their calculations of a more accurate wind chill considered the time dependency of this temperature. Aside from their correction of this constant surface temperature, Bluestein and Zecher presumably made other corrections to what they and numerous investigators have referred to as the flawed Siple and Passel experiment. The inference was that these flaws introduced error or somehow invalidated the experiment's results. Looking at each of these flaws, the simple human error of misidentifying the heat transfer coefficient as a cooling rate does nothing to invalidate the results. Neither does a particular curve fit of the data invalidate the data upon which it was based. Granted the data itself had inaccuracies, which seem to have been due to conditions beyond the control of the experimenters. Furthermore, it was stated that Siple and Passel ignored thermal gradients through the water and the container and did not consider the difference between radiation and convection heat loss. It should be obvious that in their experiment these gradients naturally developed, and that the radiative and convective heat transfer actually took place as part of the whole thermal process of container cool-down. The fact that these gradients and heat losses were an inherent part of the experiment makes the claim that they were not considered totally irrelevant. One concludes from all this that the only valid flaw was Siple and Passel's assumption of a constant body temperature during the entire exposure time.

Figure 8:
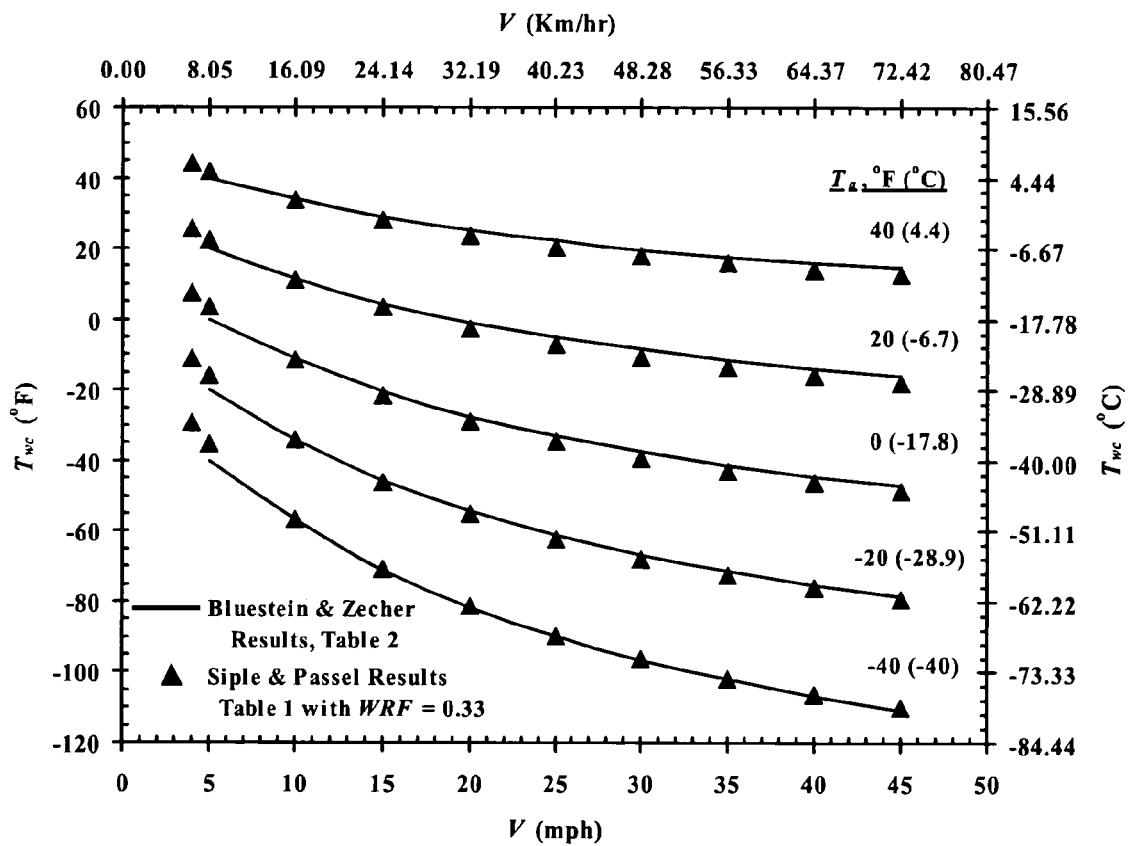
FIG. 8 is a graph comparing the Bluestein and Zecher results with those of Siple and Passel.

Bluestein and Zecher's development of a more accurate wind chill model was intended to correct the flaws in the Siple and Passel experiment. They recognized the fact that Siple and Passel's assumption of a constant 91.4° F. (33° C.) facial temperature would lead to a lower (colder) wind chill temperature than that which would actually exist. Their iterative heat transfer analysis of the surface of a cylinder simulating the human head provided a means of computing this temperature as it decreased with exposure time. Consequently, their results would have been expected to yield considerably higher (warmer) wind chill temperatures than those of Siple and Passel. But this was not the case. This can be verified by a comparison of the tabulated results in Bluestein and Zecher's paper. Table 1 of their paper shows the Siple and Passel wind chill temperature from Eq. (27a) based on their assumption of a constant 91.4° F. facial temperature. Table 2 of their paper shows the final Bluestein and Zecher results based on a varying facial temperature. These Table 2 results also include a wind reduction factor (WRF) of 0.33 to account for the fact that the NWS 10 m velocity was assumed to be 50% greater than that at head level. The portion of these Table 2 results that can be attributed to the varying facial temperature can be determined by removing the wind reduction effects from these results. This can be done for a given temperature ($T_a$) and velocity (V) by using the WRF of 0.33 to reduce the velocity in Eq. (27a) and then comparing the computed wind chill temperature with the corresponding value at the same $T_a$ and V in Table 2. The difference in these values reflects what Bluestein and Zecher found as an increase or moderation in the wind chill temperature as a result of the facial temperature variation. For example, consider the case where $T_a$=−40° F. and V=40 mph. Using a WRF=0.33 in Eq. (27a) yields a Siple and Passel value of $T_{wc}$=−105.97° F. The corresponding Bluestein and Zecher value in their Table 2 is $T_{wc}$=−106.7° F. This slight difference of −0.73° F. is not even a moderation but rather a decrease in the wind chill temperature. For all other combinations of $T_a$ and V, the Bluestein and Zecher results show, at most, a 2° F. moderation in the wind chill temperature. Consequently, without any wind reduction, the Siple and Passel and Bluestein and Zecher results are nearly identical, as illustrated in FIG. 8.

This means that the Bluestein and Zecher results reflect a negligible moderation in the wind chill temperature due to a decreasing facial temperature. Assuming Bluestein and Zecher's calculations of the decreasing facial temperature are correct, then their choice of the Churchill-Bernstein forced convection equation may have been the reason that their results show this negligible moderation. Bluestein (1998) chose the Churchill-Bernstein equation because it was appropriate for the Reynolds and Prandtl numbers that existed during the Siple and Passel experiment, see Bluestein, M., "An evaluation of the wind chill factor: its development and applicability", J. of Biomech. Eng., Vol. 120, pp. 255-258, 1998. Perhaps the choice of the Churchill-Bernstein equation was influenced by the fact that this equation yields values of the forced convection coefficient that are nearly identical to those of Eq. (6) in Oscevski's paper. Oscevski had already shown that in applying Eq. (6) to the Siple and Passel cylinder he achieved good agreement with his own test data as shown by curves 3 and 4 in FIG. 6A. But curve 4 shows Oscevski's prediction of what the Siple and Passel coefficients should have been and not what they actually were (curve 1). Consequently, had Bluestein and Zecher used the Siple and Passel coefficient (curve 1) rather than the Churchill-Bernstein equation in their analyses, they might well have seen the real effect of decreasing facial temperature on $T_{wc}$ in their Table 2 results. Choosing the Churchill-Bernstein equation actually resulted in convection coefficients that were significantly higher than those in the Siple and Passel experiment. This resulted in an even greater increase in convective cooling, relative to the actual Siple and Passel cooling (curve 1) and may have resulted in a wind chill temperature decrease that was almost equal to the wind chill temperature increase due to the facial temperature decrease. If this was the case, then Bluestein and Zecher's usage of the Churchill-Bernstein equation and possibly correct calculations of the time varying facial temperature ended up with essentially the same wind chill temperatures as Siple and Passel did 60 years ago. The only moderating effect shown by Bluestein and Zecher's results is that due to their incorrect assumption of a constant WRF for all combinations of ambient temperature ($T_a$) and wind velocity (V). This blanket assumption is tantamount to saying that the same WRF of 0.33 applies to each and every individual throughout the entire weather report listening area. As shown below, this is a crucial error since a WRF=0.33 will almost never occur. The fact that the Bluestein and Zecher results which show virtually no change in the wind chill temperature with exposure time, meant that their facial temperature results would not provide the expected comparison with the definite facial temperature decrease predicted with Eq. (22).

Predicted facial temperatures using Eq. (22) were verified using the computed and measured facial temperatures found by Adamenko and Khairullin, by Buettner (1951), by LeBlanc, J., Blais, B., Barabe, B. and Cote, J., "Effects of temperature and wind on facial temperature, heart rate, and sensation", J. Appl. Physiology, Vol. 40, No. 2, pp. 127-131, 1976, (hereinafter, LeBlanc et al. (1976)), by the inventors through home freezer experiments and those found during a Discovery Channel™ experiment. The previously discussed experiment by Adamenko and Khairullin, which was conducted in northern Russia, was extensive in that it consisted of instrumenting three facial components (cheeks, nose, ears) on 40 people during their exposure to temperatures ($T_a$) ranging from 10° C. to −40° C. (50° F. to −40° F.) and wind velocities (V) up to 15 m/s (33.55 mph). The temperature of each component after a half to one hour was expressed in terms of the ambient temperature and wind velocity. In each case, the component temperature was 33° C. (91.4° F.) prior to exposure. These test data provided information on facial temperature variation and the ambient conditions when facial freezing would occur. This information was expected to be useful in determining the exposure time when facial freezing occurs, since this facial freezing time is a key element in our model that makes the concept of wind chill temperature less subjective.

The results of the Adamenko and Khairullin experiment were described by Schaefer, J. T., "The effect of wind and temperature on humans", National Weather Service, Central Region Technical Attachment 88-05, pp. 1-2, 1988, as further described in Schwerdt, R. W., "Letters to the editor", Bull. Amer. Meteor. Soc., Vol. 76, No. 9, pp. 1631-1636, 1995. Schwerdt made a convincing argument for informing the listening public of the relationship between the wind chill temperature and facial freezing. The Adamenko and Khairullin results were presented as a least square equation of all measured temperatures for each of the three facial components in terms of the ambient conditions. An average of these equations provided an equation for the approximate facial temperature ($T_f$) after a half to a one hour exposure to the ambient conditions. This equation is, $$T_f = 0.4T_a - 3.3V^{0.5} + 16 \quad (28)$$

where the temperatures ($T_f$, $T_a$) are in °C. and the wind velocity (V) is in m/s. As an example, this equation shows that if the face is to cool down from 33° C. to a condition of facial frostbite ($T_f = 0°$ C.) within a one half to one hour exposure in calm conditions (V=0 m/s), then the ambient temperature must be $T_a = -39.9°$ C. It should be noted that Eq. (28) for the face temperature is similar to each of the three component equations in that they all differ only in the value of the constant. These values are 19, 17, and 12 for the cheek, nose, and ear, respectively; the lower the value, the more readily the component freezes. Adamenko and Khairullin concentrated their efforts on determining the nose temperature, because the nose is more difficult to protect than the cheeks and the ears, and consequently is more vulnerable to freezing. The use of Eq. (28) for the face temperature, where the constant (16) is slightly less than that for the nose (17), provides a degree of conservatism in that it forewarns of the possibility of freezing before it is likely to occur.

Figure 9:
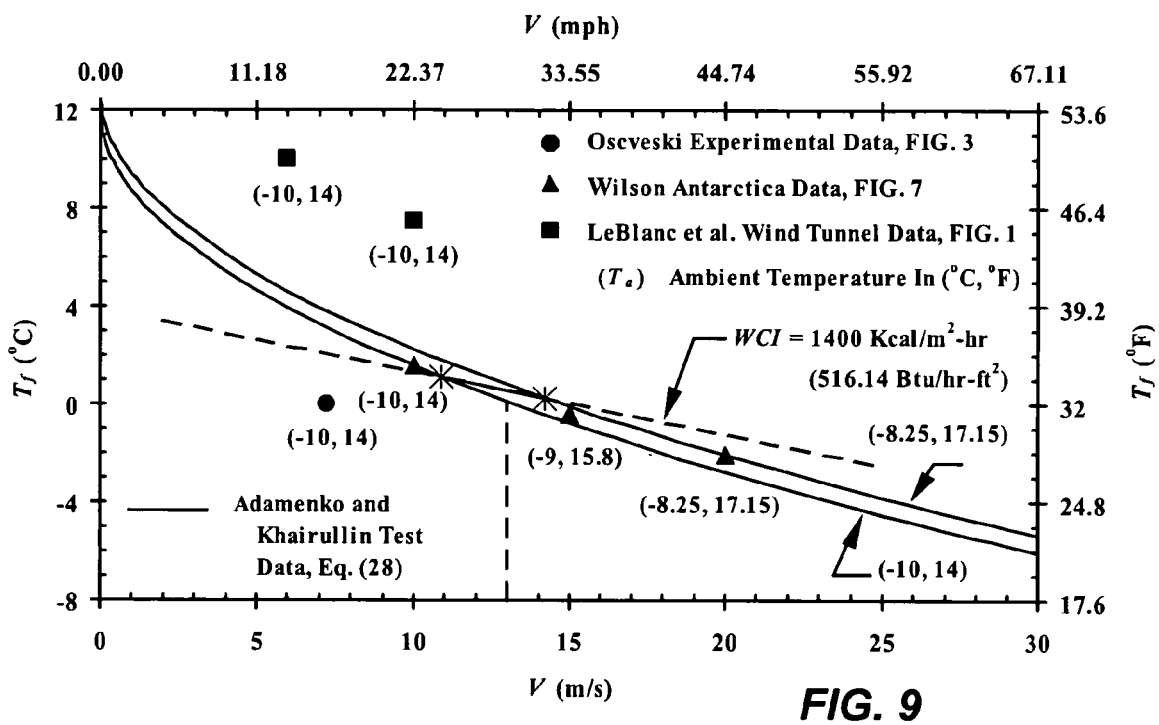
FIG. 9 is a graph of experimental data on facial temperatures ($T_f$) as a function of ambient temperature and wind velocity.

FIG. 9 is a plot of Eq. (28) for two ambient temperatures (−10° C. and −8.25° C. (14° F. and 17.15° F.)) and shows the relationship between the facial temperatures as predicted by Adamenko and Khairullin with the experimental results of Osczevski, LeBlanc et al. (1976), and Wilson, O., "Cooling effect of an Antarctic climate on man: With some observations on the occurrence of frostbite", Norsk Polarinstitutt, Skrifter N R. 128, pp. 26-30, 1963, (hereinafter, Wilson (1963)). These temperatures (−10° C., −8.25° C.) were selected because they span the temperature range of all three sets of experimental results. Consider the case where the ambient temperature is −10° C. in Eq. (28). It shows that the face at an initial temperature of 33° C. (91.4° F.), when exposed to a wind speed of 13 m/s (42.65 ft/s), will cool down to the facial freeze condition of 0° C. (32° F.) in a one half to one hour period. Under calm conditions (V=0 m/s), the face will cool down to 12° C. (53.6° F.) over the same time period. At this same ambient temperature, (−10° C.), Osczevski's facial cooling model shows facial cooling to the 0° C. temperature at a reduced speed of 7.25 m/s (23.79 ft/s). At the same ambient temperature (−10° C.) and at wind tunnel velocities of approximately 6.0 m/s and 10 m/s (19.68 ft/s to 32.81 ft/s), LeBlanc et al. (1976) obtained nose temperatures of 10° C. and 7.5° C. (50° F. and 45.5° F.), respectively. These slightly higher temperatures may have been due to the relatively short 10 min. of exposure time experienced by each of their subjects to the simulated ambient conditions at the wind tunnel exit. The three Wilson (1963) data points at 10, 15, and 20 m/s (32.81, 49.21 and 65.62 ft/s) are just a few of the 69 events reported by Wilson during a Norwegian-British-Swedish Expedition to Antarctica. Expressing these results in terms of the wind chill index (WCI) as defined by Siple and Passel in Eq. (27c), Wilson states that all these cases of freezing "have occurred at wind chill values between 1400 and 2100 Kcal/m²-hr (516.18 and 774.27 Btu/hr-ft²), at temperatures ranging from −8° C. to −46° C. (17.6° F. to −50.8° F.) which confirms the assumption of Siple and Passel that exposed flesh begins to freeze at a wind chill index of 1400 Kcal/m²-hr". Their assumption is clearly confirmed by Wilson's three points at 10, 15 and 20 m/s where the corresponding facial temperatures ($T_f$) are 1.56° C., −0.4° C. and −2.06° C. (34.81° F., 31.28° F. and 28.29° F.) and where all three of these temperatures are close to the freezing condition (0° C. (32° F.)) and all the points lie close to the superimposed WCI=1400 Kcal/m²-hr line. Osczevski concurs by noting that at this value of the index there is "danger of facial frostbite". One concludes from this that the facial temperatures based on the Adamenko and Khairullin test results are in good agreement with those obtained by Osczevski, Wilson (1963) and LeBlanc et al. (1976). As already noted by Schwerdt and as evidenced by one of the Wilson data points, actual facial freezing occurs closer to −2° C. (28.4° F.) than the presumed value of 0° C. This was remarkably demonstrated in December 2002 when American ocean swimmer Lynne Cox, clad only in a swimsuit, cap, and goggles, successfully swam 1.22 miles (1.96 Km) in 0° C. water off the coast of Antarctica without suffering any freezing of the skin. By assuming the 0° C. freezing point in our model, an additional degree of conservatism is added in that a warning of facial freezing can be made prior to its actual occurrence.

Equation (28) is expressed as follows in English units so as to put it in a more practical form for facial temperature calculations, $$T_f = 0.4(T_a - 32) - 3.97V^{0.5} + 60.8 \quad (29)$$

where in this equation, $T_f$ and $T_a$ are in ° F. and V is in mph. The initial facial temperature upon exposure to the wind is now 91.4° F. (33° C.). Equation (29) represents the face temperature after a half to one hour cool down from 91.4° F. at ambient conditions ($T_a$, V). Schwerdt notes that "The higher the wind speed, the faster (closer to a half hour than an hour) the skin will freeze, assuming all conditions except wind speed are equal". Consequently, for the higher wind speeds of interest in wind chill predictions, the facial temperature $T_f$ in Eq. (29) was assumed to be reached after a half hour of exposure. It should also be emphasized that although Eq. (29) permits the calculation of the face temperature after 30 min., it cannot be used to determine the temperature at some other time within this 30 minute interval. This is because the actual variation of the facial temperature with time is not linear as one might infer in an application of Eq. (29). Rather it is nonlinear and because of this nonlinearity, Eq. (22) for the surface temperature was developed using the conservation of energy principle. Before comparing the computed values of the facial surface temperature ($T_f$) from Eq. (22) with the Adamenko and Khairullin test results, a comparison was made with four other studies and experiments.

Figure 10:
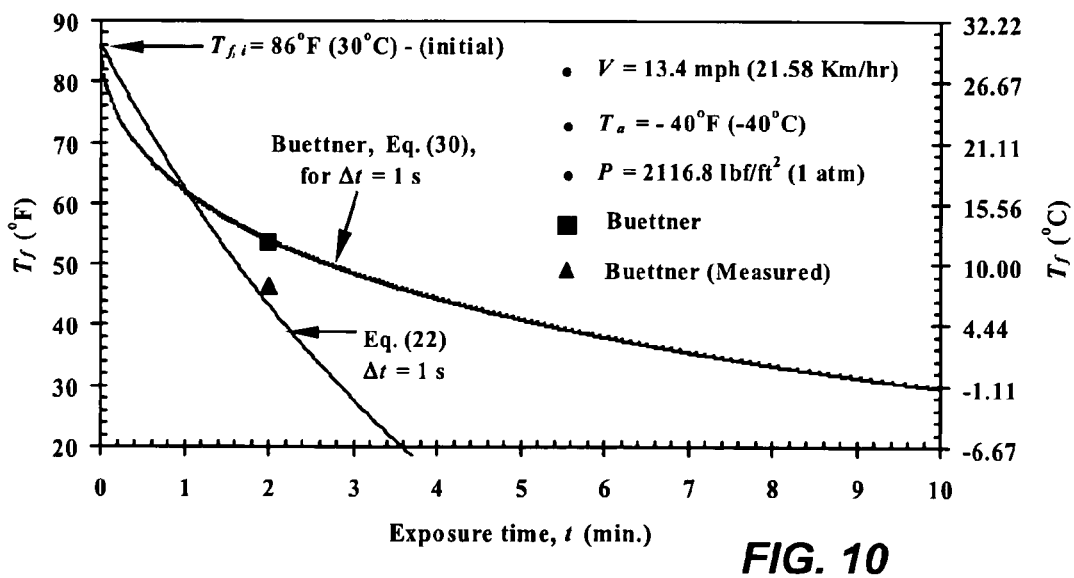
FIG. 10 is a graph comparing facial temperature ($T_f$) variation using Eq. (22) according to the present invention with the prior art Buettner results.

Buettner Study: A study by Buettner (1951) determined the temperature decay of warm bare skin when impacted by a cold stream of air. His expression for the decrease in temperature, here expressed as a facial temperature, is the classic solution for surface convection over a semi-infinite solid, that is, $$T_f = T_{CR} - (T_a - T_{CR})\left\{1 - \left[\exp\left(\frac{h^2 \alpha t}{k^2}\right)\right]\left[1 - \text{erf}\left(\frac{h\sqrt{\alpha t}}{k}\right)\right]\right\} \quad (30)$$

where the thermal diffusivity ($\alpha$) is $k/\rho C_p$, t is the time of exposure to the air stream of velocity V and h is the heat transfer coefficient. A time dependent calculation of this temperature was made for the case where the initial face temperature ($T_f$) was 86° F. (30° C.), where in the calculation of h, $T_a = -40°$ F. (−40° C.), V=13.41 mph (21.58 Km/hr), P=2116.8 lbf/ft² or 1 atm (sea level conditions) and where the values of $\rho$ and $C_p$ were the same as those used in the derivation of Eq. (22). With the forced convection coefficient, h=7.16 Btu/hr-ft$^2$-° F. (40.66 W/m$^2$-° C.), for a cylinder in crossflow, the decay in facial temperature as shown in FIG. 10 was calculated. A computed point (■) on Buettner's curve represents a drop in the facial temperature ($T_f$) to 53.6° F. (12° C.) in 2 min. The single test point (▲) was a measured facial temperature noted by Buettner as having been recorded on a participant during a parachute drop. Included in FIG. 10 is the facial temperature decay curve computed from Eq. (22) in which only the forced convection heat loss was considered, so that a straightforward comparison could be made with Buettner's curve. The difference in the decay rate of the two curves is believed to be due to the fact that Buettner assumed a semi-infinite solid, while Eq. (22) was based on a cylinder. The fact that Eq. (22) is much closer to the test point (▲) than the Buettner curve demonstrates not only the correctness of treating the head as a cylindrical surface, but also verifies the capability of Eq. (22) to correctly predict the facial temperature.

Figure 11:
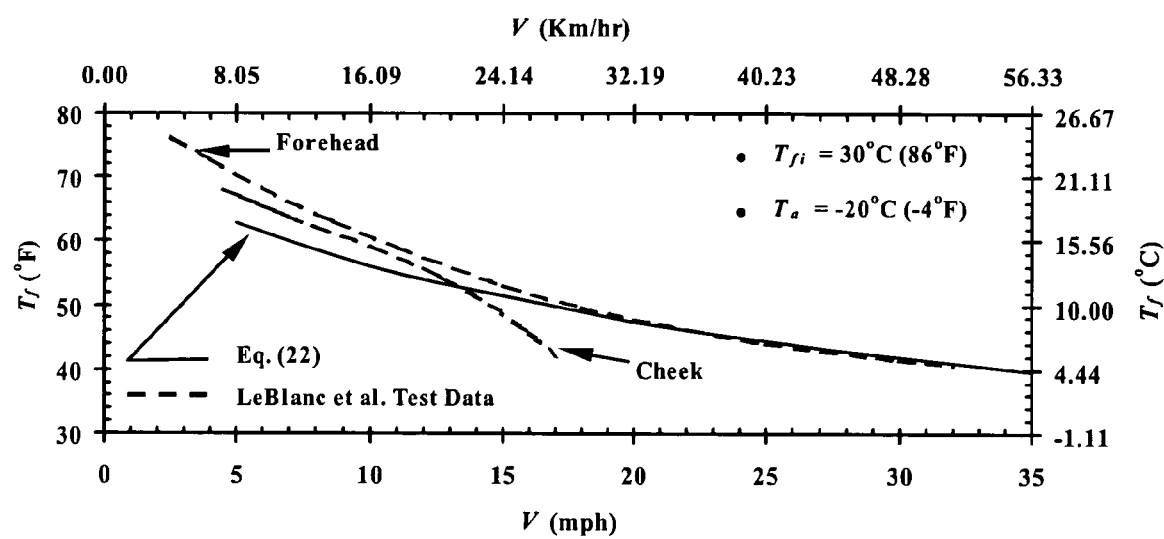
FIG. 11 is a graph comparing temperatures on the facial components as found by LeBlanc et al. of the prior art with the facial temperatures ($T_f$) as calculated from Eq. (22) according to the present invention.

Leblanc et al. Experiment: The second comparison was made with the results of a study conducted by LeBlanc et al. In this study, each of 25 subjects was placed at the end of a wind tunnel blowing air directly into their faces at a temperature of −20° C. to 24° C. (−4° F. to 75.2° F.) and at speeds up to 30 mph (48.28 Km/hr). In each case the initial face temperature ($T_{fi}$) was 30° C. (86° F.). After 10 min. of exposure to these conditions, temperatures were measured on the nose, forehead, and cheek. FIG. 11 shows the decay in the temperatures of the forehead and cheek as a function of wind velocity for the particular case where the air temperature was −20° C. (−4° F.). Also shown in FIG. 11 is the temperature decay calculated using Eq. (22) assuming only the presence of radiation and forced convection cooling. The rate of temperature decay as predicted by Eq. (22) is nearly identical to that of the forehead, quite possibly because the forehead presents a surface facing the wind that is more cylindrical than that of the cheek.

Home Freezer Experiments: The third comparison was made with the results of three home freezer experiments conducted by the inventors. In all of these experiments, different objects were used to simulate the human head. Each object was heated to an approximate temperature of the 91° F. to 92° F. (32.78° C. to 33.33° C.), this being the accepted temperature of the human face when suddenly exposed to a cold environment. The heated object was then placed in a freezer where the simulated ambient temperature ($T_a$) varied from −18° F. to 8° F. (−27.78° C. to −13.33° C.). Immediately upon placement in the freezer, the surface temperature ($T_s$) of the object and the freezer temperature were recorded at 5 minute intervals. Values of T, were plotted as a function of time (t), curve fitted and then compared with a surface temperature prediction using Eq. (22). In the absence of any air movement (V=0 mph (0 Km/hr)) within the freezer, Eq. (22) predicts the surface temperature only as a result of a radiation heat loss.

Figure 12A:
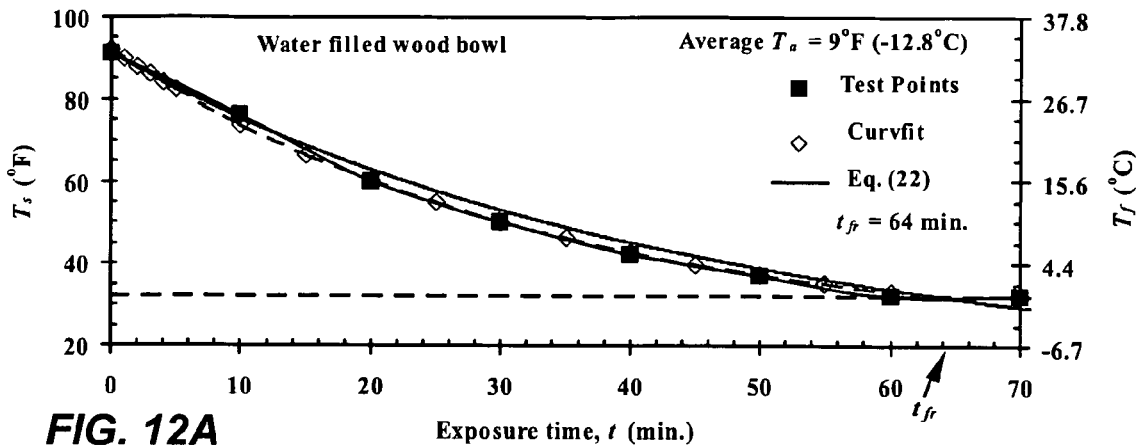
FIGS. 12A-C are graphs of the surface temperature ($T_s$) of a simulated head in home freezer experiments using a water-filled wood bowl, chicken, and pot roast, respectively.

In the first experiment, the head was simulated using a 10 in. (25.40 cm) diameter, 2.5 in. (6.35 cm) deep wooden bowl filled with 2.25 lbs (1.02 kg) of tap water heated to a temperature greater than 92° F. (33.33° C.). A thermometer was used to measure the water temperature 5 mm (0.0164 ft) below the water surface at the bowl center. When the water had cooled down to the desired 92° F. to 91° F. (33.33° C. to 32.78° C.) temperature range, the bowl was placed in the freezer and the water temperature ($T_s$) and the freezer temperature ($T_a$) were recorded in 5 minute intervals over a one hour time period. During this one hour period, the average freezer temperature was 9° F. (−12.78° C.), while the water surface temperature exhibited the decay shown in FIG. 12A. This decay in water temperature and a curve fit of these temperatures using the curve fit Eq. (30a) and coefficients of Table 4, below, are in excellent agreement with that predicted by Eq. (22), thus again confirming the latter's validity.

TABLE 4

Curve fit Eq. (30a) of surface temperature and equation coefficients for home freezer experiments
$T_s(° F.) = a + b \exp(-t/c)$ (30a)

| Coefficient | Experiment 1 Wood Bowl | Experiment 2 Chicken | Experiment 3 Pot Roast |
|---|---|---|---|
| a | 21.66167 | 32.845785 | 36.029454 |
| b | 70.427483 | 57.13337 | 50.681015 |
| c | 33.252072 | 20.349035 | 14.709987 |
| $r^2$ | 0.99647891 | 0.98806031 | 0.97708206 |

The water in the bowl froze at 60 min. after placement in the freezer. In these experiments where only radiation heat losses exist, the closed form solution for the time to freeze ($t_{fr}$), as shown in Eq. (25c), was used to determine the exposure time at the intersection of the Eq. (22) temperature decay curve with the surface freeze line ($T_s$=32° F. (0° C.)). In this case, $t_{fr}$=64 min. These results compare favorably with the actual 60 min. and support the capability of predicting the time to freeze using the closed form solution of Eq. (25c).

Figure 12B:
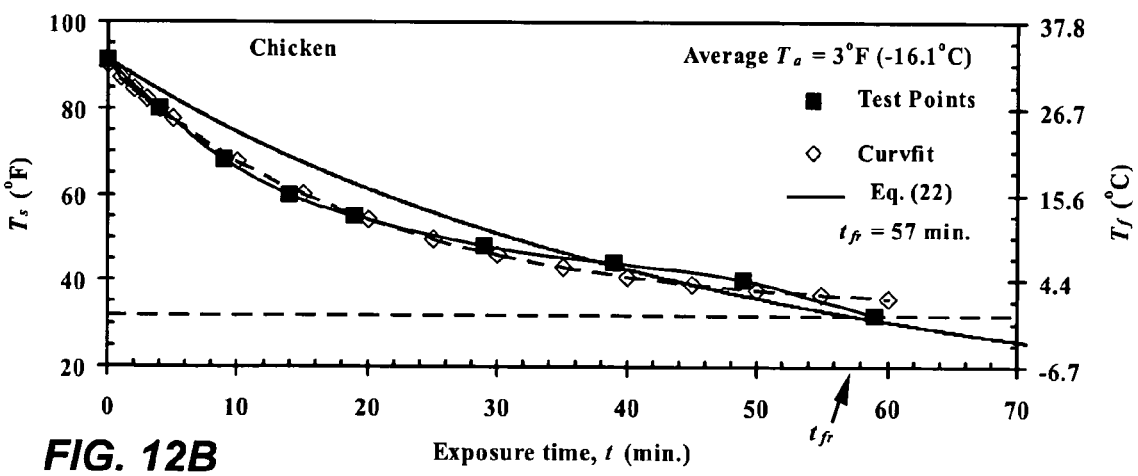
Figure 12C:
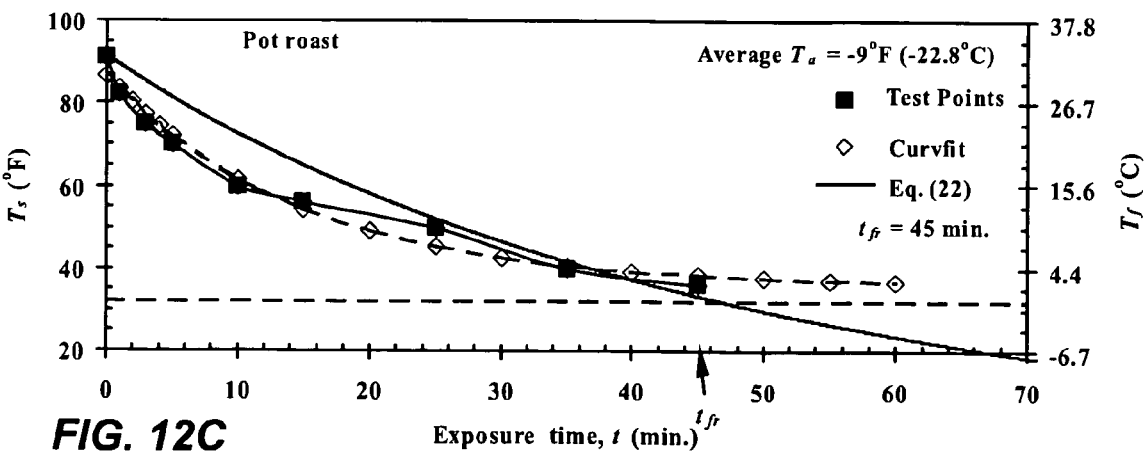

Two other similar experiments were conducted by simulating the head using food items (chicken, pot roast) that might be found in a home freezer. FIG. 12B shows the result of using a 5.6 lb (2.54 kg) chicken and FIG. 12C when using a 2.8 lb (1.27 kg) pot roast, each conditioned to a temperature between 92° F. and 91° F. before being placed in the freezer. Again the surface temperature and the freezer temperature were recorded at 5 minute intervals over a one hour period. During this one hour period, the average freezer temperatures were 3° F. (−16.11° C.) and −9° F. (−22.78° C.), respectively. These average freezer temperatures, surface temperatures from Eq. (22) and a curve fit of these surface temperatures are shown in FIG. 12B and FIG. 12C.

In each of these cases, the agreement with Eq. (22) is not as good as in the first experiment. The more rapid decrease in surface temperature is probably due to heat conduction through the outside surface of these meat products, whereas in the first experiment this was prevented by the insulative effect of the wood container. Even though neither of these cases seem to represent only a radiative heat loss, FIG. 12B does show that the actual freeze time of 59.5 min. as being very close to the value of $t_{fr}$=57 min. as calculated from Eq. (25c). This may have been the case in FIG. 12C also if the intercept point of the temperatures decay curve with the freeze line had been determined. Based on these three experiments, one may conclude that Eq. (22) likely represents an accurate expression for the facial temperature decay, irrespective of the number of heat processes involved, whereas Eq. (25c) has been shown to provide a good estimate of the time to freeze ($t_{fr}$) when only radiation losses exist.

Discovery Channel™ Experiment: The fourth comparison was made with the results of an experiment conducted for the Discovery Channel™ (2006) and described in an April 2006 show entitled "I Shouldn't Be Alive: Lost in the Snow." A subsequent program entitled "Science of Survival" described the experiences of a family who ventured into the wilderness in mid-winter became lost, stranded, and narrowly escaped with their lives in the bitterly cold environment. Because of the family's inexperience with survival techniques, the program illustrated the many survival measures that could have been taken to insure their survival.

The "Lost in the Snow" episode emphasized the importance of preventing a drastic drop in the body core temperature ($T_{CR}$) since a 13° F. drop can prove fatal. A dexterity test was conducted in a controlled, refrigerated chamber where the subject, Les Stroud a wilderness expert, sat clad only in shorts. The subject ingested a pill with a temperature sensor to transmit the body core temperature. During the test, the subject's skin and finger temperatures were monitored, the latter being important at the time when visually the subject might first suffer loss of dexterity.

The ambient temperature ($T_a$) in the chamber was 23° F. (−5° C.). For the first 30 min., the experiment was conducted in still air (V=0 mph). At 30 min., an air fan instantaneously increased the air speed to 5 mph (8.05 km/hr) for a period of 6 min. At that point, still air conditions were resumed. The test was continued at these conditions until the subject became extremely cold and uncomfortable.

The intent here was to compare the recorded time varying skin and finger temperatures with the predicted temperature using Eq. (22). There was an audible difficulty in gathering information off the video recording of the program plus the fact that essential information like the initial skin and finger temperatures was not provided. This resulted in an incomplete comparison of the measured and predicted skin temperature. For example, the 10° F. drop in finger temperature over a 15 minute period during the "still air" portion of the test and the measured 43° F. temperature at the end of the 40 minute test period quite clearly indicated that the initial finger temperature was close to the usual 91.4° F. This permitted a comparison of the measured and predicted finger temperature drop over the entire 40 minute test period. Such was not the case for the skin temperature. The first indication of skin temperature is the 81° F. at the end of the 30 minute "still air" portion of the test and its drop to 55° F. at the end of the 6 minute period when the velocity was 5 mph. No information was given on the initial skin temperature at the start of the "still air" portion. As a result, the only measured/predicted temperature drop comparison possible for the skin was during the 6 minute period.

Before the above comparison was made, it should be noted that one visual observation was supported by recorded data. The subject is shown to be shivering badly during the test. As discussed in the section METABOLIC HEAT GAIN ($q_b$) "Shivering is a thermoregulatory process through which the core temperature ($T_{CR}$) may be restored to its equilibrium or neutral value of 98.2° F. after a lowering." Since the core temperature was shown to remain constant during the test, a lowering of the core temperature must have taken place before the onset of shivering which restored it to its initial value.

Figure 13:
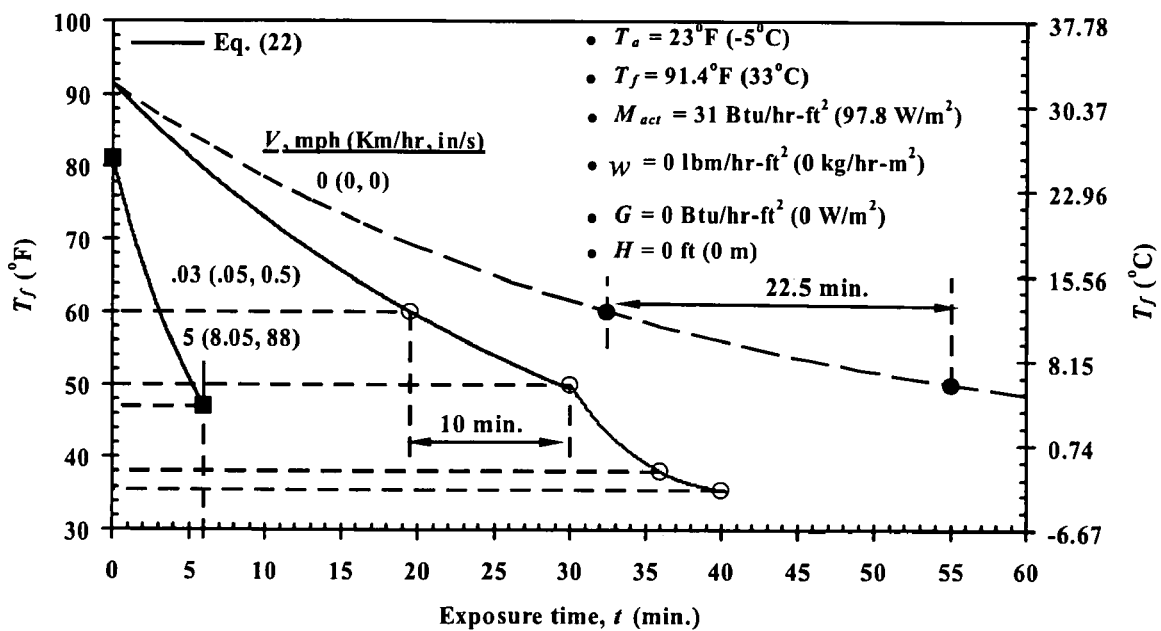
FIG. 13 is a graph of facial temperatures ($T_f$) as predicted from Eq. (22) with the Discovery Channel™ dexterity test results.

The recorded time varying finger temperatures were compared with the temperature decay curve using Eq. (22) with $T_a$=23° F., V=0 mph, $M_{act}$=31 Btu/hr-ft² since the subject was involved in minor physical activity with his hands and assuming the following: no evaporative cooling ($\dot{w}$=0), no solar heat flux (G=0), sea level conditions (H=0 ft) and an initial finger temperature ($T_f$) of 91.4° F. This temperature decay curve is shown as the dashed curve of FIG. 13. In "still air", it was noted from the measured temperatures that the finger temperature (●) dropped from 60° F. to 50° F. in 15 min. Projecting these points onto the dashed curve of FIG. 13, gives this time differential as 22.5 min. This larger time differential would be correct, if and only if, the subject was completely stationary. This is not quite true. As observed, the subject body may be stationary by sitting in a chair but the fingers were not stationary. The finger movements were needed to turn knobs and screws in sockets during the dexterity test. The subject's finger speed was estimated based on the observed movement of the subject's thumb and index finger while turning a screw into a socket. This finger movement speed was estimated to be 0.53 in./s (0.03 mph, 0.048 km/hr). With V=0.03 mph, a new temperature decay curve was calculated using Eq. (22). This curve lies to the left of the V=0 mph curve. Projecting the finger temperature (●) to the left onto this curve, they (○) are now 10 min. apart. Since the measured 10° F. temperature differential actually took place during the first 30 min. of the test, this curve shift to the left clearly demonstrates that the fingers were in motion. Because this temperature decay curve terminated at 30 min., a follow on section of the curve between 30 and 36 min. was calculated using Eq. (22) with an initial finger temperature ($T_f$) of 50° F. and V=5 mph. The final section of the curve between 36 min. and 40 min. was again calculated using Eq. (22) with the initial finger temperature of 37° F. at 36 min. and V=0.03 mph. The final finger temperature at 40 min. was found to be 35° F. Because Eq. (22) determined that the 10° F. temperature drop occurred over 10 min. rather than the actual 15 min. and because the final finger temperature was found to be 35° F. and not the actual 43° F., the predictions can only be considered fair. The lack of better agreement is attributed to a probable and unaccountable heat transfer between the subject's hands and the devices that he was attempting to manipulate.

The third curve of FIG. 13 is the result of applying Eq. (22) to determine the skin temperature (■) drop from 81° F. over the 6 minute period when V=5 mph. The predicted drop of 34° F. from 81° F. to 47° F. is again only a fair comparison with the actual 26° F. drop from 81° F. to 55° F. This difference between the predicted (34° F.) and the measured (26° F.) temperature drops may be explained by the fact that the skin temperature was being sensed at the external oblique of the abdomen which, being sheltered from the 5 mph wind via a table in front of the subject, would result in a smaller temperature drop.

Adamenko and Khairullin Experiment: Having established the validity of Eq. (22), it was then used to calculate values of $T_f$ after 30 min. for a comparison with the Adamenko and Khairullin values of $T_f$ from Eq. (29). In doing so, the values of H, $M_{act}$, $\dot{w}$, and G used in Eq. (22) had to be specified. Schwerdt notes that the Adamenko and Khairullin experiment was conducted in four Russian cities each at or near sea level. Thus, H was set equal to zero. The forty people instrumented were instructed to walk slowly during the test when the temperature on each of the facial components was recorded. Walking slowly suggests that the participants in the test were engaged in minimum physical activity. Therefore, the associated metabolic heat generation may be that for "walking about" as shown in Table 1, above, in which case $M_{act}$=31 Btu/hr-ft² (97.79 W/m²) was used in the calculation of the metabolic heat flow. For minimum physical activity, $\dot{w}$=0.00655 lbm/hr-ft² (0.032 kg/hr-m²) was used. The value of the solar radiation (G) during the test is unknown, although Adamenko and Khairullin stated that "[s]ufficiently intense solar short-wave radiation was also taken into account."

Figure 14A:
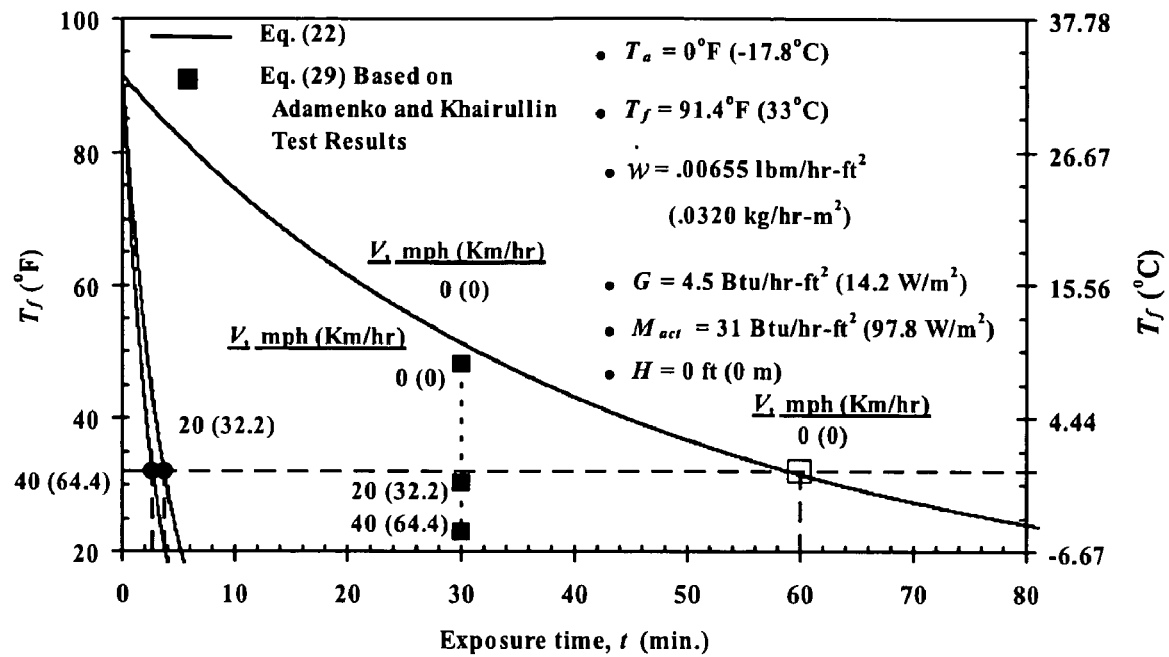
FIGS. 14A-B are graphs comparing the facial temperatures ($T_f$) as predicted from Eq. (22) with the prior art Adamenko and Khairullin test results for G=5 Btu/hr-ft² (15.77 W/m²) (FIG. 14A) and G=7.8 Btu/hr-ft² (24.61 W/m²) (FIG. 14B).

Since the value of G during their experiment is unknown, the approach taken here was to determine if an assumed value of G in Eq. (22) would, at a given ambient temperature ($T_a$) and a velocity (V), yield values of $T_f$ at 30 min. that are in reasonably good agreement with Adamenko and Khairullin values from Eq. (29). This approach was restricted by the fact that the selected value of G could not exceed the maximum value expected for the four Russian cities where the tests were conducted. Because the latitude at the Russian test sites was higher than that of the northernmost region (45°-50°) in the US, where G=37.78 Btu/hr-ft² (119.17 W/m²) in Table 2, the maximum value of G was estimated to be 32.0 Btu/hr-ft² (100.95 W/m²). Results of a calculation with an assumed value of G=5 Btu/hr-ft² (15.77 W/m²) are shown in FIG. 14A for the particular case where $T_a$=0° F. (-17.78° C.), V=0, 20 and 40 mph (0, 32.19 and 64.37 Km/hr). Included in FIG. 14A are the Adamenko and Khairullin results (■) from Eq. (29) shown plotted at the 30 minute exposure time. The immediate reaction when one views this figure is that there is no agreement between the two sets of results at the two higher velocities (20 mph, 40 mph (32.19 Km/hr, 64.37 Km/hr)). Schwerdt, in commenting on the Adamenko and Khairullin results, stated that at the higher wind speeds the skin will freeze "closer to a half hour than an hour". This is shown in FIG. 14A where the two Adamenko and Khairullin values (■) for 20 mph and 40 mph (32.19 Km/hr and 64.37 Km/hr) lie fairly close to the freeze line ($T_f$=32° F. (0° C.) at the 30 minute exposure time. But, this is far different from the results using Eq. (22), which shows freeze times of less than 4 min. for both of these speeds. The very rapid increase in the rate of decay of the facial temperature as velocity is increased from 0 mph to 40 mph (0 Km/hr to 64.37 Km/hr) suggests the possibility that the Adamenko and Khairullin measurements failed to detect this sensitivity to velocity. Perhaps this led to their conclusions that the freeze times at these two higher velocities would be 30 min. rather than the more exact time of less than 4 min. On the other hand, Schwerdt noted that at the lower speeds, V=0 mph (0 Km/hr) in the present case, the Adamenko and Khairullin results would predict freezing closer to the one hour period rather than the one half hour period. This is clearly demonstrated in FIG. 14A by the fact that the V=0 mph curve not only passes close to the V=0 mph (■) point at t=30 min., but actually passes exactly through the V=0 mph (□) point at t=60 min. This would seem to confirm Schwerdt's statement of "closer to one hour than one half hour" and would seem to prove at least a partial agreement with these test results. However, G=5 Btu/hr-ft² (15.77 W/m²) would not seem to reflect the "intense solar short-wave radiation" that existed during the tests. Perhaps it represents a greatly reduced solar radiation on a cloudy day as opposed to the assumed maximum solar radiation on a clear day. Intense solar radiation would logically seem to be a value near the assumed maximum value of 32 Btu/hr-ft² (100.95 W/m²). But if G were increased from 5 to 32 Btu/hr-ft² (15.77 to 100.95 W/m²), the V=0 mph curve would be displaced increasingly upward and away from the freeze line ($T_f$=32° F.).

Figure 14B:
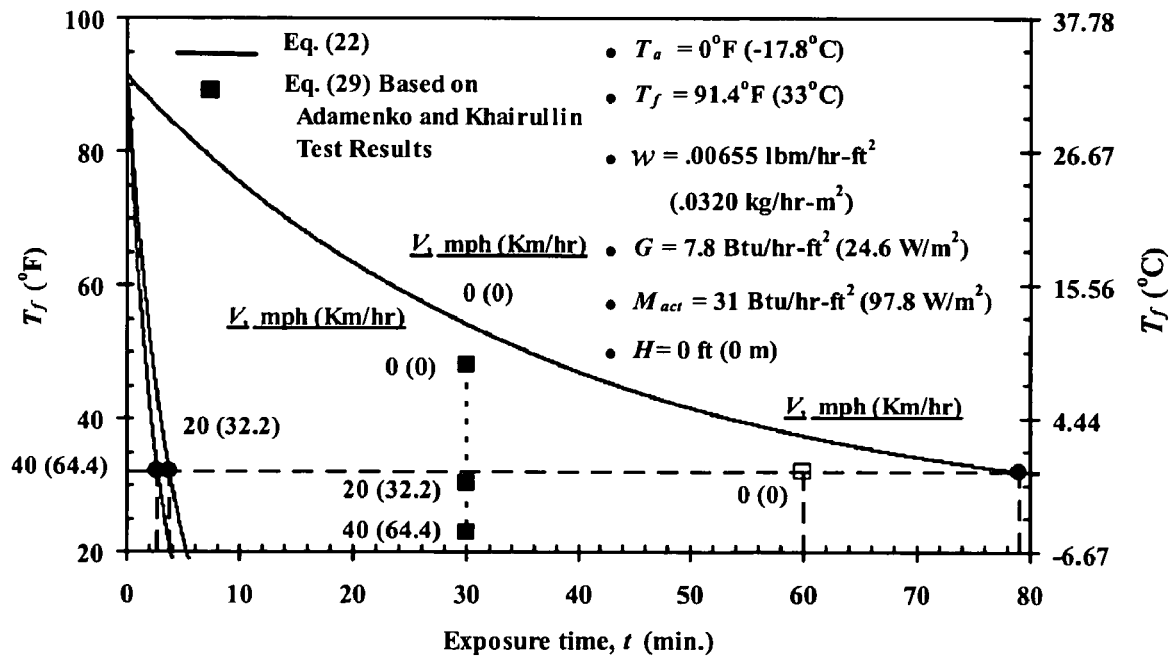

FIG. 14B, with G=7.8 Btu/hr-ft² (24.61 W/m²), represents what is probably the near maximum value of G, whereby the resulting freeze time of 79 min. can still be called close to the V=0 mph (□) point at t=60 min. Since this slight increase in G from 5 to 7.8 Btu/hr-ft² left the differences between the two results virtually unchanged at the two higher velocities, one concludes that if any agreement exists with the Adamenko and Khairullin test results concerning the exposure time, it is only at calm (V=0 mph) conditions and then only if the tests were conducted under overcast conditions, or if sunshine was intermittent and not continuous during the tests.

With Eq. (22) validated, it can be combined with Eq. (18a) to determine the time variation in the wind chill temperature experienced by an individual during an extended exposure. Consider an individual that is exposed to ambient conditions of $T_a$=0° F. (-17.78° C.) and V=20 mph (32.19 Km/hr). Assume the absence of sunshine ($q_s$=0). Realistically, the evaporative heat loss ($q_e$) and the metabolic heat gain ($q_b$) are always present. In view of making a cursory comparison with the Bluestein and Zecher results, it was also assumed that $q_e$=$q_b$=0.

Figure 15:
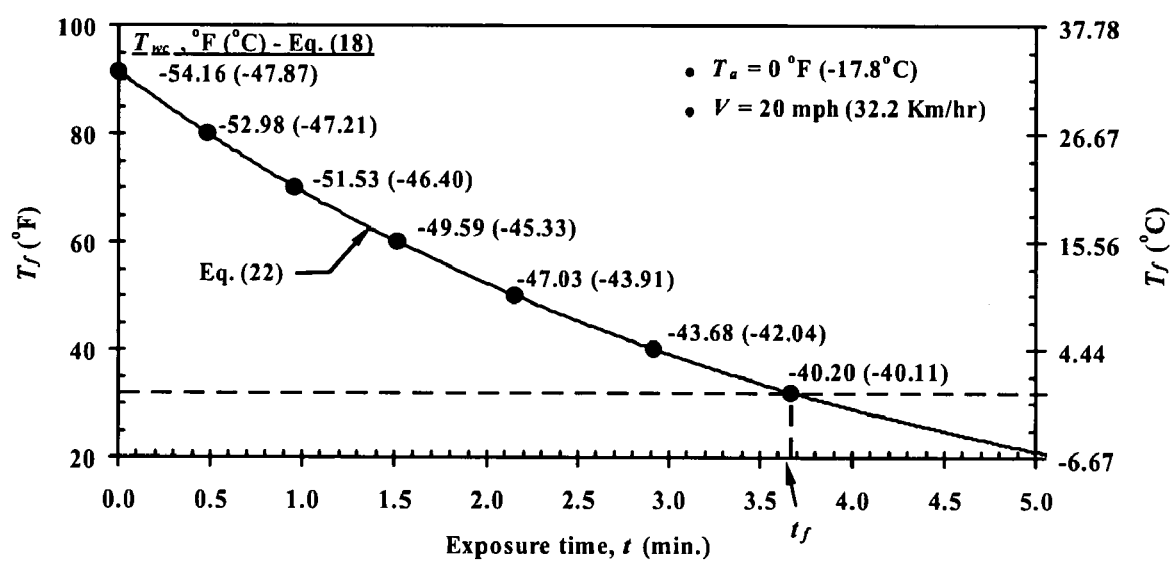
FIG. 15 is a graph of facial temperature ($T_f$) and wind chill temperature ($T_{wc}$) as a function of exposure time.

FIG. 15 shows the decay in facial temperatures ($T_f$) with exposure time as calculated from Eq. (22). At selected facial temperatures along this curve, the wind chill temperature ($T_{wc}$) was calculated from Eq. (18a). The results of FIG. 15 show a very significant warming of the wind chill temperature as the facial temperature decreases. By definition, the exposure time when the facial temperature has decreased to 32° F. (0° C.) is called the time to freeze ($t_f$). In this case, where $t_f$=3.67 min., the wind chill temperature has increased, that is moderated, from its initial value of -54.16° F. to -40.20° F. (-47.87° C. to -40.11° C.) for an increase of 13.96° F. (7.76° C.). An anticipated moderation such as this in the Siple and Passel values of the wind chill temperature seems to have been the motive behind the development of the Bluestein and Zecher model. Unfortunately, the Bluestein and Zecher wind chill model failed to show any measurable amount of moderations as indicated by the comparison in FIG. 8.

Time to Freeze: In addition to providing a more precise prediction of the wind chill temperature ($T_{wc}$), a key feature of the wind chill model of the present invention is its capability of determining the exposure time when facial freezing will occur. The wind chill temperature, although a true sensed temperature, becomes subjective in nature, since individuals may differ greatly in their discernment of its actual magnitude. For example, an individual is probably more likely to detect the difference between two warmer wind chill temperatures like 30° F. (-1.11° C.) and 15° F. (-9.44° C.) than two colder and potentially more dangerous ones like -20° F. (-28.89° C.) and -40° F. (-40° C.). When the time to freeze ($t_f$) is specified along with the wind chill temperature, it frees the individual from having to be concerned with the actual value of the temperature. Instead it becomes a warning to the individual of a limiting time after exposure when facial freezing will occur. It has the added benefit of allowing the individual to preplan outdoor activities so as not to exceed this time limit. This was the basis for developing the time to freeze expression of Eq. (24).

There is no known experimental data or any existing equation for facial freezing time against which the predictions of Eq. (24) can be compared. However, actions taken by some contestants in the World Downhill Ski Championships during the 2003/2004 racing season confirmed the validity of Eq. (24) through the use of Eq. (22), from which it was derived. These races were conducted in the European Alps at what was considered a colder than normal temperature ($T_a$), believed to have been less than 10° F. (-12.22° C.). On this course, the contestants reached a velocity (V) of 80 mph (128.74 Km/hr) in about 6 seconds after leaving the starting gate. The total time to run the course was expected to be just under two min. The local racers, who were familiar with the course, were apparently aware from past experiences of the possibility of facial freezing under these conditions ($T_a$, V). As a result, these racers took precautions to prevent or minimize freezing by applying tape strips to their faces. At the finish line, none of the racers appeared to have experienced frostbite. The warming effect of sunshine could not have been a factor in the absence of frostbite, since the race course was in the shadow cast by the mountain. Altitude, which will be shown later to have the effect of delaying facial freezing, may have had some effect. The average altitude was estimated to be 8,000 ft (2,438.43 m) based on an estimated altitude of 10,000 ft (3,048.04 m) at the starting gate and a 4,000 ft (1,219.21 m) elevation drop to the finish line. The very strenuous activity of racing downhill at a speed of 80 mph would generate a higher than normal metabolic heat flow rate to the face, and that might have had a slight effect on forestalling frostbite.

Table 1, above, shows the normal heat generation ($M_{act}$) for downhill skiing as 96 Btu/hr-ft² (302.84 W/m²) and that for cross-country skiing as 83 Btu/hr-ft² (261.83 W/m²). The average velocity of a non-racing downhill skier might be 25 mph (40.23 Km/hr), whereas that for a cross-country skier might be 3 mph (4.83 Km/hr). It is postulated that the metabolic heat generation varies as the square of the velocity, so that 2 VdV/d$M_{act}$=[2(14)(25−3]/(96−83)=47.38 (mph)² (hr-ft²/Btu)=3.669×10⁵ ft⁴/Btu-s (3 m⁴/J-s). With this gradient, the metabolic heat generation for the downhill racer would be $M_{act}$=217.89 Btu/hr-ft² (687.35 W/m²). This value is much larger than that (96 Btu/hr-ft² (302.84 W/m²)) for the more casual, non-racing downhill skier because of the much greater muscle exertion required to execute direction changing at the higher speed. Finally using the guidelines previously set forth, the racers' evaporation flux rate would be $\dot{w}$=0.02183 lbm/hr-ft² (0.1066 kg/hr-m²), which, although a maximum, most certainly did little to enhance the possibility of frostbite.

Figure 16:
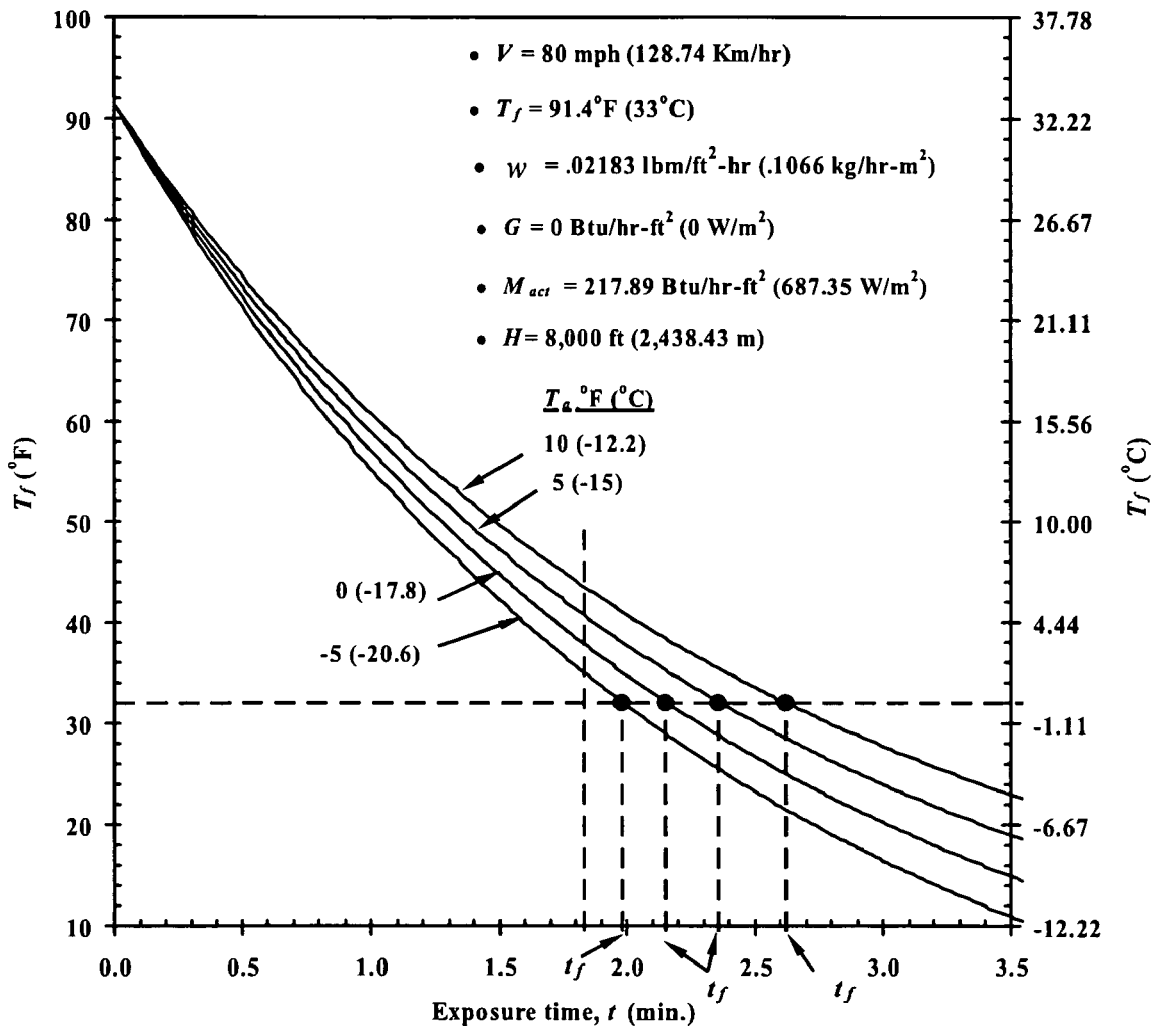
FIG. 16 is a graph of facial temperature ($T_f$) decay for skiers in the World Downhill Ski Championship 2004.

None of the racers experienced facial freezing upon completion of the race at about 1 minute 50 seconds (1.83 min.), including the locals who anticipated this possibility. FIG. 16 shows the results of calculating the facial temperature decay curves for the ski racers using Eq. (22) and the above set of conditions: V=80 mph, −5° F.<$T_a$<10° F. (−20.56° C.<$T_a$<−12.22° C.), G=0 Btu/hr-ft², H=8,000 ft (2,438.43 m), $M_{act}$=217.89 Btu/hr-ft² and $\dot{w}$=0.0283 lbm/hr-ft². The results show that at the finish line, at t=1.83 min., none of the racers would have been expected to experience facial freezing over this temperature range, and none did. The belief of the local racers that freezing could have occurred was justified. For example, if the ambient temperature had been $T_a$=0° F. (−17.78° C.) and if a racer had experienced some misfortune on the course, causing his arrival at the finish line to be 19 seconds later at 2.15 min., he would have experienced facial freezing. But a time increment of 19 seconds is not what would be expected in a race of this nature from a group of world-class racers. Now if the temperature had been $T_a$=−5° F. (−20.56° C.), then the freezing time would be $t_f$=1.98 min., which is only 0.15 min. or 9 seconds past the nominal completion time (1.83 min.). A 9 second variation in a competitor's completion time is entirely possible, and could have been the basis for the concern expressed by the local racers. Thus, the actual ambient temperature may have been close to −5° F. (−20.56° C.). This example further demonstrates the usefulness and the apparent accuracy of Eq. (22) to calculate the facial temperature ($T_f$) and consequently Eq. (24) to calculate the time to freeze ($t_f$).

Figure 17:
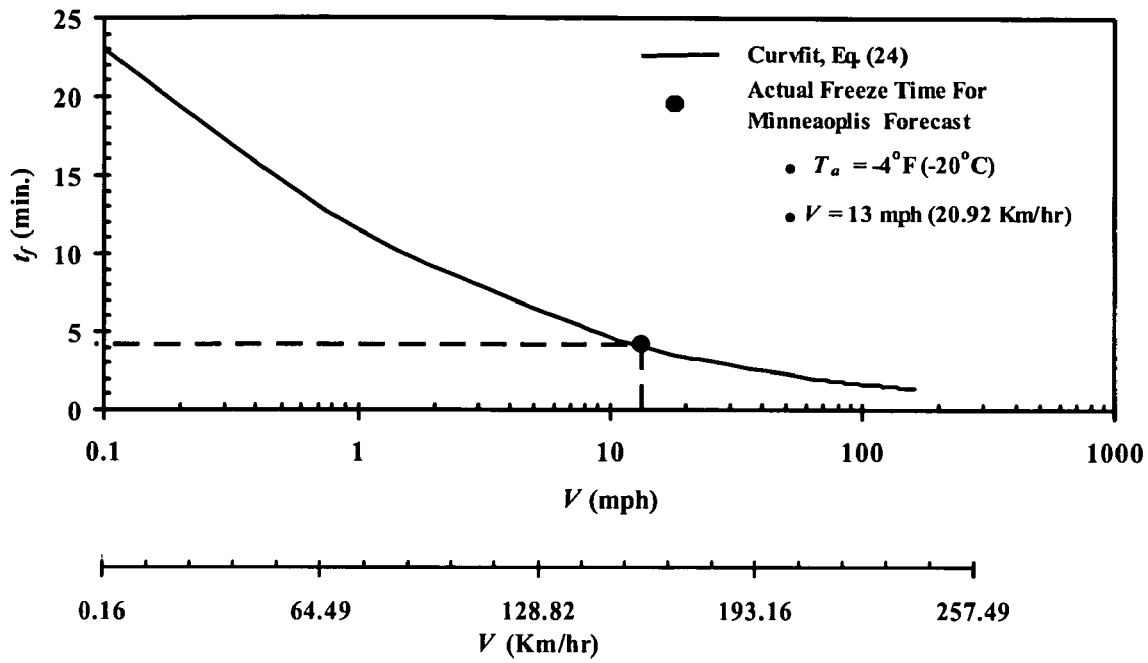
FIG. 17 is a graph for determining the actual time to freeze ($t_f$) for a Minneapolis weather forecast.

Having verified Eq. (24), a prediction of the time to freeze using this equation was compared against two existing approximations. A case in point was the pre-dawn weather forecast for the morning of Jan. 5, 2004 in Minneapolis, Minn. The weather conditions were stated as $T_a$=−4° F. (−20° C.), V=13 mph (20.92 Km/hr) with a $T_{wc}$=−23° F. (−30.56° C.), the latter correctly being the value of wind chill temperature from the current wind chill model. Intended to warn people walking to and waiting at bus stops during the dark morning hours of the potential severity of this $T_{wc}$, the comment was made that under these conditions "freezing would occur in 30 min.". This comment suggests the meteorologist's familiarity with an equation like Eq. (29) which, as previously discussed, expresses facial temperature ($T_f$) after 30 min. of exposure to a given set of ambient conditions ($T_a$, V). Because the above values of $T_a$=−4° F. and V=13 mph in Eq. (29) result in a facial temperature of exactly 32° F. (0° C.) after 30 min., the comment was likely made to warn the listeners of the possibility of facial freezing, should their exposure time equal or exceed 30 min. Unfortunately, this was misleading advice for two reasons. First, Eq. (29) was derived from the Adamenko and Khairullin test results where their experiment was conducted under partially sunny conditions. Consequently, Eq. (29) would reflect an increase in the facial freezing time ($t_f$) as a result of solar radiation. Since sunshine was absent during the dark morning hours, a freezing time of 30 min. would be expected to be an over-prediction. Secondly, as the results of FIG. 14 have shown, the Adamenko and Khairullin results (■) overpredict the time to freeze as velocity increases from the calm (V=0 mph) condition. Therefore, at V=13 mph the time to freeze would be expected to be much less than 30 min. In fact, this was the case, because the actual freezing time in the Minneapolis forecast based upon computed values using Eq. (24) and shown in FIG. 17 was $t_f$=4.15 min. This statement of a possible 30 minute freeze time was obviously made with good intentions of warning the listening public. However, incorrectly stating a possible freezing time that is so much larger places the public at greater risk by minimizing the urgency to avoid critical exposure.

Aside from using Eq. (29) to determine the freezing time, the Minneapolis meteorologist could have used an equation developed by Environment Canada (2002) to approximate the "min. to frostbite" for 5% of the population that is most susceptible to frostbite. The equation is, $$t_f = \{[-24.5(0.667V+4.8)]+2111\}(-4.8-T_a)^{-1.668} \quad (31a)$$

where $T_a$ is in ° C. and V is in km/hr. The equation is limited to −50° C.≦$T_a$≦15° C. (−58° F.≦$T_a$≦59° F.) and 20 km/hr≦V≦80 km/hr (12.43 mph≦V≦49.71 mph). Expressed in English units, the equation is, $$t_f = \{[-24.5(1.067V+4.8)]+2111\}(12.978-0.556T_a)^{-1.668} \quad (31b)$$

where $T_a$ is in ° F. and V is in mph. With the weather forecast conditions of −4° F. and V=13 mph, Eq. (31b) predicts the time to freeze as $t_f$=17.70 min. Again an approximate value greatly over predicts the time to freeze. This coupled with the fact that it does not seem to apply to the remaining 95% of the populace makes any application of Eq. (31b) pointless. The above applications clearly show that neither of the currently available approximations, Eq. (29) and Eq. (31b), can be used to predict the onset of facial freezing.

Since neither of the two above expressions can correctly predict the freezing time even when applied within their specific ranges ($T_a$, V) of applicability, they certainly cannot be expected to predict the time to freeze when either the ambient temperature or wind velocity or both lie outside of these ranges. An extreme example of this is the earth's coldest recorded temperature of $T_a$=−128° F. (−88.89° C.) in Antarctica. Only Eq. (24) permits a calculation of the exact time to freeze ($t_f$) for personnel located there who may have been exposed to this temperature. It is not known with certainty whether windy or calm conditions prevailed. The assumption was made that there was no wind reduction (WRF=0) and that this temperature occurred during hours of darkness (G=0 Btu/hr-ft² (W/m²)). Also the altitude would have been near sea level (H=0 ft (0 m)). Calculation of the time to freeze ($t_f$) for individuals who may have been exposed to this severe temperature was made for two velocities V=1 mph (1.61 Km/hr) and V=4 mph (6.44 Km/hr). From Eq. (24) the time to freeze when $T_a$=−128° F. (−88.89° C.) was $t_f$=4.45 min. when V=1 mph and $t_f$=2.53 min. when V=4 mph. These are very low values of $t_f$ which could not have been accurately determined by either of the above approximate expressions.

Figure 18:
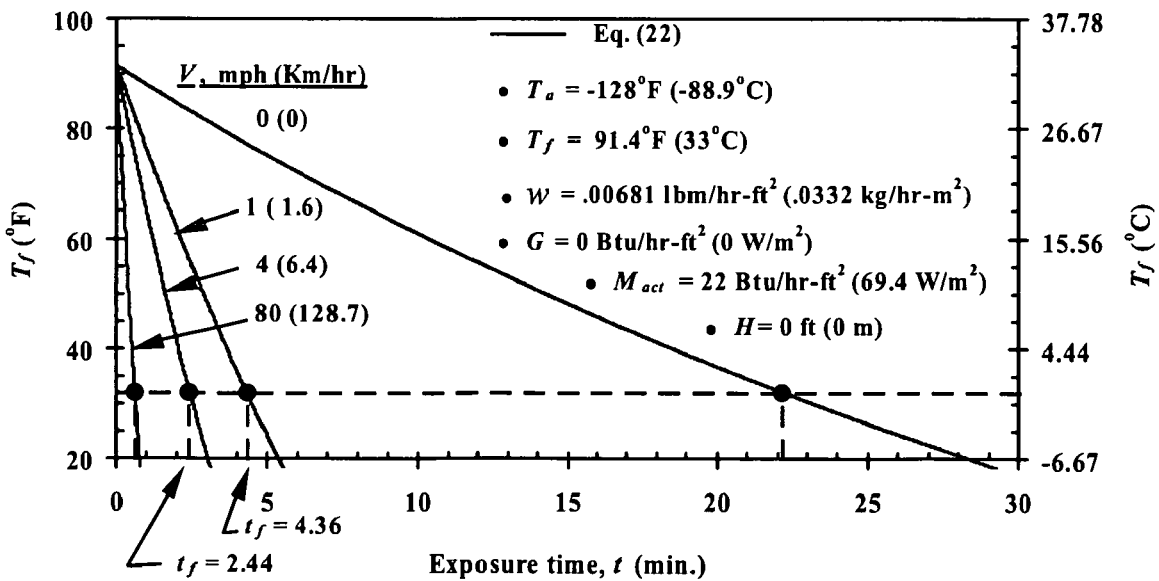
FIG. 18 is a graph of facial temperature ($T_f$) decay and time to freeze ($t_f$) as a function of velocity in Antarctica.

To better visualize the effect of velocity, the values of $t_f$ were also calculated using Eq. (22) to determine these values from the intercept point of the facial temperature decay curves with the freeze line ($T_f$=32° F. 0° C.)). These results are shown in FIG. 18 for an individual "standing relaxed", i.e., from Table 1, $M_{act}$=22 Btu/hr-ft$^2$ (69.4 W/m$^2$) and therefore $\dot{w}$=0.00655 lbm/hr-ft$^2$ (0.032 kg/hr-m$^2$). Inclusion of $q_b$ and $q_e$ in the calculations was not really necessary since earlier results had shown that their effects on $T_f$ were negligible. In FIG. 18, the values of $T_f$ for V=1 mph and 4 mph are 4.36 and 2.44 min., respectively. These are close to the above predicted values from Eq. (24). FIG. 18 shows that for calm conditions (V=0 mph), the value of $t_f$=22.2 min. is much higher than the $t_f$=4.36 min. when V=1 mph. This demonstrates again the powerful effect of the forced convection coefficient on reducing the time to freeze. Since a minor increase in wind velocity causes such a major decrease in $t_f$, the question arises concerning what effect on $t_f$ the most extreme wind condition would have. Assuming a maximum wind speed of V=80 mph (128.74 Km/hr), from Eq. (22) and approximately so, from FIG. 18, the minimum time to freeze that could possibly ever exist was $t_f$=0.63 min. or 38 seconds.

One of the objectives of the model developed here was to define the facial freezing time corresponding to a given wind chill temperature. This time should assist a user to "quantify" the value of the wind chill temperature, particularly at its extreme lower values where sensing it becomes very subjective. However, as already demonstrated, unless the announced freezing time is accurate, the listening public may experience more harm than good as a result of it. It is the inventors' belief that only Eq. (24) provides this accuracy, since it was based on a theoretical development of the facial temperature, which, in turn, has been substantiated by experimental data. It should be noted that Eq. (24) along with its constants in Table 4 were derived for sea level conditions (H=0 ft (0 m)). However, the time to freeze is altitude dependent. This will be discussed below.

Effects of Heat Losses/Heat Gains on the Wind Chill Temperature and Time to Freeze: Each of the three heat losses ($q_{fc}$, $q_r$, $q_e$) and each of the two heat gains ($q_i$, $q_b$) were individually examined to determine their contributions to the wind chill temperature and the time to freeze.

Wind Chill Temperature: Eq. (18a) was used to calculate the effect of each heat loss and heat gain on the wind chill temperature ($T_{wc}$). Calculations were made for an assumed Boston, Mass. resident casually walking on a sunny, cold winter day when the ambient temperature ($T_a$) is 0° F. (−17.78° C.). Boston is approximately at sea level and is in the mid latitude region, H=0 ft (0 m) and G=42.66 Btu/hr-ft$^2$ (134.58 W/m$^2$) from Table 2. From Table 1 the metabolic heat generation for "walking about" is $M_{act}$=31 Btu/hr-ft$^2$ (97.79 W/m$^2$) and therefore the water evaporation flux rate becomes $\dot{w}$=0.00655 lbm/hr-ft$^2$ (0.032 kg/hr-m$^2$). It was assumed that the initial facial temperature ($T_f$) was 91.4° F. (33° C.) and that there was no wind speed reduction at head level, thus WRF=0.

Figure 19A:
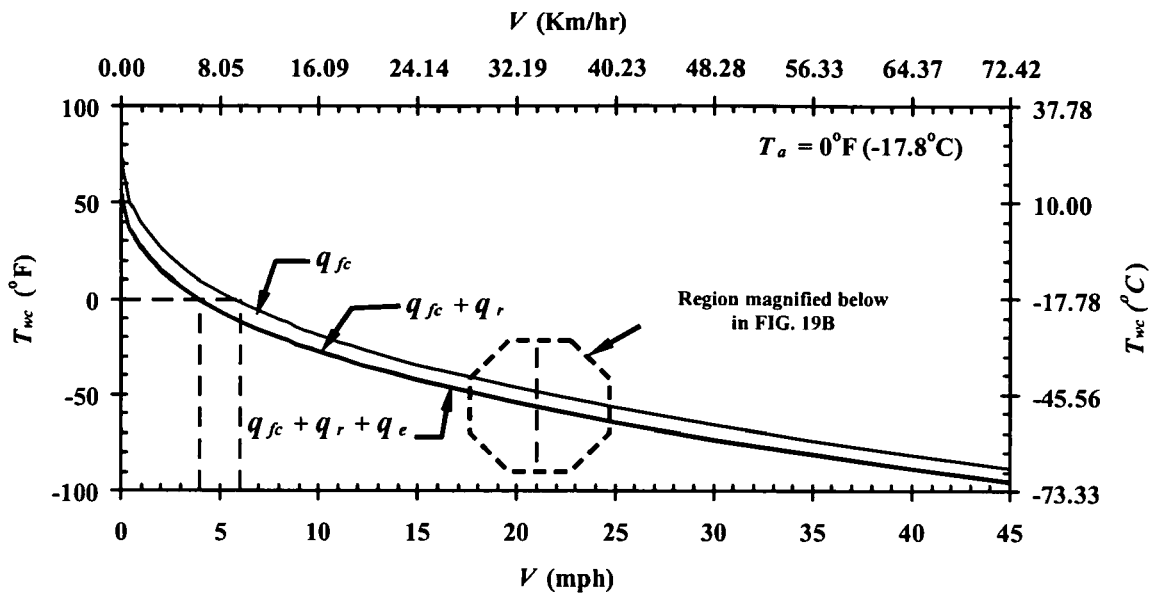
FIG. 19A-B are graphs of the effect of heat losses on the predicted wind chill temperature ($T_{wc}$) sustained by a Boston resident casually walking on a sunny, cold winter day under the following conditions: H=0 ft, G=42.66 Btu/hr-ft² (134.58 W/m²), $M_{act}$=31 Btu/hr-ft² (97.79 W/m²), w=0.00655 lbm/hr-ft² (0.0320 kg/hr-r²), WRF=0.
Figure 19B:
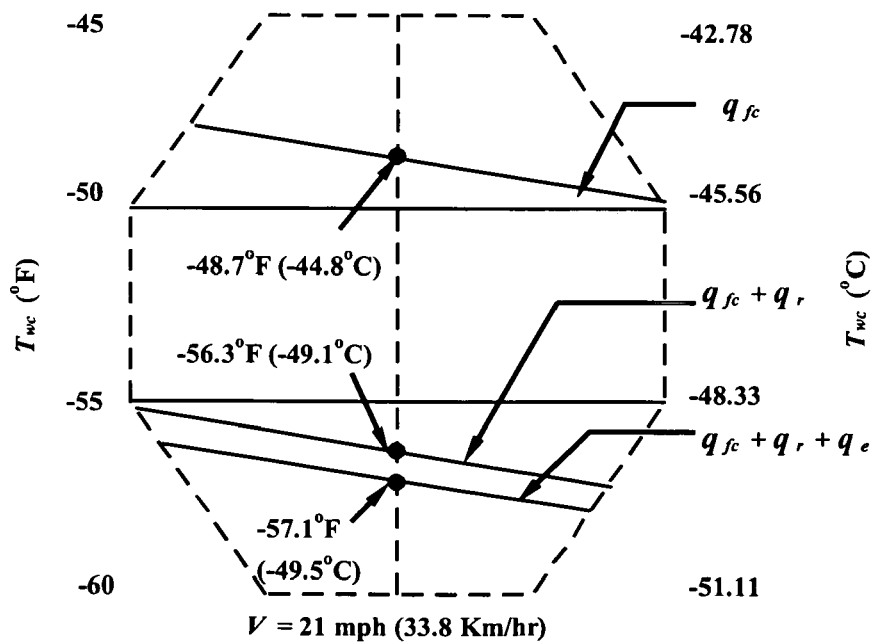

FIGS. 19A-B show the effect of the heat losses on the wind chill temperature. The top curve of FIGS. 19A-B shows the wind chill temperature due to $q_{fc}$ alone. FIG. 19B is an enlarged view of the region shown in the dotted hexagon in FIG. 19A. By definition, a wind chill temperature is less than the ambient temperature. If $q_{fc}$ was the only heat loss present, the resident would not be experiencing a wind chill temperature until the wind speed (V) exceeds 6 mph (9.66 Km/hr). At an arbitrary velocity of V=21 mph (33.8 Km/hr), he would experience a wind chill temperature $T_{wc}$ of −48.7° F. (−44.83° C.). However, $q_{fc}$ will never be the only heat loss. Rather a radiation ($q_r$) heat loss will always be present as long as the facial temperature ($T_f$) is cooling down towards the ambient temperature ($T_a$). Therefore, adding the ever present radiation heat loss to the forced convective heat loss, $q_{fc}$+$q_r$, decreases the $T_{wc}$ uniformly over the entire velocity range. Now the resident will experience wind chill when V exceeds 4 mph (6.44 Km/hr) and at velocity of V=21 mph (33.8 Km/hr), this decrease in $T_{wc}$ due to the addition of the radiation heat loss is −7.6° F. (4.22° C.) from −48.7° F. (−44.83° C.) to −56.3° F. (−49.06° C.). This $q_{fc}$+$q_r$ curve corresponds to the Siple and Passel values ($T_{wc}$=−39.2° F. (−39.56° C.)) at $T_a$=0° F., except that it shows lower values of $T_{wc}$ because of the previously discussed difference in the forced convection coefficients. The addition of the evaporative heat loss as shown in the lowest curve, $q_{fc}$+$q_r$+$q_e$, results in an additional 0.8° F. (0.44° C.) decrease in $T_{wc}$ from −56.3° F. (−49.06° C.) to −57.1° F. (−49.50° C.). This decrease in $T_{wc}$ due to $q_e$ is only 10.5% of that due to $q_r$. This curve, $q_{fc}$+$q_r$+$q_e$, which is the sum of the three losses, represents the lowest possible value of the wind chill temperature.

Figure 20A:
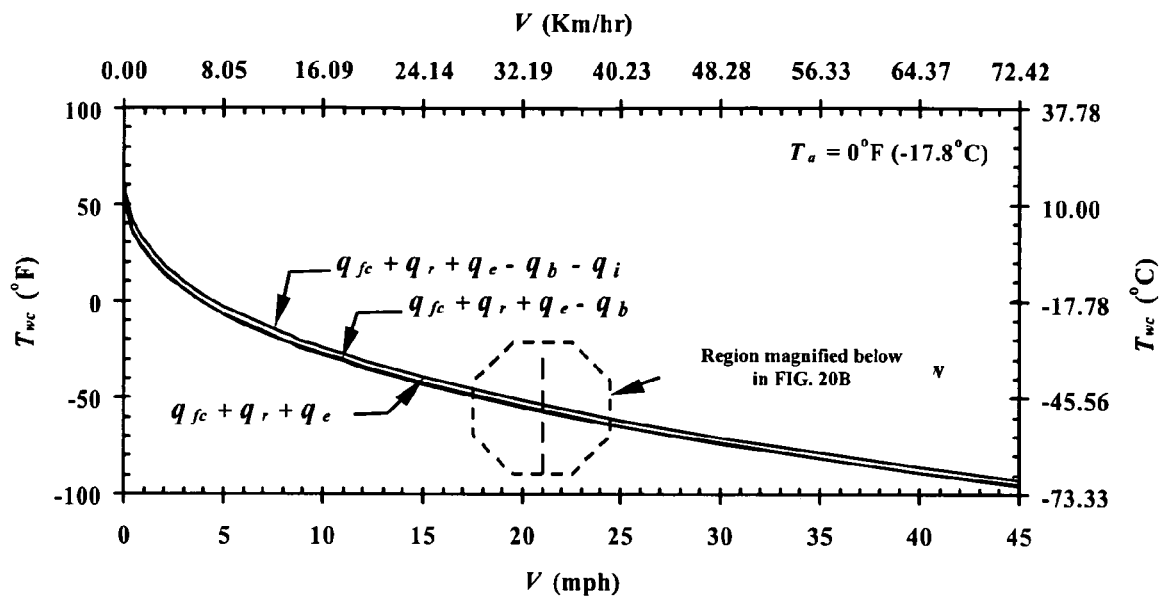
FIG. 20A-B are graphs of the effect of heat gains on the predicted wind chill temperature ($T_{wc}$) sustained by a Boston resident casually walking on a sunny, cold winter day under the following conditions: H=0 ft, G=42.66 Btu/hr-ft² (134.58 W/m²), $M_{act}$=31 Btu/hr-ft² (97.79 W/m²), w=0.00655 lbm/hr-ft² (0.0320 kg/hr-m²), WRF=0.
Figure 20B:
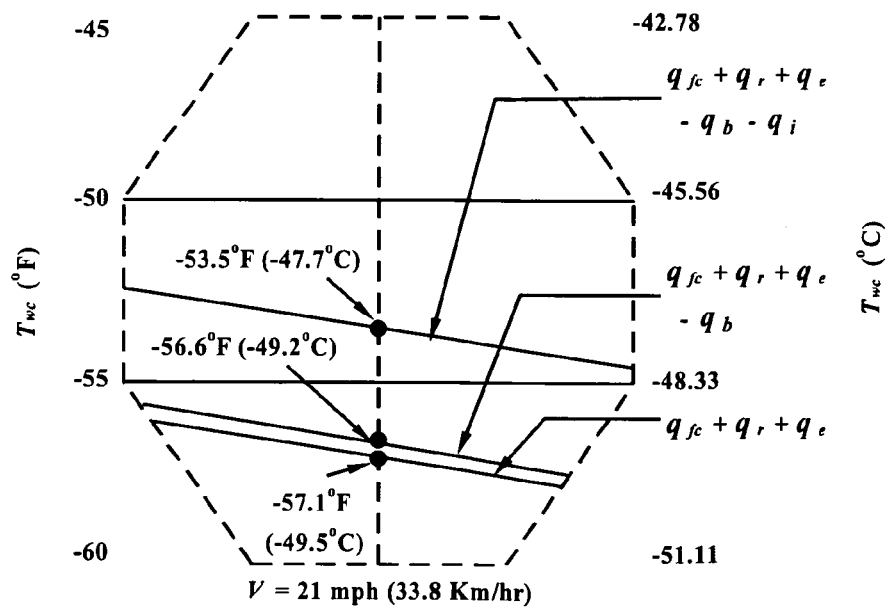

FIGS. 20A-B show the effect of heat gains on the lowest possible wind chill temperature curve, $q_{fc}$+$q_r$+$q_e$, from FIG. 19B. FIG. 20B is an enlargement of the region shown as a dotted hexagon in FIG. 20A. Now the moderating effect on $T_{wc}$ can be determined by subtracting out the effect of the heat gains $q_b$ and $q_i$. Subtracting out $q_b$ first, as in the middle curve, $q_{fc}$+$q_r$+$q_e$−$q_b$, shows that at V=21 mph there is only a 0.5° F. (0.28° C.) warming effect of the metabolic heat on the $T_{wc}$ to raise it from −57.1° F. (−49.50° C.) to −56.6° F. (−49.22° C.). This 0.5° F. increase in $T_{wc}$ due to $q_b$ is 6.6% of the decrease (7.6° F.) due to $q_r$ and brings $T_{wc}$ back to a value that is 0.3° F. (0.17° C.) lower than the previous value of −56.3° F. (−49.1° C.) in FIG. 19B, before it was decreased by $q_e$. Thus, $q_e$ and $q_b$ have small and nearly equal offsetting effects on $T_{wc}$. Finally, subtracting out the solar heat gain ($q_i$) as shown in the upper curve, $q_{fc}$+$q_r$+$q_e$−$q_b$−$q_i$, increases the $T_{wc}$ by 2.7° F. (1.5° C.) from −56.6° F. (−49.22° C.) to its final value of −53.5° F. (−47.5° C.). This 3.1° F. increase is 40.8% of the decrease (7.6° F.) in $T_{wc}$ due to $q_r$. The 3.6° F. (1.78° C.) difference between the coldest value of $T_{wc}$ of −57.1° F. and the warmest value of −53.5° F. may not matter to the individual, because at these very low temperatures he is unlikely to detect the difference.

Several comments and conclusions can be drawn from FIGS. 19A-B and FIGS. 20A-B concerning the effects of heat losses and heat gains on the wind chill temperature ($T_{wc}$). First, radiation heat loss ($q_r$), not forced convection heat loss ($q_{fc}$), is the key component in the $T_{wc}$. It will always exist as long as there is a temperature differential between the face and the ambient temperature. The forced convection heat loss will be nonexistent in the absence of wind and the evaporative ($q_e$) and metabolic ($q_b$) terms, if they do exist, will have small and counteracting effects.

Second, the radiation heat loss ($q_r$) is at a maximum at the moment of exposure when the facial temperature $T_f$ is 91.4° F. (33° C.). Only when $T_f$ decreases in time and approaches the ambient temperature ($T_a$) will the radiation heat loss decrease to the point that the forced convection heat loss ($q_{fc}$) may dominate.

Third, the effect of the evaporation heat loss ($q_e$) on $T_{wc}$ is nearly offset by the metabolic heat ($q_b$) gain. This might have been expected since both depend upon the level ($M_{act}$) of physical activity. Although this was shown to be true for the low level activity of "walking about" considered here, it is likely to be true for all activity levels. From this it can be concluded that ($q_e$) and ($q_b$) can probably be safely neglected if only an approximation of $T_{wc}$ is desired.

Fourth, the effect of the solar heat gains ($q_i$) on $T_{wc}$ is much greater than that of ($q_e$) and ($q_b$). Since $q_i$ is constant for any geographical location but $q_r$ decreases as $T_f$ decreases with increasing exposure time, it is possible that after an extended period of time the solar heat gain may completely offset the radiation heat loss.

Fifth, the negligible effect of $q_e$ and $q_b$ on $T_{wc}$ during ambient conditions, when wind chill is of concern, would seem to contradict the statement made by some investigators that physical activity will have a moderating or warming effect on the wind chill sensed by an individual. Actually, there may not be a contradiction, since two different phenomena are being considered here: one, the heat loss from a fully clothed body, the other, the heat loss from the exposed face. For the fully clothed individual participating in a physical activity, it might be reasoned that the potential heat loss ($q_e$) due to perspiration over the clothed portion of the body may not exist if the sweat is primarily being absorbed and retained by the clothing. In addition, the metabolic heat ($q_b$) flowing towards the skin surface is probably accumulating in the sense that it is largely prevented from leaving the skin surface due to the insulating effect of the clothing. This additive effect of $q_e$ and $q_b$ would result in an overall warming effect which would raise the individual's comfort level as claimed. What must be considered here is that this warming effect in no way represents a moderation of the wind chill temperature ($T_{wc}$) sensed by the individual, since this temperature is sensed within the skin's dermis layer of the exposed face and not within the clothed body. Thus, physical activity can help an individual feel warmer in a wind chilling environment without really affecting the wind chill temperature.

Time to Freeze: Eq. (22), rather than Eq. (24), was used to calculate the effect of each heat loss and gain on the time to freeze ($t_f$). Calculations were made for the same set of conditions used to obtain the effects of heat losses and gains on the wind chill temperature ($T_{wc}$) as shown in FIGS. 19A-B and FIGS. 20A-B for a Boston resident walking on a sunny, cold winter day when the ambient temperature ($T_a$) was 0° F. (−17.78° C.). Again, the following conditions applied: H=0 ft (0 m), G=42.66 Btu/hr-ft² (134.58 W/m²), $M_{act}$=31 Btu/hr-ft² (97.79 W/m²), $\dot{w}$=0.00655 lbm/hr-ft² (0.032 kg/hr-m²), WRF=0 and the initial facial temperature was 91.4° F. (33° C.). Eq. (22) was used to determine the facial temperature decay and the times to freeze ($t_f$) for different combinations of heat losses and gains. Calculations were made at V=0 mph (0 Km/hr) and V=40 mph (64.37 Km/hr) and at ambient temperatures of $T_a$=0° F. (−17.78° C.) and −40° F. (−40° C.). The results are shown in FIGS. 21-23.

Figure 21A:
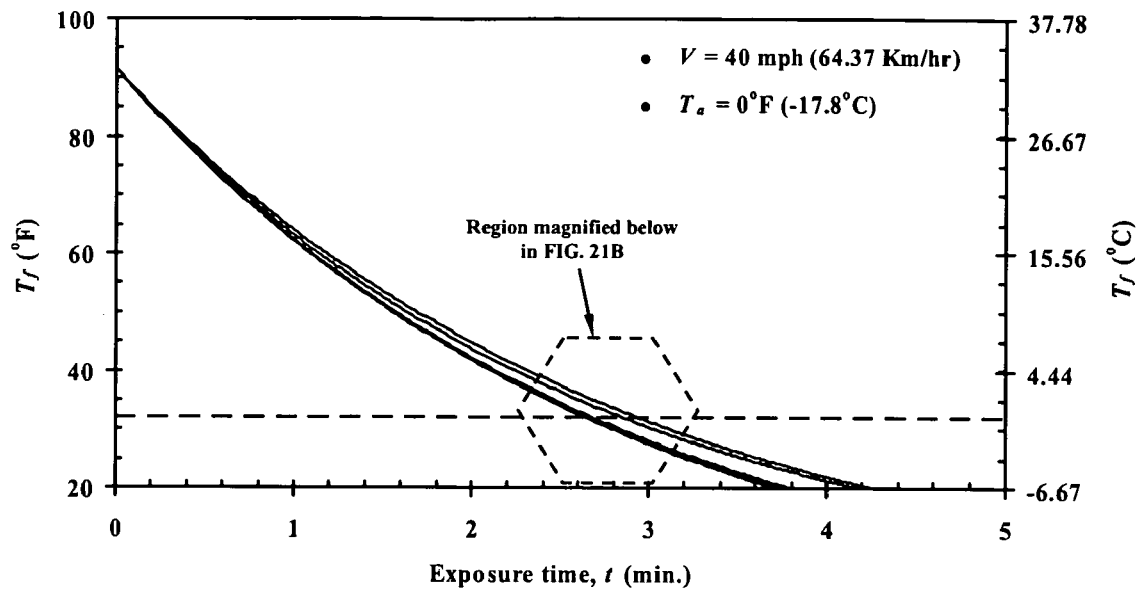
FIGS. 21A-B are graphs of the effects of heat losses and heat gains on the facial temperature ($T_f$) decay and the time to freeze ($t_f$).
Figure 21B:
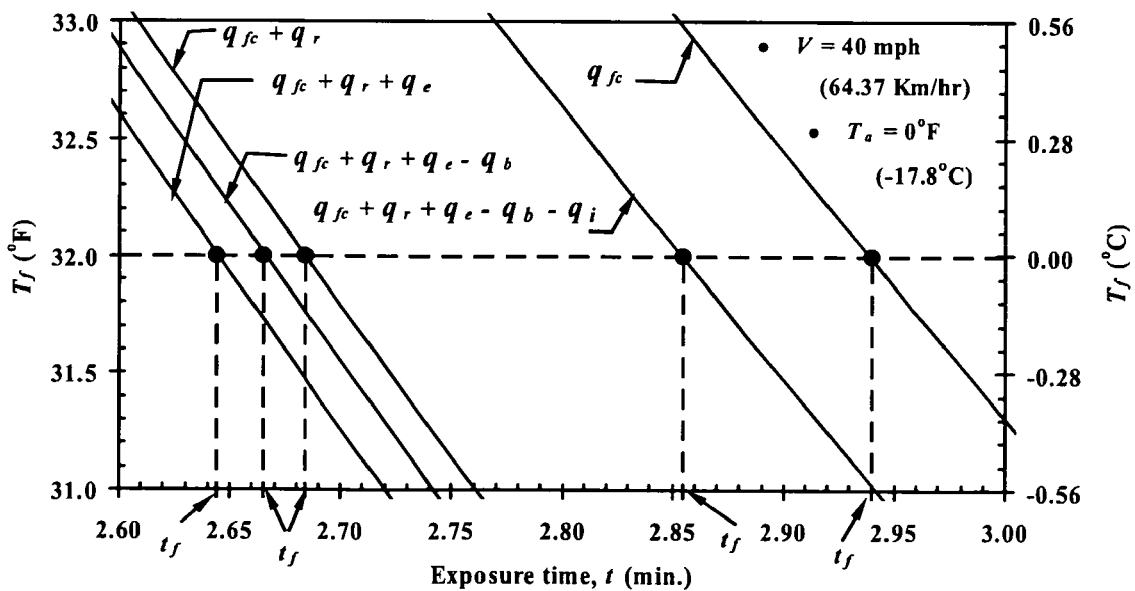

FIG. 21A, with $T_a$=0° F. and V=40 mph, shows the effect of heat losses and heat gains in various combinations on the facial temperature decay, and particularly on the time to freeze ($t_f$). FIG. 21B shows an enlargement of the region shown in the dotted hexagon illustrated in FIG. 21A. First, only the effect of forced convection ($q_{fc}$) was considered. Though realistically unobtainable by itself in a real situation, it provided a means of checking the accuracy of the forced convection component in Eq. (22). In FIG. 21B, when only $q_{fc}$ is considered in Eq. (22), the time to freeze is $t_f$=2.94 min. Calculating the time to freeze from the closed form solution in Eq. (26c) gives almost the same value $t_{fc}$=2.95 min. This excellent agreement confirms the accuracy of the forced convection component in Eq. (22). Next, a combination of the two major heat losses, $q_{fc}$+$q_r$, in FIG. 21B gives the time to freeze as $t_f$=2.684 min. Adding the evaporative heat loss ($q_e$) decreases the $t_f$ to its minimum value of 2.644 min. This is the minimum value of $t_f$. Similarly, the addition of $q_e$ to $q_{fc}$+$q_r$ in FIGS. 19A-B resulted in the minimum (coldest) wind chill temperature ($T_{wc}$). The decrease in $t_f$ due to the addition of $q_e$ was 0.04 min. in going from 2.684 min. to 2.644 min. Now subtracting out the metabolic heat gain ($q_b$) from the sum of the three heat losses ($q_{fc}$, $q_r$, $q_e$) increases the time to freeze by 0.021 min. in going from 2.644 min. back up to 2.665 min., which is slightly less than the value of $t_f$(2.684 min.) before $q_e$ and $q_b$ were considered. Because they essentially cancel each other, it appears that $t_f$ can be safely predicted by neglecting the effects of $q_e$ and $q_b$. This is true for the minimum level of activity ("walking about") considered here. Since both $q_e$ and $q_b$ increase with increasing level of activity, the cancellation may apply at all times irrespective of the activity level. However, this cannot be said with certainty, since the exact relationship of $\dot{w}$ to $M_{act}$ is not known. What can be said with certainty is that at these conditions of high velocity (V=40 mph) and moderately cold temperature ($T_a$=0° F.), a low level of physical activity like walking is not beneficial to the individual, in that there is a decrease and not an increase in $t_f$. This may not be true for higher levels of activity. Finally, subtracting out the solar heat gain ($q_i$), which is equivalent to adding the presence of sunshine, decreases the rate of facial cooling and therefore increases $t_f$. This means that the individual being considered here, because he/she is walking in sunshine, will encounter facial freezing at $t_f$=2.855 min. and not $t_f$=2.665 min. in the absence of sunshine. This 0.19 min. increase in time to freeze in going from 2.665 min. to 2.855 min., although not substantial in this case, does indicate a beneficial effect of sunshine. For the ambient conditions considered above, when sunshine is present, the facial freezing time is calculated to be 2.81 min., 2.855 min., and 2.90 min. for thermal absorptivities of 0.5, 00.65, and 0.8, respectively. The corresponding maximum change in the calculated facial freezing time is approximately 3%.

Figure 22A:
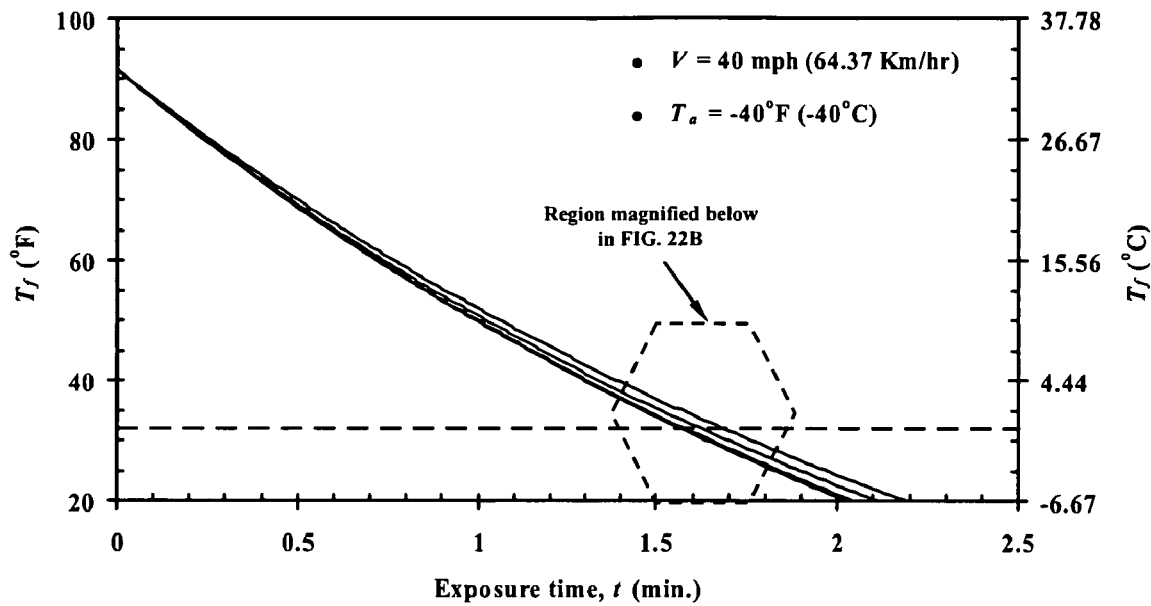
FIGS. 22A-B are graphs of the effects of heat losses and heat gains on the facial temperature ($T_f$) decay and the time to freeze ($t_f$).
Figure 22B:
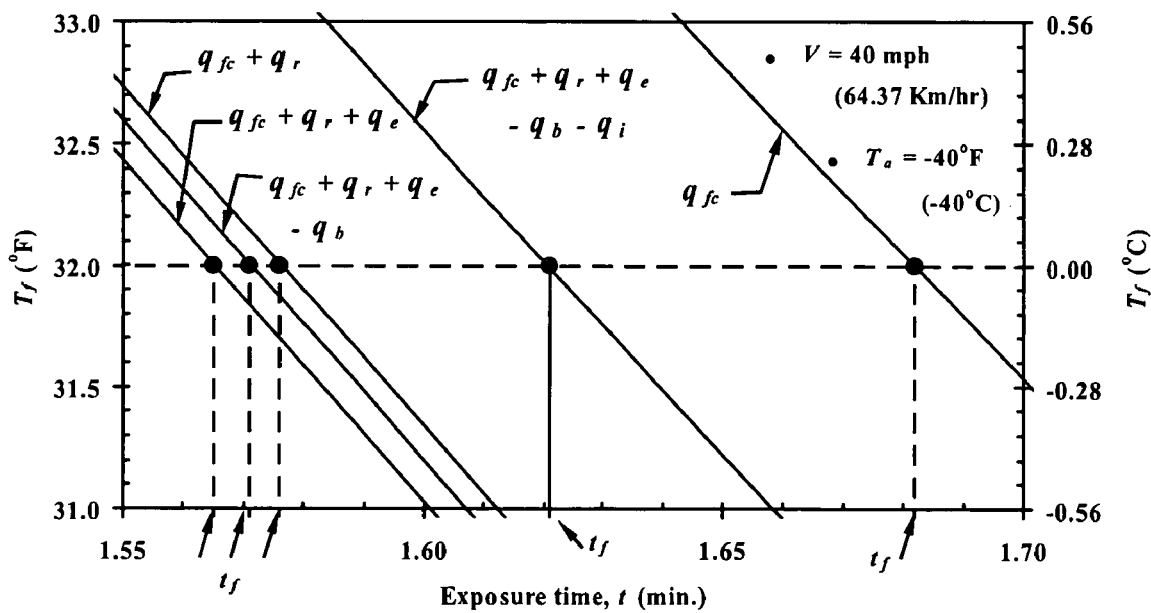

FIG. 22A with $T_a$=−40° F. (−40° C.) and V=40 mph (64.37 Km/hr) shows that decreasing the ambient temperature from 0° F. to −40° F. while maintaining V=40 mph decreases the time to freeze ($t_f$) by more than 40% when all heat losses and heat gains are present. FIG. 22B shows an enlargement of the region outlined in the dotted hexagon in FIG. 22A. The decrease in the time to freeze ($t_f$) is shown by the decrease in $t_f$ from 2.855 min. for $T_a$=0° F. in FIG. 21A-B to $t_f$=1.621 min. when $T_a$=−40° F. This decrease in ambient temperature from 0° F. to −40° F. decreases the reduction in $t_f$ due to $q_e$ from 0.040 min. to 0.011 min. It also decreases the increase in $t_f$ due to $q_b$ from 0.021 min. to 0.006 min. The result is that the counteracting effects of $q_e$ and $q_b$ on $t_f$ decrease even further with decreasing ambient temperature. Again, there is no beneficial effect to the individual in terms of an increase in $t_f$. However, the decrease in $t_f$ due to this low level of activity (walking) is much less. Unless higher levels of activity prove otherwise, physical activity can be neglected in the determination of $t_f$ at the lower ambient temperatures and higher wind velocities when freezing is most likely to occur. At this much lower ambient temperature, an already minor beneficial effect of sunshine is also reduced. Without sunshine, $t_f$=1.571 min. and with sunshine, $t_f$=1.621 min.; this is an increase of 0.05 min. compared to 0.19 min. when $T_a$=0° F. Similarly, for the ambient conditions considered above, when sunshine is present, the facial freezing time is calculated to be 1.61 min., 1.621 min., and 1.633 min for thermal absorptivities of 0.5, 0.65, and 0.8, respectively. The corresponding maximum change in the calculated facial freezing time is approximately 2%.

Figure 23A:
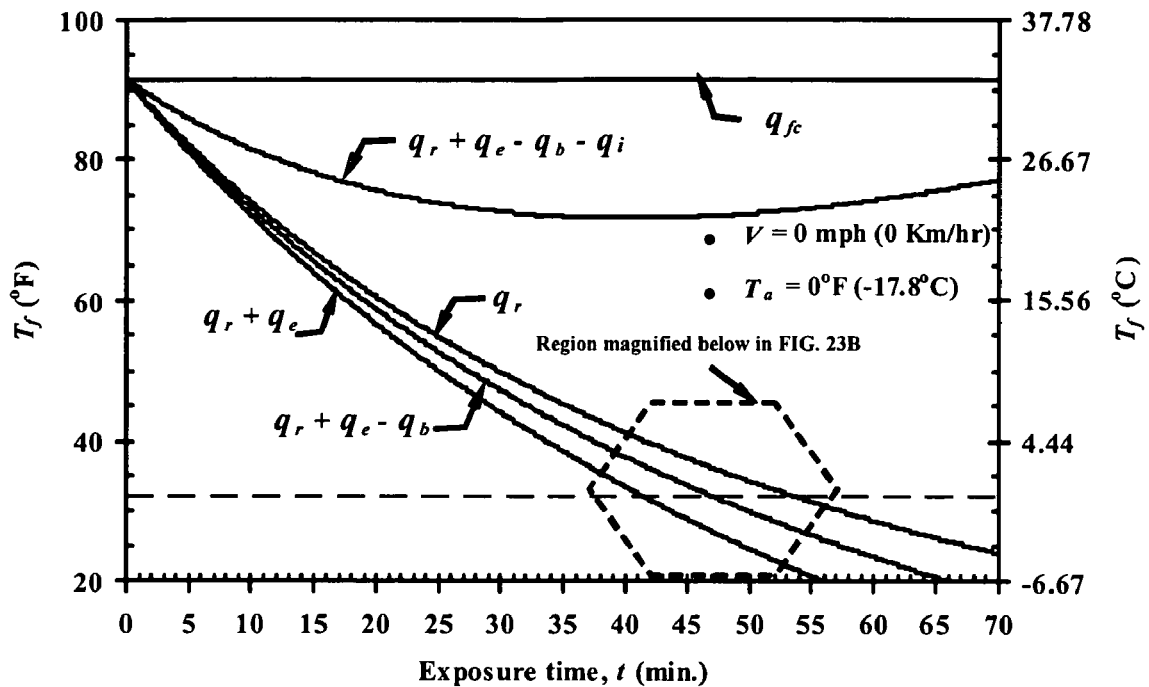
FIGS. 23A-B are graphs of the effects of heat losses and heat gains on the facial temperature ($T_f$) decay and the time to freeze ($t_f$)
Figure 23B:
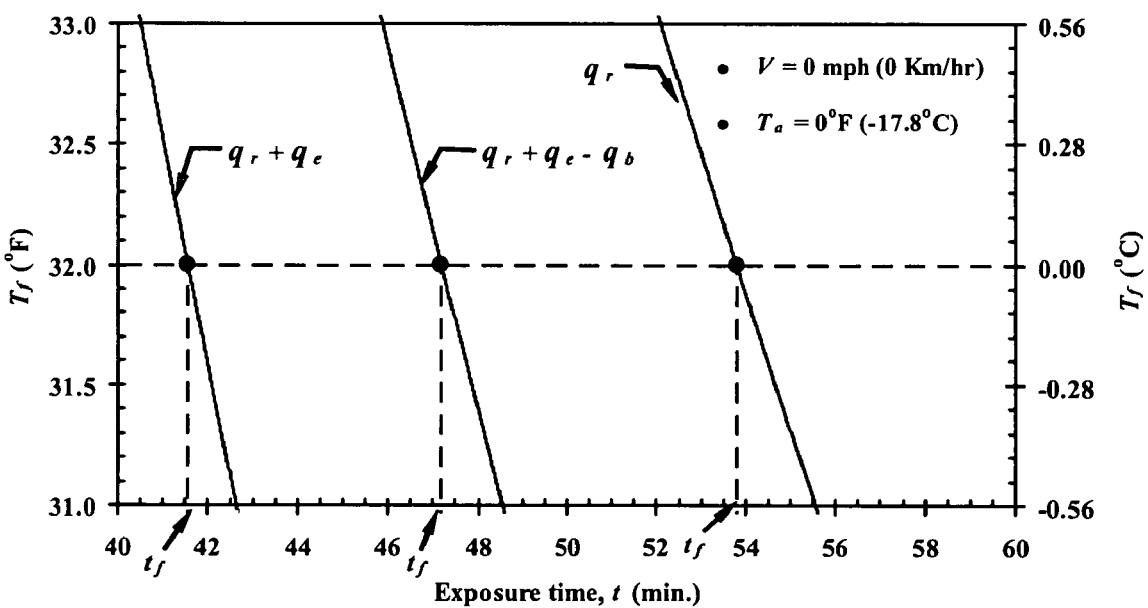

FIG. 23A and enlargement shown in FIG. 23B with $T_a$=0° F. and V=0 mph (0 Km/hr) show that decreasing the velocity from the V=40 mph in FIGS. 21A-B results in large increases in the time to freeze ($t_f$) that is 16 to 20 times greater than those in FIGS. 21A-B. This is because the forced convection heat loss ($q_{fc}$) is nonexistent when V=0 mph. Consequently, its effect of causing a rapid decay in the facial temperature, as evidenced by the results of FIG. 14, is no longer present. The absence of the $q_{fc}$ heat loss causes the facial temperature to decrease more gradually so that the facial temperature decay curve intercepts the freezing line ($T_f$=32° F. (0° C.)) at a much larger exposure time. This absence of $q_{fc}$ is represented by the horizontal line which signifies that it has no effect on the facial temperature decay, leaving the radiation heat loss ($q_r$) as the only major remaining term. Eq. (22) predicts the time to freeze for this radiation term as $t_f$=53.8 min. From the closed form solution of Eq. (25c), the time to freeze is $t_f$=53.8 min. In this case, the excellent agreement of these two numbers now confirms the accuracy of the radiation component in Eq. (22). The addition of the evaporation component ($q_e$) reduces the time to freeze by 12.62 min. to $t_f$=41.55 min., while the subsequent subtraction of the metabolic component ($q_b$) increases the time to freeze by 5.65 min. back up to $t_f$=47.20 min. This shows that at $T_a$=0° F. and a calm condition (V=0 mph), the effects of $q_e$ and $q_b$ no longer nearly cancel each other as they did in FIGS. 22A-B for the lower ambient temperature and the higher wind velocity where facial freezing is likely to occur. Although the difference between these components ($q_e$, $q_b$) is much greater at the lower temperature ($T_a$=0° F.) and a calm (V=0 mph) condition, there still is no beneficial effect of physical activity from the standpoint of an increase in the time to freeze. Based on this and the above results, one concludes that it is to an individual's benefit to refrain from any low level of physical activity if he desires to avoid a decrease in the time to freeze. The possibility exists that a more energetic form of physical activity may increase the $t_f$. Finally, subtracting out the solar radiation ($q_i$) results in a temperature decay curve shown as $q_r+q_e-q_b-q_i$ that does not intersect the freezing line ($T_f$=32° F. (0° C.)). This means that in the presence of sunshine, facial freezing will not take place at these ambient conditions. This emphasizes the powerful effect of sunshine under calm (V=0 mph) conditions.

Figure 24:
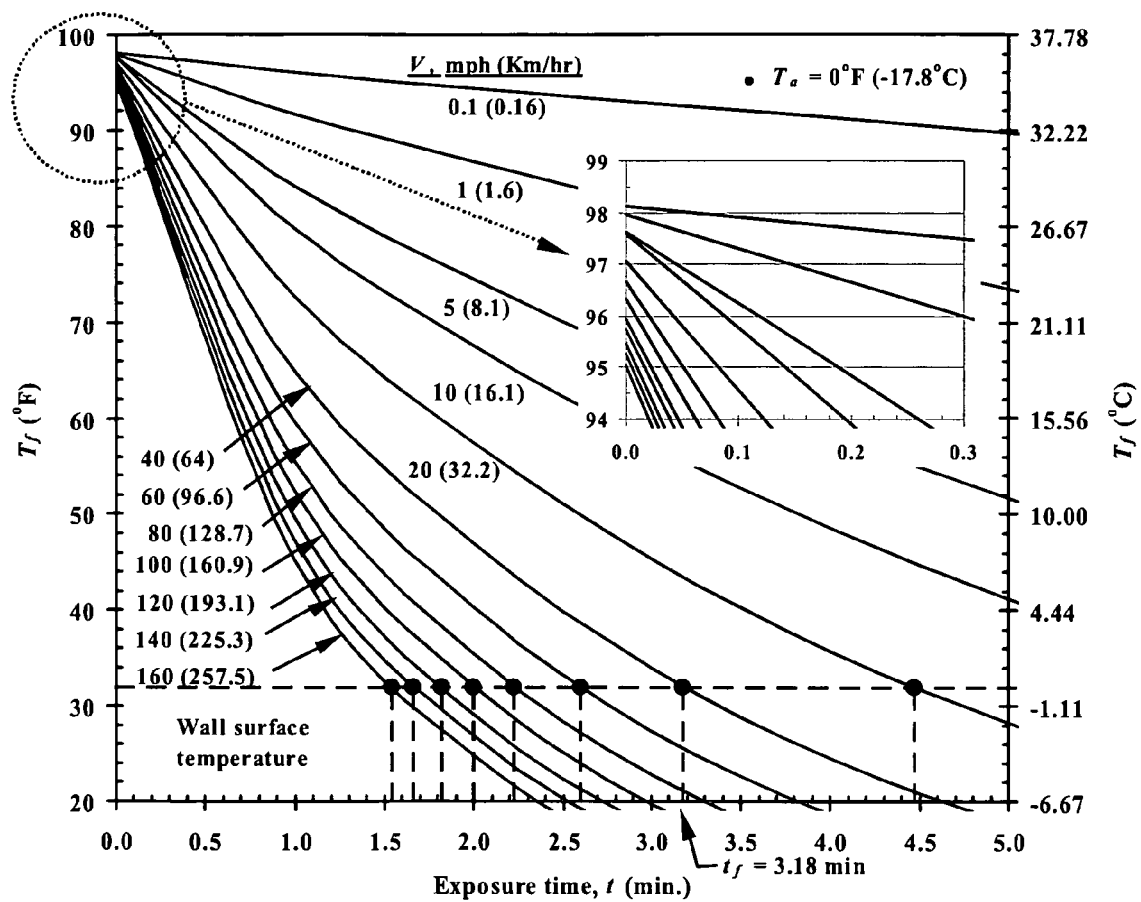
FIG. 24 is a graph of facial temperature ($T_f$) decay and the time to freeze ($t_f$) using the infinite series solution of Eq. (23h).

Finally, FIG. 24 is a plot of the facial temperature ($T_f$) curves when $T_a$=0° F. (−17.78° C.) using the infinite series expression of Eq. (23h). Note that the initial facial temperature in this case is the core temperature ($T_{CR}$) of 98.2° F. (36.78° C.) and not 91.4° F. (33° C.). Since the infinite series expression applies only when a forced convection heat loss takes place at the facial surface, it compares with the results of the lumped capacitance approach shown in FIGS. 21A-B where only the forced convection ($q_{fc}$) was being considered. As shown in FIGS. 21A-B when $T_a$=0° F. and V=40 mph, $t_f$=2.94 min. using Eq. (22). At these same ambient conditions, $t_f$=3.18 min. from FIG. 24. This small difference of 0.24 min. (14.4 seconds) between these two values not only validates Eq. (22), but also validates the lumped capacitance approach used in its derivation. The comparison is even better when it is noted that the initial mid-segment temperature in this infinite series method is 98.2° F., while in FIGS. 21A-B, the initial temperature is 91.4° F. A linear temperature correction on $t_f$ shows that its actual value in this method is $t_f$=91.4/98.2×(3.18)=2.96 min. This smaller difference of 0.02 min. (1.2 s) between this value and $t_f$=2.94 min. is a further validation of Eq. (22) and its derivation. The infinite series solution of Eq. (23h) is limited to only "forced" convection conditions at the facial surface. In real life, where other modes of heat transfer will almost certainly exist, the lump capacitance method of Eq. (22) provides the only means of determining $t_f$. The added benefit of the lump capacitance method of Eq. (22) is that it is more general, simpler, and easier to use.

Several comments and conclusions can be made concerning the effect of heat losses and gains on the time to freeze ($t_f$). First, the effect of the heat loss due to evaporation ($q_e$) is nearly offset by the heat gain due to body metabolism ($q_b$) at the lower ambient temperatures and higher velocities when the danger of facial freezing is the greatest. This is true for a low level of physical activity and may be true for higher levels as well. At low levels of physical activity, like walking, an individual will experience a decrease rather than an increase in the time to freeze, so that he may want to avoid such activity. At higher, more energetic levels of activity, the individual may benefit as a result of an increase in $t_f$. These effects on an individual would take place over the entire range of ambient temperature and wind velocity. As the ambient temperature increases and the velocity decreases, the warming effect of $q_b$ becomes much greater than the cooling effect of $q_e$. This difference reaches its maximum under calm conditions (V=0 mph (0 Km/hr)).

Second, it appears, that because of the offsetting effect of $q_e$ and $q_b$ at the lower ambient temperatures and the higher velocities where the danger of freezing is the greatest, they can be neglected in the determination of the time to freeze ($t_f$). This might have been expected in light of their similar offsetting effects on wind chill temperature ($T_{wc}$) as shown in FIGS. 19A-B and FIGS. 20A-B. At the higher ambient temperatures and lower velocities, they should be included in time to freeze ($t_f$) calculations.

Third, for the low level of activity considered here, the effect of the solar heat gain ($q_i$) is about 15 times greater than the effect of the metabolic heat gain ($q_b$) at the higher velocity (V=40 mph) and over the entire temperature range (−40° F.≤$T_a$≤0° F. (−40° C.≤$T_a$≤−17.78° C.)). Thus, sunshine can greatly increase the individual's exposure time before facial freezing occurs, but the actual value of $t_f$ might be quite small. At the higher ambient temperature (0° F.) and calm conditions (V=0 mph), the beneficial effect of sunshine is so great that facial freezing may not occur.

The effects of altitude on the wind chill temperature and time to freeze will now be discussed. Wind chill is primarily the result of a wind driven process that is ambient pressure (P) dependent. One aspect of wind chill that has escaped attention is its dependency on the ambient pressure and consequently altitude (H). The reason for this may have been due to both oversight and the belief that the effect of this pressure was negligible. However, such is not the case. The present model shows that for the same ambient temperature ($T_a$) and wind velocity (V) at all altitudes, increasing altitude will have a significant effect on the wind chill temperature ($T_{wc}$) but almost a negligible effect on the time to freeze ($t_f$).

Wind Chill Temperature: The ambient pressure decreases with increasing altitude and Eq. (13c) shows a corresponding reduction of the forced convection coefficient ($h_{fc}$). Therefore, increasing altitude will result in a moderation of the wind chill temperature $T_{wc}$. To demonstrate this effect, calculations of wind chill temperature as a function of the altitude were made for the basic wind chill components ($q_{fc}$, $q_r$). The evaporative ($q_e$) and metabolic ($q_b$) components were not considered because of their negligible and counteracting effects. Also the solar radiation ($q_i$) was not considered, since its absence leads to the more severe wind chill temperatures which are of greater concern. Calculations of the wind chill temperature ($T_{wc}$) were made using Eq. (18a) with $T_a$=0° F. (−17.78° C.) and −40° F. (−40° C.) and V ranging from 10 to 40 mph (16.09 to 64.37 Km/hr). The range of altitudes (H) considered was from sea level to the height of Mt. Everest (29,082 ft (8,864.3 m)). The results of these calculations, which are plotted in FIG. 25, indicate very clearly that the wind chill temperature ($T_{wc}$) increases (or moderates) with increasing altitude.

Figure 25A:
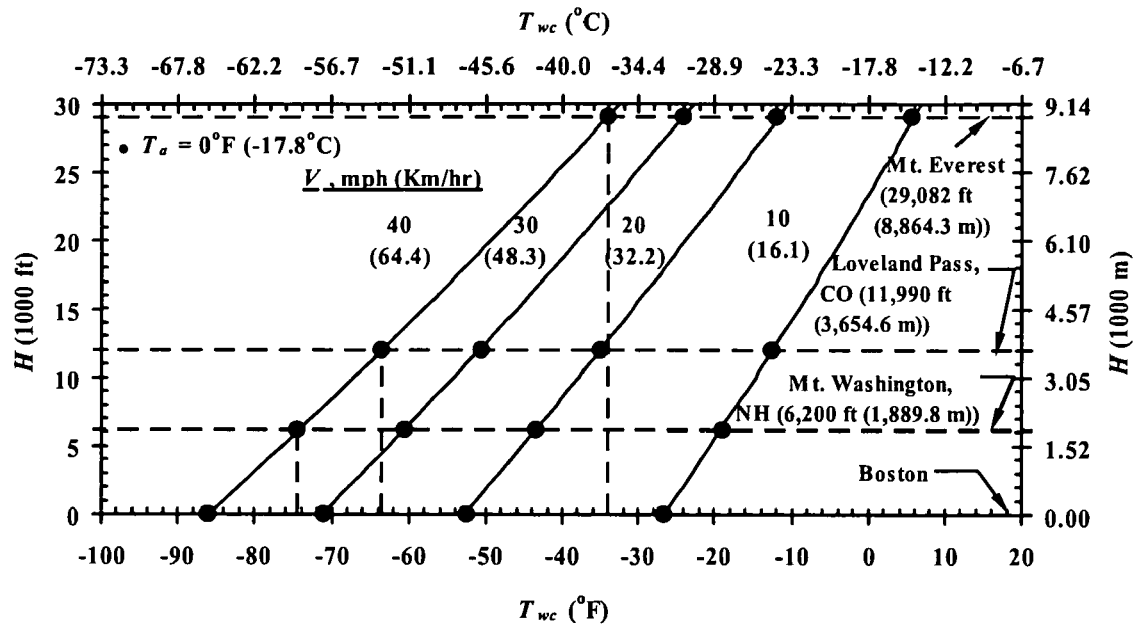
FIGS. 25A-B are graphs of wind chill temperature as a function of altitude when $T_a$=0° F. (−17.78° C.) and $T_a$=−40° F. (−40° C.), respectively.

FIG. 25A shows the variation of wind chill temperature with altitude when $T_a=0°$ F. (−17.78° C.). At sea level (H=0 ft (0 m)), for a representative coastal city such as Boston, when V=40 mph (64.37 Km/hr), $T_{wc}=-86°$ F. (−65.56° C.). At the same velocity on top of Mt. Washington, $T_{wc}=-74.5°$ F. (−59.17° C.) which is 12° F. (6.67° C.) warmer than for Boston. By comparison, the value on top of Mt. Everest would be $T_{wc}=-34°$ F. (−36.67° C.) or 52° F. (11.11° C.) warmer. This large difference between Boston and the top of Mt. Everest represents an increase in $T_{wc}$ of 1.79° F./1000 ft (3.26° C./1000 m) rise in elevation. This is a very significant gradient for what might be considered a modest wintertime temperature, but a high wind condition. Consider now Loveland Pass, Colo. at the same wind velocity, V=40 mph. Unlike the current wind chill model, which would predict the same wind chill on Loveland Pass as in Boston, this model predicts a $T_{wc}=-86°$ F. in Boston and a $T_{wc}=-64°$ F. (−53.33° C.) for Loveland Pass. This 22° F. (12.22° C.) increase in the $T_{wc}$ from the predicted value could be of vital importance to downhill skiers in the adjoining Loveland Pass Ski Area who could readily attain speeds of 40 mph in the absence of any wind.

Figure 25B:
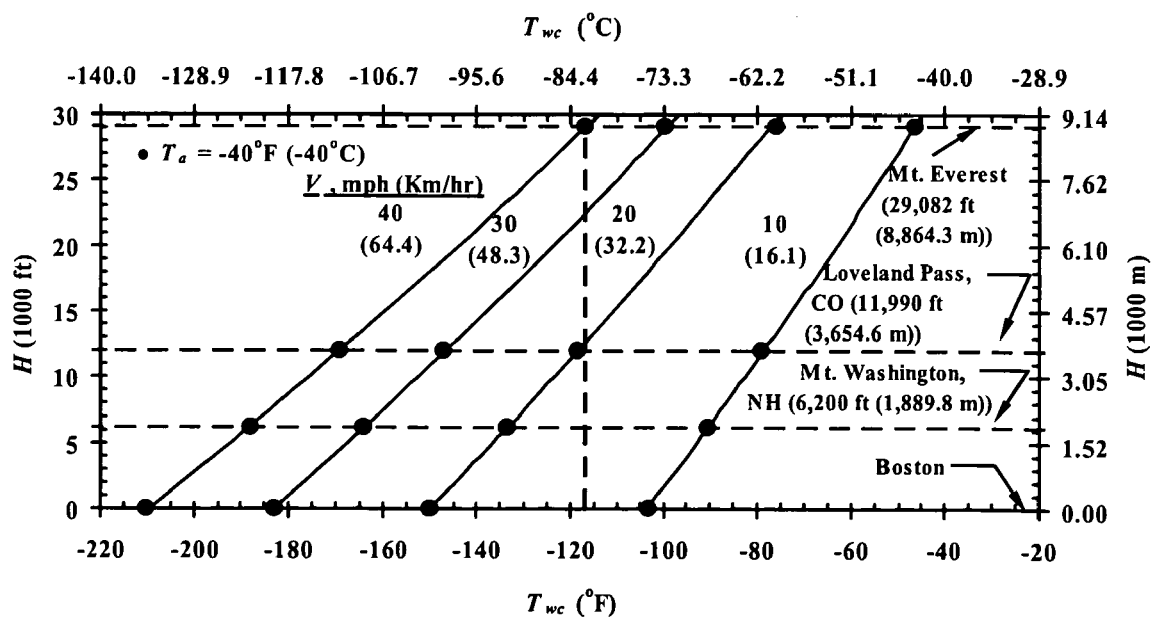

FIG. 25B, with $T_a=-40°$ F. (−40° C.), shows a shift to the left and a considerable lowering of the values of $T_{wc}$ from those when $T_a=0°$ F. Now when V=40 mph, $T_{wc}=-210.39°$ F. (−134.66° C.) in Boston, a most unlikely and unbelievable situation, but useful for the sake of this discussion. The corresponding value on top of Mt. Everest would be $T_{wc}=-117°$ F. (−82.78° C.). This translates to an increase in $T_{wc}$ of 3.21° F./1000 ft (5.85° C./1000 m) of elevation rise. Compared to the 1.79° F./1000 ft (3.26° C./1000 m) when $T_a=0°$ F., this shows that the moderation (warming) of the $T_{wc}$ with altitude (H) becomes increasingly more important as the ambient temperature decreases.

Figure 26:
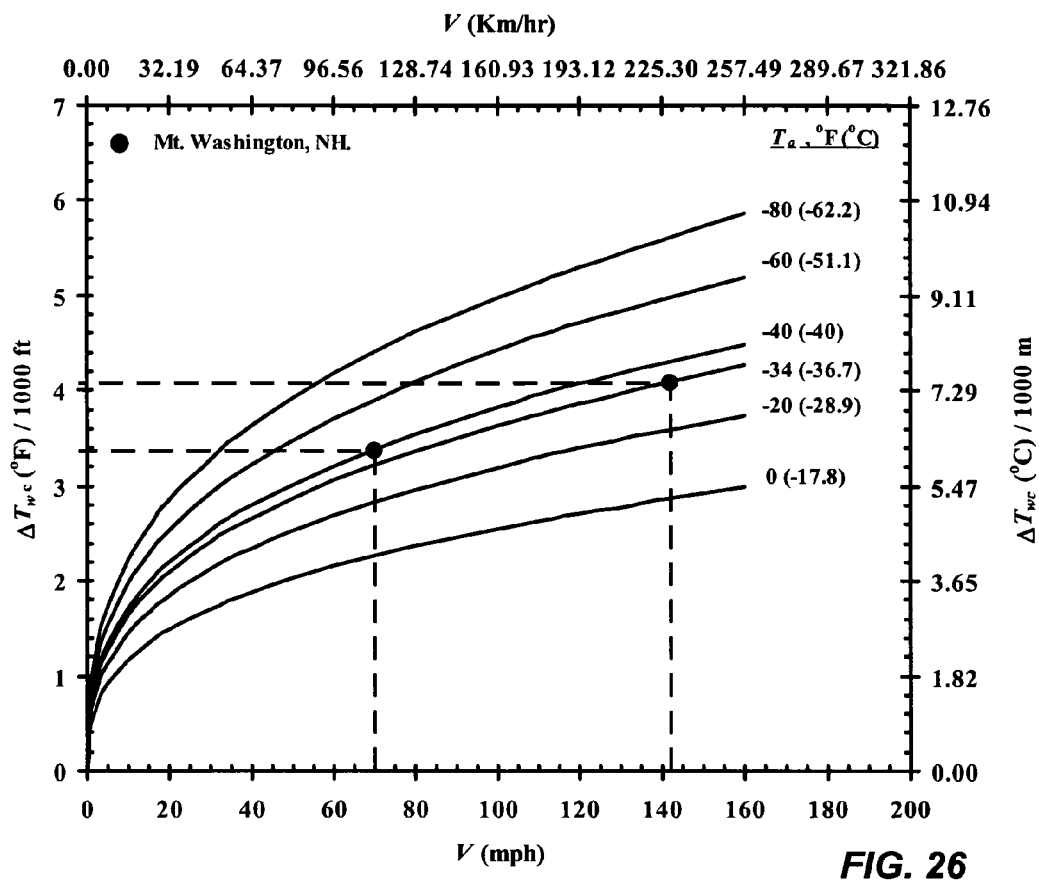
FIG. 26 is a graph of wind chill temperature/altitude gradient as a function of ambient conditions.

FIG. 26, which is a plot of this wind chill temperature/altitude gradient over a broad range of temperatures and velocities, provides an alternative approach to finding the effect of altitude on $T_{wc}$ rather than calculating $T_{wc}$ directly from Eq. (18a). FIG. 26 shows that the gradient increases with decreasing temperature and increasing velocity. From FIG. 26, at realistic conditions of $T_a=-40°$ F. (−40° C.) and V=70 mph (112.65 Km/hr) on top of Mt. Washington, the gradient, $\Delta T_{wc}/1000$ ft=3.35° F./1000 ft (6.11° C./1000 m), which means that at these ambient conditions the wind chill temperature would be $\Delta T_{wc}=3.35°$ F.×6.2=20.77° F. (11.54° C.) warmer on top of the mountain than for the same ambient conditions at sea level. The gradients shown in this figure could be used to obtain the value of $T_{wc}$ at any given altitude if the corresponding sea level value is known.

FIG. 25 emphasizes the important moderating effect that altitude has on the wind chill temperature ($T_{wc}$). This effect on $T_{wc}$ was not considered in the prior art wind chill model by Bluestein and Zecher. Perhaps the supposed warming of the $T_{wc}$ experienced by some observers and attributed to their model may have been because the values of $T_{wc}$ they sensed were at an altitude and not at sea level. Possibly some moderation may be due to Bluestein and Zecher's treatment of a varying facial temperature, although the results of FIG. 8 do not show this. The moderation in wind chill temperature predicted by Bluestein and Zecher appears to be almost entirely due to their incorrect wind reduction. The fact that this wind reduction was made and the predicted wind chill temperatures increased as a result of it may have inadvertently resulted in a beneficial effect that partially compensated for their neglect of any altitude effect.

Time to Freeze: The results in FIG. 25B show the dangerously low values of wind chill temperature ($T_{wc}$) that will be encountered by individuals when the temperature $T_a=-40°$ F. (−40° C.) and the velocity V≧10 mph (16.09 Km/hr). It is the belief of the inventors that these individuals cannot realistically discern the difference between, say, $T_{wc}=-80°$ F. (−62.22° C.) and $T_{wc}=-180°$ F. (−117.78° C.), both of which are quite possible. This inability to determine the actual $T_{wc}$ combined with its potential to cause a rapid facial freezing led to the development of Eq. (24) as a means to determine the time to freeze ($t_f$) in this model. Being able to predict $t_f$ for any set of ambient conditions ($T_a$, V) not only warns the individual when facial freezing could occur after exposure, but also frees him from having to know the actual value of $T_{wc}$. FIG. 25 shows the moderating effect of increasing altitude on $T_{wc}$. Similarly, increasing altitude will moderate or increase the time to freeze ($t_f$). This is shown by using Eq. (22) to make two calculations of the facial temperature decay curve, one at sea level (H=0 ft (0 m)) and one for the maximum altitude (H=29,082 ft (8,864.3 m)), both at the same set of ambient conditions ($T_a$, V). For the same reason that the $q_e$, $q_b$, and $q_i$ components were not considered in the effect of altitude on $T_{wc}$, they were not considered here in the effect of altitude on $t_f$.

Figure 27:
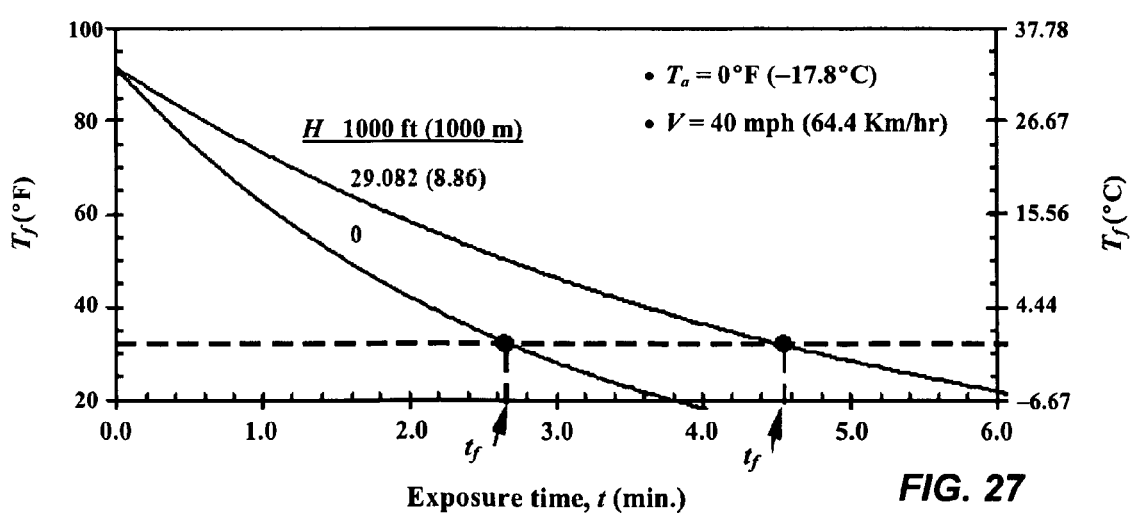
FIG. 27 is a graph of facial temperature decay and time to freeze ($t_f$) as a function of altitude.
Figure 28:
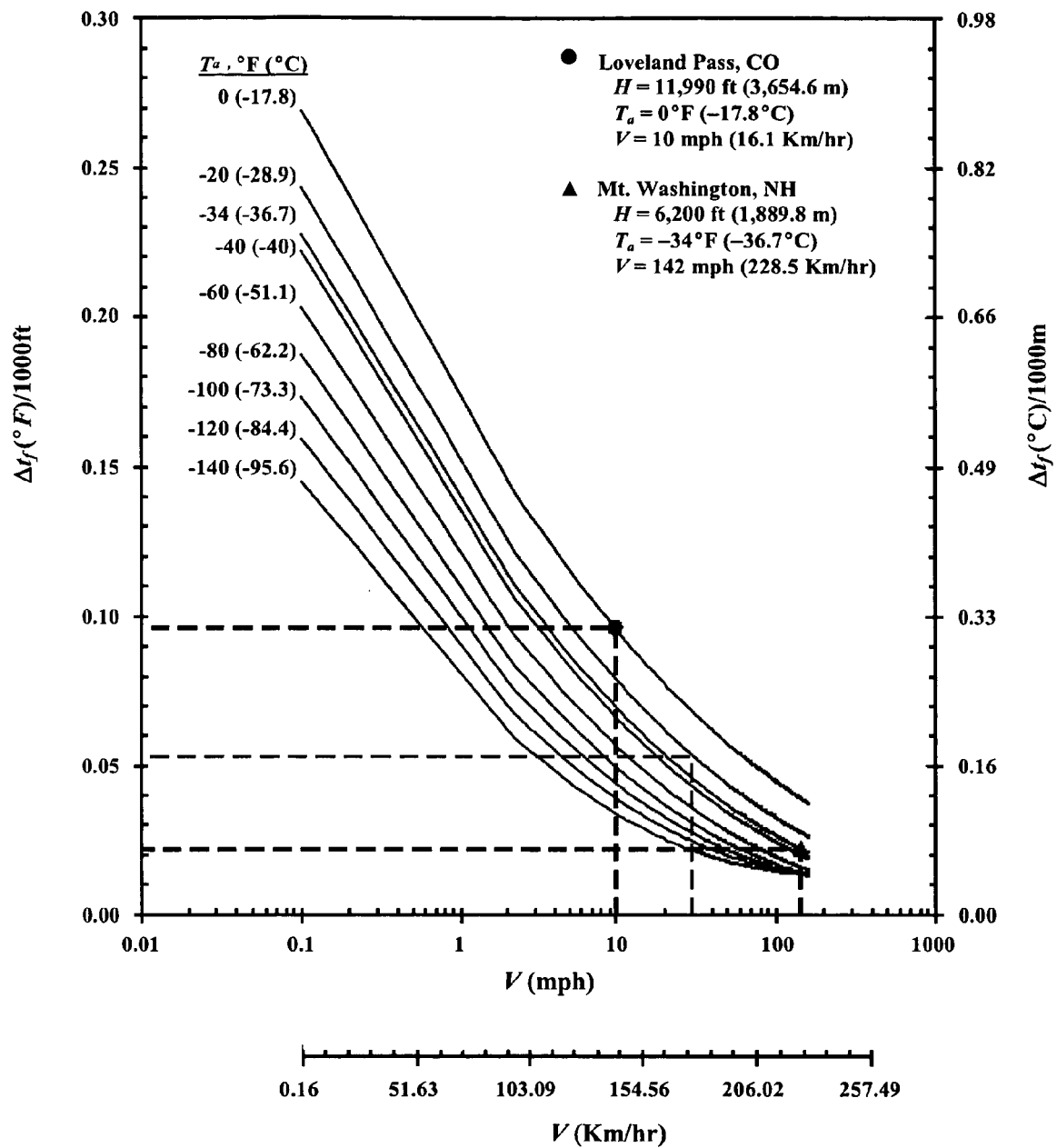
FIG. 28 is a graph of incremental time to freeze/altitude gradient as a function of ambient conditions.

These temperature decay curves are shown in FIG. 27 for $T_a=0°$ F. (−17.78° C.) and V=40 mph (64.37 Km/hr) where $t_f=2.65$ min. at H=0 ft (0 m) and $t_f=4.55$ min. at H=29,082 ft (8,864.3 m), giving a gradient $\Delta t_f(4.55-2.65)/29.082=0.065$ min/1000 ft (0.214 min/1000 m) of elevation rise. This means that when $T_a=0°$ F. and V=40 mph (64.37 Km/hr), the time to freeze will increase by 0.065 min. for every 1000 ft increase in altitude. For this set of ambient conditions ($T_a=0°$ F., V=40 mph), this seems like a small increase. For example, going from sea level to a 10,000 ft (3,048.04 m) altitude would increase the time to freeze by only 0.65 min. or 39 seconds. But because this is not likely to be the case for all other conditions, calculations of the gradient were made over the same wide range of ambient temperature (−140° F.≦$T_a$≦25° F. (−95.56° C.≦$T_a$≦−3.89° C.)) and wind velocity (0 mph≦V≦160 mph (0 Km/hr≦V≦257.49 Km/hr)) as used in the determination of $t_f$ in Eq. (24). Values of the gradient are shown plotted in FIG. 28. The nine curves of the gradient vs. V shown in FIG. 28 were curve fitted using TableCurve 3D™ to obtain the following expression for the freezing time gradient $$\frac{\Delta t_f}{1000} = a + b\ln(V) + cT_a + d[\ln(V)]^2 + eT_a^2 + fT_a\ln(V) + g[\ln(V)]^3 + hT_a^3 + iT_a^2\ln(V) + jT_a[\ln(V)]^2 \quad (32)$$

where a=0.17046053, b=−0.037699401, c=0.0011765359, d=0.0022511491, e=6.1594515×10⁻⁶, f=−9.6552578×10⁻⁵, g=3.3382238×10⁻⁶, h=1.7864164×10⁻⁸, i=1.2133567×10⁻⁹, j=−1.4109763×10⁻⁷ and where the correlation coefficient is $r^2=0.99566554$. Each of the nine curves in FIG. 28 shows a continual and rapid rise in the value of the gradient if the velocity were to decrease below V=1 mph (1.61 Km/hr) and approach V=0 mph (0 Km/hr). This is a reflection of what has already been shown in FIG. 14, where the time to freeze ($t_f$) is very sensitive to any increase in velocity from the calm condition (V=0 mph). FIG. 28 shows that the larger, more beneficial values of the gradient occur at the warmer temperatures and the lower velocities, which are conditions where facial freezing is of lesser concern. Unfortunately, at the lower temperatures and higher velocities where freezing is much more likely, these gradients are much smaller. Since the actual value of the time increment $\Delta t_f$ depends not only on the ambient conditions ($T_a$, V), but also upon the altitude (H), the larger values of $\Delta t_f$ will occur at the higher altitudes. One such place is Loveland Pass, Colo., which, at an altitude of 11,990 ft (3,654.6 m), represents one of the higher altitudes in the lower 48 states. For possible ambient conditions of $T_a$=0° F. and V=10 mph (16.09 Km/hr) there, the gradient $\Delta t_f/1000$ ft=0.096 min ($\Delta t_f/1000$ m=0.31 min) from Eq. (32) or directly from FIG. 28. Thus, the change in time to freeze due to the altitude is $\Delta t_f$=0.096×11.99=1.15 min. This would be close to the maximum value of $\Delta t_f$ that would be encountered across the 48 states. For all lower temperatures ($T_a$), higher velocities (V) and lower altitudes (H), $\Delta t_f$ would be less than 1.15 min. If a value of $\Delta t_f$ is much less than this, then an altitude correction of $t_f$ may not be necessary. However, if exactness is required, the value of $\Delta t_f$ should be calculated from Eq. (32) and then added to the sea level value of $t_f$ from Eq. (24).

The following is a description and demonstration of a method for calculating the wind chill temperature ($T_{wc}$), the time varying facial temperature ($T_f$) and the facial time to freeze ($t_f$) for an individual exposed to wintertime ambient conditions ($T_a$, V) according to the methods of the present invention. The following information must be known or specified before proceeding with the calculation of those three quantities: (1) Ambient temperature ($T_a$, ° F.), (2) Wind velocity (V, mph) at the NWS 10 m level, (3) Latitude (LAT) at individual's location, (4) Location altitude (H, ft), (5) Presence (G>0) or absence (G=0) of sunshine, (with sunshine, G is determined from Table 2 for the known latitude region (LAT)), (6) Metabolic heat generation ($M_{act}$) determined from Table 1 for an individual's known physical activity, with $M_{act}$, the evaporation flux rate ($\dot{w}$) can be determined, (7) Distance (D) of an individual from the nearest wind obstruction; with D, the wind reduction factor (WRF) can be determined (see below). The first five of these items are automatically known once the weather conditions and location are specified. The remaining two relate entirely to the individual being examined.

In demonstrating the method used to calculate $T_{wc}$, $T_f$ and $t_f$, consider the extreme weather conditions that existed on top of Mt. Washington, N.H. on Jan. 22, 2003, when the ambient temperature dipped to −34° F. (−36.67° C.) and the wind speed reached 142 mph (228.52 Km/hr). Mt. Washington has an altitude of 6,200 ft (1,889.78 m) and lies at 440.14 north latitude. At this excessive wind speed, stormy conditions almost certainly prevailed. If these stormy conditions occurred during daytime hours, then sunshine may have been at a maximum (G>0) or a minimum (G≅0). With this description, the following information is known: $T_a$=−34° F.; H=6,200 ft; V=142 mph; G≅0 or 42.66 Btu/hr-ft² (0 or 134.58 W/m²) from Table 2 using LAT; LAT=44°.14'.

The calculations were made for an individual presumed to be a member of the weather station located on top of the mountain. The individual was assumed to be fully clothed, standing outside, fully exposed to the wind, yet removed from any turbulence effect produced by the station itself. Under more normal conditions, the individual's activity might be described as "standing relaxed", using the terminology of Table 1. However, an individual standing in a 142 mph wind is not likely to be relaxed. On the contrary, he will be expending a great deal of energy just to remain upright. This suggests that the metabolic heat generation may be more comparable to that of a downhill skier. Thus from Table 1, $M_{act}$=96 Btu/hr-ft² (302.84 W/m²) and since $M_{act}$≧40 Btu/hr-ft² (126.18 W/m²), $\dot{w}$=0.02183 lbm/hr-ft² (0.1066 kg/hr-m²). Finally, the leeward distance (D) does not exist, since the individual is not downstream of the station. Rather D must be replaced by the wind/surface contact distance (l) which, near the mountain top, would be expected to be very small. Suppose l=100 ft (30.48 m), but because the surface is not likely to be smooth, l was assumed to be 200 ft (60.96 m) to account for surface roughness and boundary layer buildup. Therefore, D=l=200 ft. With l=200 ft and V=142 mph, the boundary layer edge (δ) from Eq. (33), below, is δ=(200)(0.0589)[(142)(200)]⁻⁰·²=1.52 ft (0.46 m). Since δ<y (head height) and where y=5 ft (1.52 m), then from Eq. (35b), below, WRF=0. With the above values of $T_a$, V, H, G, $M_{act}$, $\dot{w}$ and WRF known, the values of $T_{wc}$, $T_f$ vs. time and $t_f$ can be determined.

Calculation of the Wind Chill Temperature ($T_{wc}$): Calculation of $T_{wc}$ from Eq. (18a) must be preceded by a calculation of the exponent φ from Eq. (18d). This may be accomplished for the individual in minimum sunshine (G≅0) and in maximum sunshine (G=42.66 Btu/hr-ft²).

G≅0
From Eq. (18d), φ=0.506257
From Eq. (18a), $T_{wc}$=−296° F. (−182.22° C.)
G=42.66 Btu/hr-ft² (134.58 W/m²)
From Eq. (18d), φ=0.506257
From Eq. (18a), $T_{wc}$=−294° F. (−181.11° C.)

These very cold temperatures are considered to be the correct values of $T_{wc}$ on top of Mt. Washington. They are values that lie well beyond the range of applicability of the currently used wind chill model which, among other things, cannot account for the effects of altitude or sunshine. This can be clearly demonstrated in the following manner. FIG. 8 shows that the Bluestein and Zecher results, without their incorrect wind reduction, yields results that are essentially those of Siple and Passel. This means that Eq. (27a), which is the analytical expression of the Siple and Passel results, should provide the prior art model's prediction of the $T_{wc}$ on top of Mt. Washington. With $T_a$=−34° F. and V=142 mph, Eq. (27a) predicts this temperature as $T_{wc}$=−60.4° F. (−51.33° C.), an unbelievable underprediction of the actual value, $T_{wc}$=−296° F. The small 2° F. (1.11° C.) increase in $T_{wc}$, when maximum sunshine is present, agrees with the findings of FIG. 22A-B where the presence of sunshine at a high velocity (V) and a low temperature ($T_a$) resulted in a very small increase in $T_{wc}$. This small increase in $T_{wc}$ due to sunshine is obviously insignificant in these extreme ambient conditions. The effect of altitude, which has been neglected in all wind chill predictions of the prior art, does have a significant effect. The error in $T_{wc}$ attributed to neglecting this effect of altitude can be determined from the wind chill temperature gradient of FIG. 26. With $T_a$=−34° F. and V=142 mph, the wind chill temperature gradient is $\Delta T_{wc}/1000$ ft=4.09° F. (7.45° C./1000 m). This means that the above correct value of $T_{wc}$=−294° F. in the presence of full sunshine, would have been 25.36° F. (4.09×6.2) colder at $T_{wc}$=−319.36° F. (−195.20° C.) if the effect of Mt. Washington's altitude had not been considered.

Calculation of the Time to Freeze: Eq. (24) is the expedient way of calculating the time to freeze ($t_f$). Results from using Eq. (22) for the facial temperature ($T_f$) were the basis for developing this expression for the time to freeze. Although a lengthier approach, Eq. (22) will be used first to calculate the time dependent decrease in facial temperature ($T_f$) from its initial value of 91.4° F. (33° C.) to the time of facial freezing (32° F. (0° C.)). Calculation of $t_f$ from Eq. (22) starts with the initial facial temperature $T_f^m$=91.4° F. at time zero (m=0) and then calculates the facial temperature, $T_f^{m+\Delta t}$, at a later time increment (Δt). Using what has been found to be an optimum time increment Δt=1 second, $T_f$ is calculated after one second.

Figure 29:
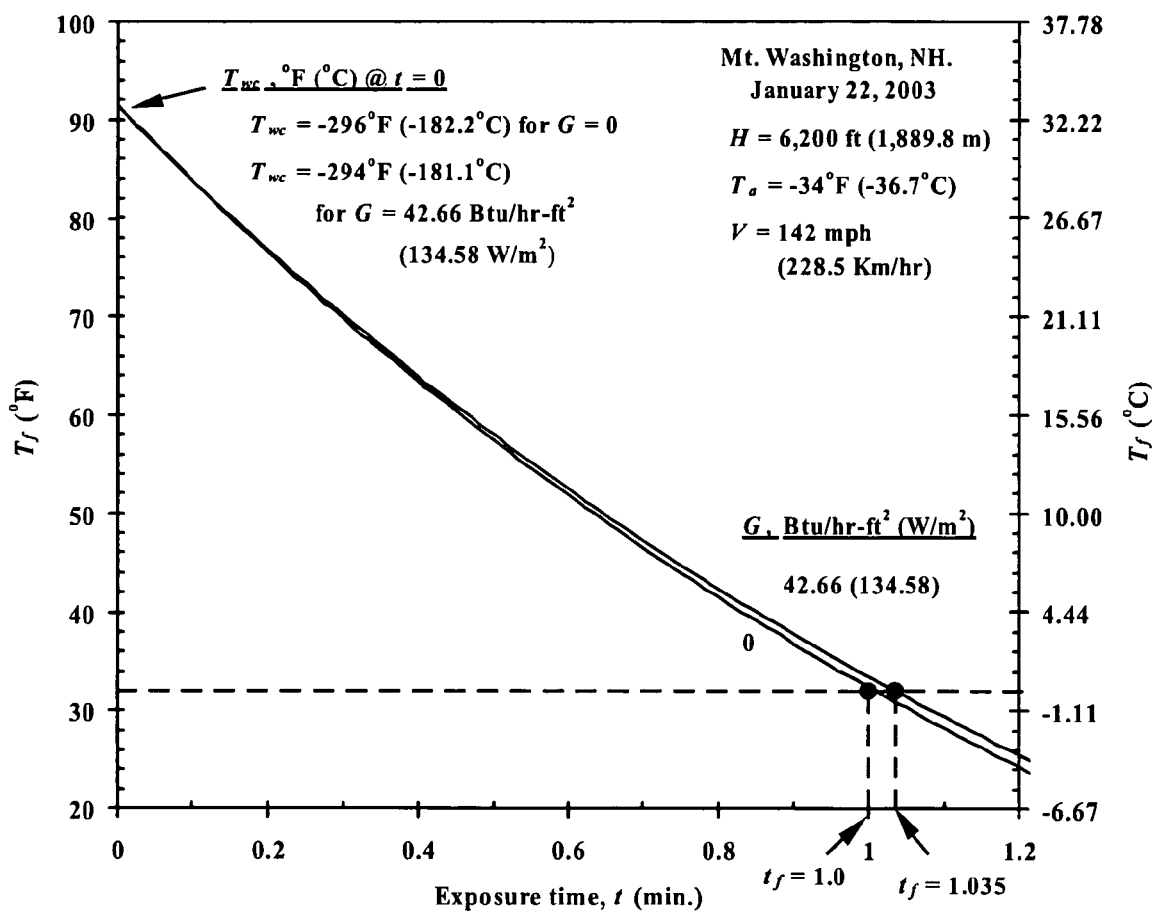
FIG. 29 is a graph of wind chill temperature ($T_{wc}$), facial temperature ($T_f$) and time to freeze ($t_f$) during extreme weather conditions on Mt. Washington.

Repeated calculations of $T_f$ where the value at the end of the time increment becomes the starting value on the next, continues until $T_f$ reaches 32° F. Results of these calculations are shown in FIG. 29 in the absence (G=0 Btu/hr-ft² (0 W/m²)) and presence (G=42.66 Btu/hr-ft² (134.58 W/m²)) of sunshine. The intercept points of these facial temperature decay curves with the freezing ($T_f$=32° F. (0° C.)) line, shows that $t_f$=1.0 min. when sunshine is absent and that $t_f$=1.035 min. when it is present. A comparison of these values shows that sunshine at these extreme ambient conditions does little (0.035 min. or 2.1 seconds) in extending the time to freeze. This might have been expected, since this effect of sunshine has been shown to be minimal on $T_{wc}$ at very extreme conditions as shown in FIGS. 22A-B.

Calculations of $t_f$ for Mt. Washington using Eq. (24) give $t_f$=0.897 min. with no sunshine (G=0) and $t_f$=0.9155 min. with sunshine (G>0). Since Eq. (24) is restricted to sea level conditions, these sea level based values of $t_f$ must be corrected for the Mt. Washington altitude. From Eq. (32) or FIG. 28 when $T_a$=−34° F. and V=142 mph, the time to freeze gradient is $\Delta t_f$/1000 ft=0.022 min. ($\Delta t_f$/1000 m=0.07 min.). Therefore, the increase in time to freeze on top of Mt. Washington compared with that at sea level is 0.14 min. (0.022 min.×6.2). Adding this time increment to the above values gives the altitude-corrected values of Eq. (24) as $t_f$=1.037 min. with no sunshine and that $t_f$=1.056 min. with sunshine. These more readily determined values of $t_f$ are only 3.7% and 1.98% larger than the corresponding actual values (1.0 min., 1.035 min.) from Eq. (22). Therefore Eq. (24) for sea level conditions along with an altitude correction from either Eq. (32) or FIG. 28 provides a quick and relatively accurate value of $t_f$.

The following observations are made regarding the wind chill model disclosed herein. First, the Siple and Passel experiment was not greatly flawed as has been thought by several investigators. A closer examination of this experiment reveals that the only error of any consequence was their assumption of a constant skin temperature of 33° C. (91.4° F.) during the entire exposure time. In reality, as the exposure time increases, the facial skin temperature will decrease and the wind chill temperature sensed by the individual will increase or become warmer. This was correctly recognized by the critics. However, their argument against the assumption of a constant 33° C. (91.4° C.) temperature seems to be that, over an extended exposure time, the individual was somehow being deprived of feeling warmer. Actually, this argument is irrelevant, because the individual is much more likely to be interested in the wind chill temperature at the initial moment of exposure, when the face temperature is realistically near 91.4° F. (33° C.), than at times later, when his facial temperature may be plummeting and he becomes preoccupied with thoughts on how to avoid facial freezing.

Second, Siple and Passel's assumption of a constant skin temperature was a valid criticism. Bluestein and Zecher's development of their prior art wind chill model was an attempt to show a moderation (warming) of the Siple and Passel wind chill temperatures by allowing the skin temperature to vary rather than to remain constant. But, the Bluestein and Zecher model shows at most a 2° F. (1.11° C.) moderation as a result of the skin temperature variation. At very low temperatures and high velocities, the Bluestein and Zecher values show no moderation. Rather they show a −1° F. cooling relative to the Siple and Passel values. The balance of their total 15° F. (8.33° C.) increase in the wind chill temperature was the result of the head level wind reduction based on their erroneous assumption that the NWS 10 m velocity value is always 50% greater than that at head level. The conclusion reached herein is that without their incorrect wind reduction and with a seemingly incorrect skin temperature correction, the Bluestein and Zecher values of the wind chill temperature are really no different from the Siple and Passel values they were intended to correct.

Another observation is that the wind chill model developed here is complete, accurate and more adaptable than the prior art Bluestein and Zecher model in use as of this writing. Like all previous attempts at wind chill prediction, it is based upon the two basic skin heat loss processes, namely radiation ($q_r$), which is always present, and forced convection ($q_{fc}$), which is present only under windy conditions. These two heat losses are the only ones that have been considered in previous wind chill analyses. What makes the wind chill model of the present invention complete is that it also incorporates both the beneficial (warming) effect of an individual's physical activity and that of sunshine when it is present, both of which are considered as heat gains at the facial surface. Physical activity produces a metabolic heat flow ($q_b$) from the body core and a solar radiation heat flow ($q_i$) from sunshine. The physical activity produces a third facial surface heat loss due to sweat evaporation ($q_e$). The model is unique in that it includes (a) the very important effect of altitude (H), a variable which until now has not been considered, and (b) the capability to determine in each case a correct wind reduction factor (WRF), rather than universally applying an incorrect one. The greater accuracy of this model stems not only from the addition of the above terms ($q_b$, $q_i$), but also from the means by which they were determined. The metabolic heat ($q_b$) from the body core to the facial surface was based upon an accurately derived thermal conductance term from a human thermoregulation model by Havenith. The solar radiation heat ($q_i$) was based upon monthly insolation data for 221 cities across the 50 states as compiled by the U.S. Department of Energy. The WRF can be analytically determined for each case knowing the individual's location relative to an upwind obstruction, see discussion below. Finally, the model is adaptable over the widest range of ambient temperatures (−140° F.$\leq T_a \leq$25° F. (−95.56° C.$\leq T_a \leq$−3.89° C.)), wind velocities (0 mph$\leq$V$\leq$160 mph (0 Km/hr$\leq$V$\leq$257.49 Km/hr)) and altitudes (0 ft<H<29,082 ft (0 m<H<8,864.3 m)) worldwide.

Another observation is that verification of this model consisted of comparing this model's predicted values of wind chill temperature ($T_{wc}$), facial temperature ($T_f$) and time to freeze ($t_f$) with existing experimental data. First, the predicted values of the wind chill temperature from Eq. (18a) were compared with those of Siple and Passel. This also becomes a comparison with the Bluestein and Zecher values when their incorrect wind reduction is removed. The comparison was made for the following conditions that existed at their location in Antarctica at the time of their experiment: sea level (H=0 ft (0 m)) altitude, no wind reduction (WRF=0) at the height of their container above ground level, no evaporative heat loss ($q_e$=0) and no metabolic heat gain ($q_b$=0), since neither of these applied, and no solar radiation ($q_i$=0) since the experiment was conducted in darkness. Comparison of this model's predicted values of $T_{wc}$ with those for Siple and Passel values in FIG. 7B shows that the predicted values are much colder, particularly at the higher wind velocities. This is in contrast to the belief of many investigators that the Siple and Passel temperatures were already colder than the actual values because of their constant temperature assumption. Additionally, the predicted values of the facial temperature from Eq. (22) were found to be in very good agreement with facial temperature test data obtained by Buettner, LeBlanc et al., the home freezer experiments performed by the inventors, and to some extent with the Discovery Channel™ Experiment and the results of Adamenko and Khairullin. This agreement gives credence to the expression for wind chill temperature in Eq. (18a) since it and Eq. (22) for facial temperature are based on the same five heat transfer processes. Finally, this agreement gives confidence in predictions of the time to freeze from Eq. (24), since this equation was derived from results using Eq. (22). No known data were available to make a comparison with predicted values of the time to freeze. However, the actions taken by some concerned contestants in the 2003/2004 World Downhill Ski Championships clearly indicated the capability of Eq. (24) to correctly predict the time to freeze in a real life situation.

Still another observation is that the wind reduction at head level depends upon the extent to which an individual's head is immersed in either a wind-generated boundary layer along the surface, upon which the individual is positioned, or within a wind-generated turbulence region on the leeward side of an obstruction upwind of the individual. In either case, the distance (D) between the individual and the obstruction must be known. It is this distance and the known wind velocity (V) that ultimately determines the value of the wind reduction factor (WRF). Considering the entire populace in all weather conditions, there are an infinite number of D and V combinations. Consequently, an infinite number of WRFs are possible. It is for this reason that the across-the-board application of a WRF=0.33 in the prior art wind chill model is in error. This detailed description further describes a procedure, below, for determining a more exact WRF in terms of D and V. Applying this procedure, average values of WRF were determined for both an urban and a rural area over the 20 mph$\leq$V$\leq$70 mph (32.19 Km/hr$\leq$V$\leq$112.65 Km/hr) range. For an urban area, WRF=0 for all velocities. For the rural areas the average values of WRF are 0.055 for V=20 mph and 0.072 for V=70 mph. The fact that these two areas may encompass more than 95% of the populace, and since these values of WRF are small and nearly non-existent, emphasizes the error introduced in the current model when a WRF=0.33 is being used.

Yet another observation is that physical activity produces a metabolic heat flow ($q_b$) to the skin surface and evaporative heat loss ($q_e$) from the surface. Their combined effect on the wind chill temperature ($T_{wc}$) and the time to freeze ($t_f$) is small and nearly offsetting at low temperatures ($T_a$) and high wind velocities (V), when facial freezing is of the greatest concern. When freezing is of lesser concern at high temperatures and low velocities, $q_b$ does provide a beneficial increase in $T_{wc}$ and $t_f$ above the opposing effect of $q_e$. Physical activity will have a completely different effect on the clothed portion of the body. The clothing will act as a barrier to prevent or slow the metabolic heat loss from the body. It will also act as an absorbent of the perspiration preventing its evaporation and its additional heat flow from the body. The additive effect of these two heat losses may explain why physical activity is known to have a warming effect on the clothed body. This warming effect plays no part in the wind chill temperature as sensed by the facial surface, nor in the possibility of facial freezing.

Another observation is that sunshine has a much greater moderating effect on wind chill temperature ($T_{wc}$) and time to freeze ($t_f$) than physical activity. This greater moderation by sunshine extends over a relatively wide range of ambient conditions. Unfortunately, the benefit of this moderation is the least at low ambient temperatures and high velocities, where facial freezing is a real possibility. However, under calm (V=0 mph) conditions and relatively high temperatures such as $T_a$=0° F., the effect of sunshine is so great that facial freezing may never occur. The conclusion is that the presence of sunshine results in its greatest beneficial effects at the lower velocities and the higher temperatures.

Furthermore, increasing altitude has the effect of increasing the wind chill temperature ($T_{wc}$) and the time to freeze ($t_f$). Calculations using this model gave rise to an incremental increase in the $T_{wc}$ per 1000 ft increase in altitude. This gradient increases rapidly with decreasing ambient temperature ($T_a$) and increasing velocity (V). What this means is that the moderating or beneficial effect of altitude on $T_{wc}$ is the greatest at the lower temperatures and higher velocities where it is needed the most. Even though altitude has this great effect on $T_{wc}$, its effect on the time to freeze ($t_f$) is just the opposite and quite small. Calculations of a corresponding time to freeze gradient, $\Delta t_f$ per 1000 ft, show that it decreases as the velocity (V) increases and as the ambient temperature ($T_a$) decreases. Unfortunately, the benefit of this altitude increase is least at velocities and temperatures where it is most needed. Furthermore, the increase in $t_f$ due to altitude is very small. At even lower temperatures ($T_a$) and higher velocities (V), this incremental increase in $t_f$ with altitude would be even smaller, and as such can possibly be neglected.

Procedure for Determining Wind Chill Factor: In wind chill calculations, the ambient temperature ($T_a$) is presumed to be known, but determining the actual wind velocity at head level may be difficult if not impossible except in special situations. This is because the actual wind velocity depends upon whether or not the individual's head is immersed in a wind-generated turbulence. If it is not, the head is exposed to the free-stream velocity (V), which is assumed to be that at the NWS 10 m level. The wind reduction factor (WRF) is defined as the difference between the free-stream velocity and the head level velocity divided by the free-stream velocity. Thus, there would be no wind reduction when the free-stream velocity equals the head level velocity, i.e., WRF=0.

The problem here is that the 10 m level, except in specific instances, does not represent the correct height upon which to determine the WRF. Therefore the current practice of assuming the free-stream velocity as being 50% greater than that at head level in all calculations of the wind chill temperature is incorrect. The following discussion will show why the WRF must be determined from the depth of the velocity boundary layer and not from the height of the NWS 10 m velocity sensor, unless the latter happens to be exactly at the boundary layer edge. Wind reduction becomes necessary when the head is immersed in either: (a) a turbulent region on the leeward side of a wind obstruction, or in (b) a turbulent boundary layer generated by the wind. The latter, which is possibly the more likely situation to occur, fortunately is the one that lends itself more easily to analysis, providing the following information is known: (1) the location of the boundary layer edge relative to the individual's head, and (2) the velocity profile within the boundary layer.

Unfortunately, this information is so dependant upon an individual's surroundings that an evaluation of the WRF may not always be possible. But this is no reason for universally applying an incorrect value of WRF to all individuals in the listening area. Determination of this boundary layer is explained in the following paragraphs.

Wind blowing along a surface experiences a retarding action by friction over a layer called the velocity boundary layer. Within this layer, the velocity increases from zero at the surface to the free-stream value (V) at the boundary layer edge ($\delta$). If an individual's head is within the boundary layer, it will experience a velocity (v) less than the free-stream value (V) and consequently a WRF>0. The thickness ($\delta$) of this boundary layer is a function of the free-stream velocity, the air's kinematic viscosity (v) and most importantly the length (l) that the wind is in contact with the surface. Another variable affecting the thickness is the surface roughness, but this is not easily determined. What is known, is that this roughness guarantees that the flow in the layer will be turbulent and that an increase in roughness will increase δ. Based on all this, it can be stated that an individual exposed to a free-stream velocity (V) will encounter a turbulent boundary layer thickness (δ) that is dependant upon the individual's surroundings, such as the surface roughness on his windward side and upon the wind/surface contact length (l).

Figure 30:
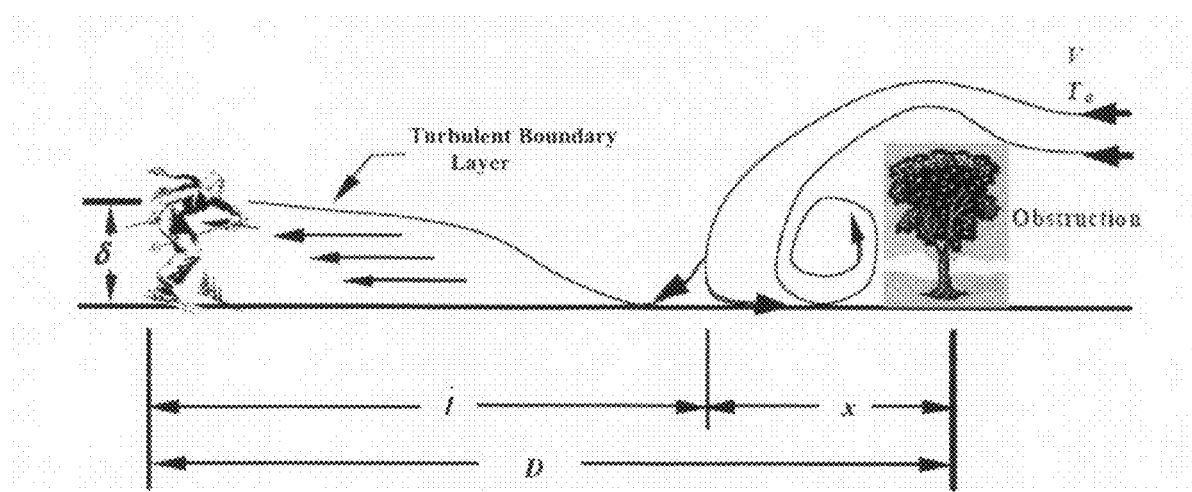
FIG. 30 is a diagram illustrating a wind-generated turbulent boundary layer according to the present invention.

FIG. 30 is a diagram illustrating a wind-generated turbulent boundary layer according to the present invention. Referring to FIG. 30, consider an obstruction such as a fence, a tree or a group of buildings located at a distance (D) from an individual facing into the oncoming wind. The wind at velocity V approaching the obstruction will separate from the surface and flow over the obstruction to produce a vortex type of separation region on its downstream or leeward side. This separated flow region will reattach to the surface at a distance (x) from the obstruction. It is the distance l=D−x which is the critical length in the determination of the boundary layer thickness (δ) at the individual's location and whether or not the individual's head is immersed in it. If it is not, then the head height, which is the distance of the head base above the surface, is greater than δ and the head is exposed to free-stream conditions so that WRF=0. This is the situation illustrated in FIG. 30. If the head is immersed, the head height is less than δ. In this case, it is δ and not the standard 10 m height of the NWS 10 m velocity sensor that must be used in the calculation of the WRF, unless of course, δ actually is 10 m. Thus, a height of 10 m represents a very special case. This illustrates the importance of knowing the value of δ for a range of velocities (V) and wind/surface contact distances (l) that might be encountered.

Schlichting, H., "Boundary Layer Theory", McGraw-Hill, p. 42, 1979, discloses that the variation in the boundary layer thickness (δ) for the turbulent flow is:

$$\frac{\delta}{l} = .37\left(\frac{Vl}{v}\right)^{-1/5} \quad (33)$$
$$= .37(Re_l)^{-1/5}$$

where the kinematic viscosity (v) of air is $150 \times 10^{-6}$ ft²/s ($13.94 \times 10^{-6}$ m²/s). With the velocity in the Reynolds number ($Re_l$) expressed in mph, Eq. (33) becomes:

$$\frac{\delta}{l} = .0589(Vl)^{-0.2} \quad (34)$$

Figure 31:
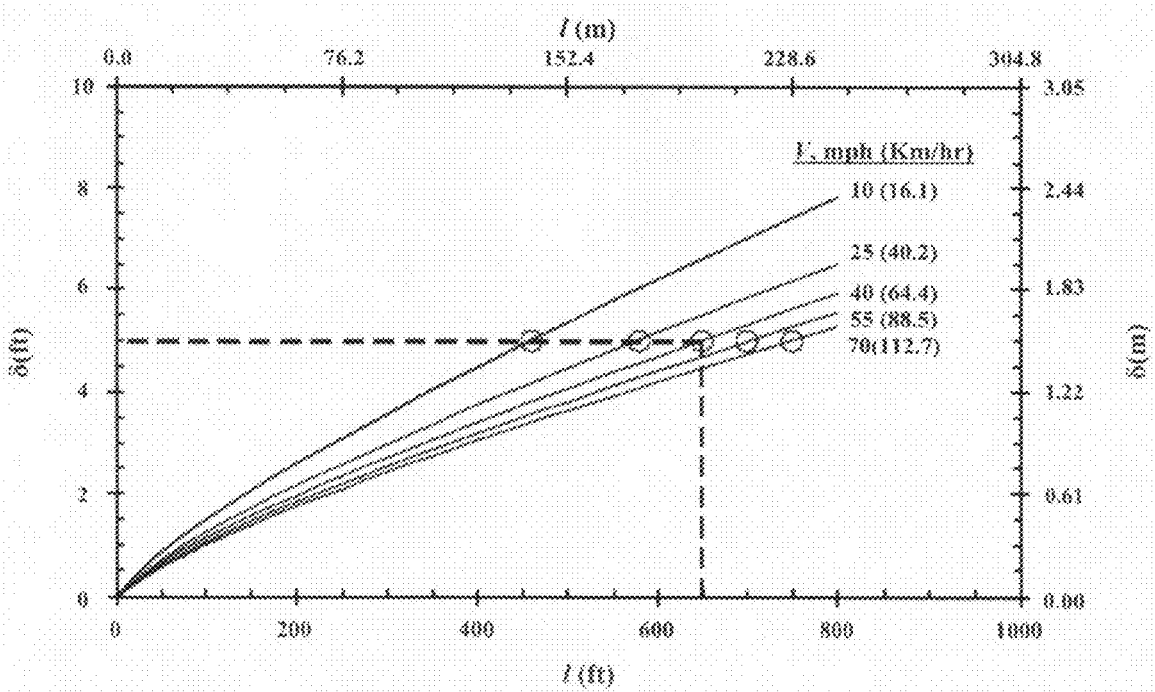
FIG. 31 is a diagram illustrating turbulent boundary layer thickness (δ) as a function of wind speed and wind/surface contact distance (l) according to the present invention.

FIG. 31 shows δ as a function of V and l as expressed by Eq. (34). Assume the base of an individual's head is at the 5 ft (1.52 m) level. Each circled intersect point represents the maximum wind/surface contact distance ($l_{max}$) at a given velocity where the base of the individual's head would be at the boundary layer edge. For example, this means that when V=40 mph (64.37 km/hr), the maximum distance ($l_{max}$) is 648 ft (197.51 m) and the head is above the boundary layer edge, and the WRF=0. For distances greater than ($l_{max}$), the individual's head is partially or completely immersed in the boundary layer, and although WRF>0, its actual value may be very small. As V increases, $l_{max}$ increases. This is more clearly demonstrated in FIG. 32, where the $l_{max}$ curve is a cross plot of the intersect points in FIG. 31. At any given velocity in FIG. 32, for values of l<$l_{max}$, there is no immersion of the head and WRF=0; for l>$l_{max}$ there is immersion, and WRF>0. It should be pointed out that Eq. (34) applies to a smooth surface such as a paved road, sidewalk, or an airport runway. For other surfaces where a roughness exists due to small objects or vegetation, values of δ would be expected to be slightly larger. This small increase would shift the curves of FIG. 31 slightly upward, thus reducing the $l_{max}$ value at a given velocity. This small increase would also shift the ($l_{max}$) curve of FIG. 32 slightly downward. Lacking the information required to correct for this slight difference, the $l_{max}$ curve of FIG. 32 is presumed to be sufficiently accurate for all surfaces.

Figure 32:
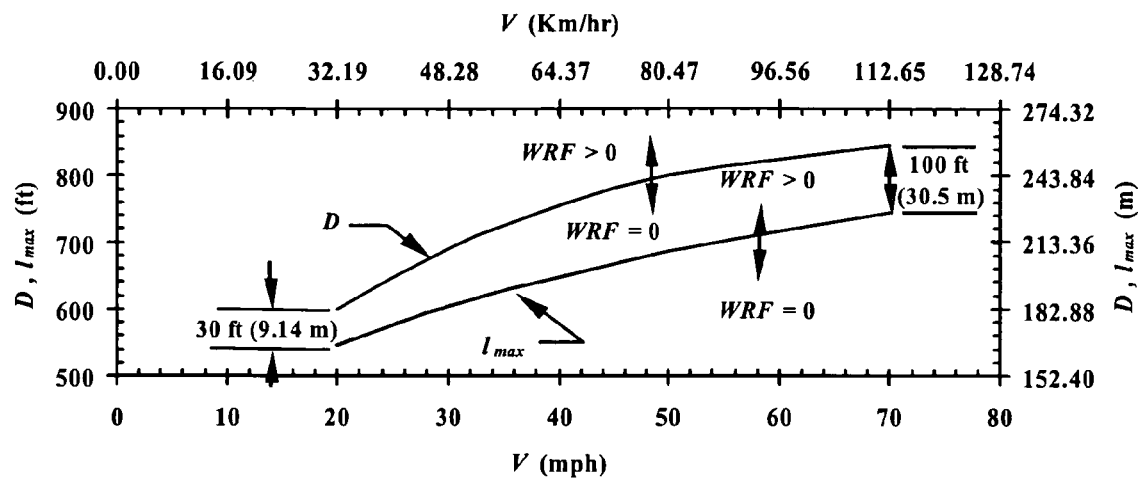
FIG. 32 is a graph illustrating maximum wind/surface contact distance ($l_{max}$) and obstruction distance (D) for a turbulent boundary layer thickness (δ) of 5 ft (1.52 m).

FIG. 32 shows $l_{max}$ as the defining distance downstream of an obstruction that determines whether or not an individual's head is immersed. Because it is advantageous to reference this defining distance to the individual's actual distance (D) from the obstruction, D is determined by adding the separated flow reattachment distance (x) to $l_{max}$ as shown in FIG. 30. The problem here is that x is not a fixed quantity, but rather increases with the height of the obstruction, and increases as V increases. At this point, the assumption was made that an obstruction such as a tree or building will produce a downstream flow separation distance (x) of 100 ft and 30 ft (30.48 m and 9.14 m) at velocities of 70 mph (112.65 Km/hr) and 20 mph (32.19 Km/hr), respectively. Linearly spreading these distances over the velocity range and adding them to the $l_{max}$ distances in FIG. 32 gives curve D, the approximate distance of the individual from the obstruction. This distance D is approximate because the two separation distances (100 ft, 30 ft) for the two velocities (70 mph, 20 mph) apply to one specific obstruction height and not for all heights as assumed here. However, the variation in distance x with obstruction height is believed to be a small fraction of $l_{max}$, so that ignoring this effect should not result in any significant error. Distance D can now be considered for all conditions as an approximate, although realistic, distance between an individual and the obstruction that determines the flow field in his presence. Curve D, now replacing curve $l_{max}$, separates the region WRF>0 above it from the WRF=0 region below. From this, one concludes that if the individual is within distance D of 600 ft (182.88 m) to 850 ft (259.08 m) from an obstruction over the 20 mph to 70 mph velocity range, he will still be exposed to free-stream conditions, that is WRF=0. It is believed that this represents a large majority of real life situations in which the currently used 50% wind reduction is incorrectly applied.

With reference to FIG. 32, if an individual at a given velocity (V) is at a distance greater than D from an obstruction, his head will be partially or completely within the boundary layer. In this case, the WRF must be determined. The WRF can then be computed from the velocity profile within the boundary layer. From Schlichting, this profile in a turbulent boundary layer is, $$\frac{v}{V} = \left(\frac{y}{\delta}\right)^{1/n} \quad (35)$$

where, in this case, v is the velocity at head level, V is the free-stream velocity at the boundary layer edge (δ), y is the head height above ground level, and where the exponent 1/n depends upon the surface roughness and the free-stream velocity. From its definition and using Eq. (35), the WRF can be determined in the following manner:

if $\delta > y$, $WRF = \dfrac{V-v}{V}$ (36a)

$$= 1 - \left(\dfrac{y}{\delta}\right)^{1/n}$$

and, if $\delta \le y$, $WRF = 0$ (36b)

Calculating an accurate value of this WRF is complicated by the exponent's dependency upon the surface condition and the magnitude of the wind speed. Consider first the surface condition. Schlichting and also, Eshbach, O. W., *Handbook of engineering fundamentals*, John Wiley & Sons, Inc., p. 1-142 and 7-119, 1952, state that for smooth surfaces of the type encountered in wind chill calculations such as a sidewalk, street, airport runway, or even a frozen lake, the exponent would be 1/7, borrowing from the "1/7 power law" for pipe flow. This value is smaller than the corresponding value (1/4.76) used by Steadman based on measurements in the Saskatoon area. Based on Steadman's values, the WRF at head height ($y$=5 ft (1.52 m)) is $$WRF = 1 - \left(\dfrac{5}{33}\right)^{1/4.76}$$ (37)

$$= 0.33$$

This WRF of 0.33 corresponds to the universal 50% reduction in the NWS 10 m wind speed used in the prior art Bluestein and Zecher wind chill model.

Figure 33:
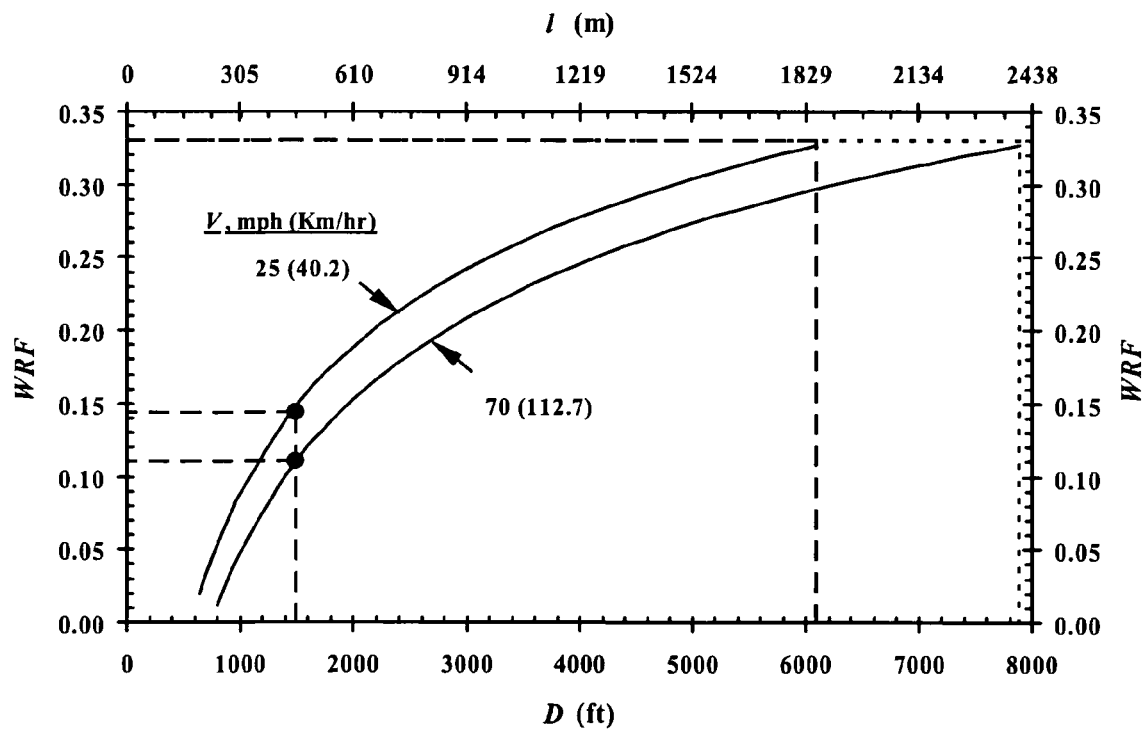
FIG. 33 is a graph illustrating wind reduction factor as a function of wind speed and distance (D) using Steadman's exponent.

If the 33 ft value for $\delta$ as used in Eq. (37) was actually at the edge of the boundary layer in the flow field during the Steadman measurements, then his larger exponent (1/4.76) could have been expected if the measurements were made over a prairie surface exhibiting a certain amount of roughness. If that was the case, then Eq. (37) does provide a correct WRF for an individual on a similar surface, but only if the individual is at a sufficient distance D from an obstruction such that the boundary layer thickness ($\delta$) at the individual's location is exactly 33 ft (10.1 m). This is the only instance in which the current WRF of 0.33 can be correctly applied. In all other cases, this correction is too severe. This can be demonstrated as follows: For velocities (V) spanning the wind chill range, select values of l and calculate (from Eq. (34). Then calculate WRF from Eq. (36a) using y=5 ft (1.52 m) and Steadman's exponent. The results are plotted in FIG. 33 where the wind/surface contact distance (l) has been replaced by distance D from an obstruction. They show that at V=25 mph (40.23 Km/hr) the individual must be at a distance D>6,095 ft (1,857.78 m) from an obstruction if the WRF is to be 0.33. For V=70 mph, the corresponding distance would be 7,884 ft (2,403.07 m). These very large distances could exist in sparsely populated rural areas, but are not too likely in urban areas. The message gathered from FIG. 33 is that for the lower distances associated with urban areas, the WRF is much less than 0.33. It has already been shown that individuals within distance of 600 ft (182.88 m) to 850 ft (259.08 m) of an obstruction will not experience a wind reduction; for them, WRF=0. All other individuals in the listening area at greater distances will experience some reduction, though it will be small. It would seem reasonable to assume that more than 95% of the listening public may be within a 1,500 ft (457.21 m) distance (approximately 1/4 mile) from an obstruction.

From FIG. 33, individuals at D=1,500 ft (457.21 m) will experience wind reduction factors varying from 0.11 at V=70 mph to 0.144 at V=25 mph. The average values of WRF for the above 95% of the listening public between 600 ft (182.88 m) and 1,500 ft (457.21 m) would be 0.055 at V=70 mph and 0.072 at V=25 mph. These values are so much lower than the currently used value of 0.33 that there is an obvious need to use these lower and more exact values. Continuing to use the current value (0.33) only continues to mislead the listening public, because the reported wind chill temperature will be much warmer than its actual value. To the individual, this implies a lesser concern for facial freezing, when in reality a greater danger exists. Because of the near impossibility of determining a realistic average value of WRF for all individuals at all locations in the listening area, it might be better to disregard any wind reduction. Neglecting it could be viewed as a safety feature for the listening public, since it would effectively predict facial freezing before it actually occurs. Thus, assuming WRF=0 for all conditions would be a simple and reasonable solution.

The above discussion and the results shown in FIG. 33 were based on the assumption that the 33 ft (10.1 m) height in Steadman's equation was actually at the boundary layer edge. It is not known at what wind speed (V) the measurements were made in the development of his velocity profile. Suppose V was 25 mph. From FIG. 33, this means that distance (D) upstream of the instrumentation would have to have been about 6,095 ft. It is important to note that the distance was about 6,095 ft, because of the uncertainty as to how well Eq. (33) represents the surface conditions where the measurements were made, since this equation applies strictly to a smooth surface. What it does mean is that if V was 25 mph and the open air distance upstream of the instrumentation was known to be approximately this distance, then the boundary layer edge was probably very close to the 33 ft height. This same reasoning would, of course, apply if the measurements had been conducted at a velocity other than V=25 mph (40.23 Km/hr) and a correspondingly different distance.

One way of determining whether or not the 33 ft height represents the boundary layer edge ($\delta$) would be the measurement of the height above ground level where the velocity ceases to increase with height; this height would then be the edge. This approach may have been taken during the Saskatoon measurements to insure that the 33 ft height in Eq. (37) represents the true boundary layer edge. If it does not, then Steadman's velocity profile expression is incorrect and its usage would result in an incorrect value for the WRF. This may no longer be of much importance if the use of a WRF is discontinued, as is suggested in the present model.

Figure 34:
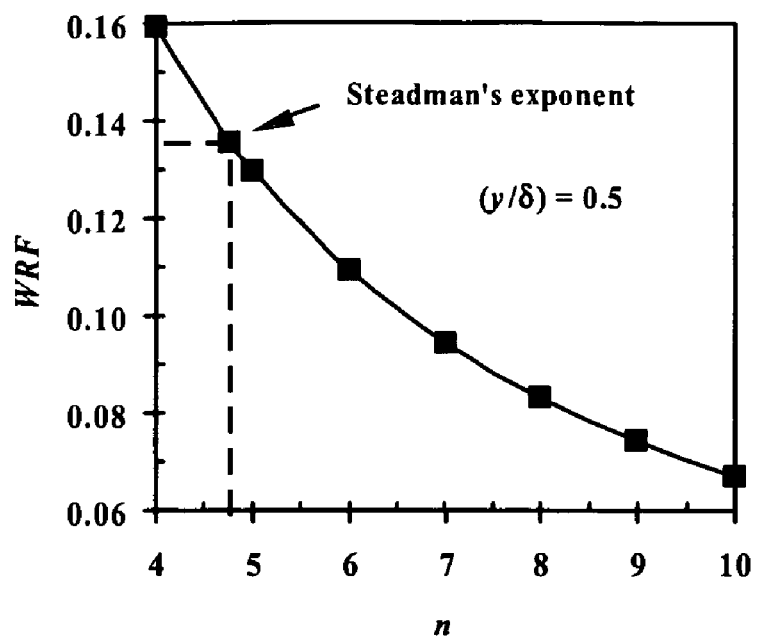
FIG. 34 is a graph of wind reduction factor as a function of the exponent denominator when $(y/\delta)=0.5$.

There may be certain situations where there is a need to determine a WRF. If Steadman's exponent was incorrectly determined, an alternative would be to use the 1/7 exponent. Although this exponent supposedly applies to smooth surfaces such as an airport runway, a blacktop road, a hard packed sand beach or a snow-free frozen lake surface, it should provide a good approximation of the WRF even for surfaces with minor roughness. However, even the 1/7 exponent has its limitation. Eshbach notes that it is applicable only up to a Reynolds number ($Re_l$) of $3\times10^7$, above which the exponent will progressively decrease to 1/8, 1/9 etc., as the Reynolds number increases. Based on the definition of the Reynolds number in Eq. (33), this means that the 1/7 exponent is valid up to a wind/surface contact length (l) of 153 ft (46.63 m) at a velocity (V) of 20 mph and only 44 ft (13.41 m) at a velocity of 70 mph. These are very short distances and one would expect numerous cases where the wind/surface contact length far exceeds these values. If so, the Reynolds number would be much greater than $3\times10^7$ and the exponent less than $1/7$. The exact value of the exponent is unknown. What is known is that the WRF decreases as the exponent decreases. Suppose the boundary layer edge ($\delta$) is 5 ft above an individual's head at y=5 ft. Then (y/$\delta$)=0.5. With this value in Eq. (36a), the WRF is calculated and shown in FIG. 34 as a function of the exponent's denominator (n). The results show that for a smooth surface when n is 7 or higher, the WRF is much less than the 0.136 value obtained using Steadman's exponent. In fact if n=10, the WRF is one-half of this value. What was considered a good reason for neglecting wind reduction before, based on the FIG. 33 results using Steadman's exponent, is an even better reason now, when considering the likelihood that the exponent denominator (n) will be greater than 7 for the larger Reynolds numbers that will be encountered. One concludes from all this that, irrespective of the type of surface, any wind speed reduction, if it exists, is negligible. Consequently, unless there is a specific reason to consider wind reduction, it should be neglected by assuming WRF=0. As already stated, any error due to this neglect is on the side of safety, as far as the listening public is concerned.

Another aspect pertaining to the computation of a WRF is the location of the NWS 10 m sensor. It is presumed to measure the true free-stream velocity. To do so, it must be located at or above the boundary layer edge that exists at its airport location for all wind conditions. Sims, C., Personal communication, *National Weather Service*, Duluth, Minn., 2001, provided the following specific information on the NWS 10 m sensor which is part of the ASOS/AWOS (Automated Surface Observing System/Automated Weather Observing System) site: "It will be mounted 30 to 33 feet (9.14 to 10.1 m) above the average ground height within a radius of 500 ft (152.4 m)". In addition, Sims states: "The sensor height shall not exceed 33 ft except as necessary to: (a) be at least 15 ft (4.57 m) above the height of any obstruction (e.g., vegetation, buildings, etc.) within a 500 ft (152.4 m) radius, and (b) if practical be at least 10 ft (3.1 m) higher than the height of any obstruction outside the 500 ft radius, but within a 1000 ft (304.8 m) radius of the wind sensor. An object is considered to be an obstruction if the included lateral angle from the sensor to the ends of the object is 10 degrees or more."

First, consider the case where there is no obstruction within 500 ft of the sensor. To determine if the sensor is located above the boundary layer edge at the sensor location, the layer's thickness ($\delta$) was calculated from Eq. (34) using a wind/surface contact length (l) equal to the 500 ft radius. With a wind velocity V=20 mph and 70 mph directed towards the sensor, the corresponding boundary layer thickness would be $\delta$=4.7 ft (1.43 m) and 3.6 ft (1.1 m), respectively. With the sensor at 30 to 33 ft above the ground height, it would be well within the free-stream region. Second, in the situation where there is an obstruction within the 500 ft radius, the concern no longer centers on the wind/surface boundary layer thickness, but rather on the size of the turbulent flow region downstream of the obstruction. The NWS 10 m sensor must be above this region to experience free-stream conditions. Because the vertical dimension of the turbulent region diminishes as the distance downstream of the obstruction increases, the most critical situation is when the obstruction is relatively close to the NWS 10 m sensor. Furthermore, if the wind approaching the obstruction is at some positive angle relative to the ground surface, the height of the turbulent region may be significantly greater than the obstruction itself. Suppose the height of an obstruction close to the NWS 10 m sensor is 25 ft (7.62 m). Conceivably, the height of the turbulent region might be 10 ft (3.1 m) greater at 35 ft (10.67 m), such that a sensor at the 33 ft level would be immersed in the turbulence. The specification that the sensor be "at least 15 ft (4.57 m) above the height of any obstruction" would, in this case, avoid that possibility. Similar reasoning could be made for the case of an obstruction outside the 500 ft radius but inside the 1000 ft radius. It appears that the above guidelines were developed so as to insure that the NWS 10 m sensor would be exposed to free-stream conditions at all times even for relatively larger obstructions.

The ASOS/AWOS specifications on the NWS 10 m sensor guarantee that the free-stream velocity will be measured at the sensor location for all velocities providing the wind/surface contact distance (l) is 1000 ft or less. But this wind/surface contact distance may be much greater than the 1000 ft in cases where the sensor is located alongside an airport's runway. An example is the 6,500 ft (1,981.22 m) runway at the Itasca County Airport in Grand Rapids, Minn. where the sensor is located at a distance of 35 ft (10.67 m) from the side of the runway and about 5,000 ft (1,524 m) from one end of the runway. The runway would constitute a smooth surface such that Eq. (34) would correctly apply. If a 20 mph wind in the direction of the runway approaches the sensor from the 5,000 ft end of the runway, the boundary layer thickness at the sensor location is $\delta$=29.5 ft (8.99 m). When V=70 mph, $\delta$=22.9 ft (6.98 m). This means that over an expected 20 mph to 70 mph velocity range, the sensor would always be exposed to free-stream conditions. However, this would no longer be true if V$\leq$11.3 mph (18.19 Km/hr) because when V=11.3 mph, $\delta$ is exactly equal to 33 ft. For example, when V=8 mph (12.87 Km/hr), $\delta$=35.4 ft (10.79 m) and the sensor would lie 2.4 ft (0.73 m) below the boundary layer edge. From Eq. (35), the velocity (v) being recorded by this submerged sensor when V=8 mph, y=33 ft, $\delta$=35.4 ft, and assuming n=9, would be 7.94 mph (12.78 Km/hr). This is within 1% of the actual free-stream value and would not result in any error of consequence in wind chill predictions. Because this particular sensor is probably representative of all sensors nationwide, the conclusion is made that all sensors, at all times, record a velocity that is very close to or exactly the free-stream velocity.

The discussion so far has dealt with wind reduction in instances where the head is immersed in a wind-generated turbulent boundary layer. These cases represent situations that are relatively simple to analyze. In the other cases, where the individual is within the turbulent region downstream of an obstruction, the WRF is more difficult to determine. Only when the individual is very close to the obstruction and totally within the flow separation region (x) as shown in FIG. 30 can it be safely said that he is completely shielded from the wind, in which case WRF=1. This is the only value of WRF that is clearly defined when considering obstructions. As the individual in the separation region moves away from the obstruction towards the wind reattachment point (x), the WRF will decrease becoming WRF=0 before reaching x. Because the WRF varies from 0 to 1.0 over the separation region, there is likely to be at least one location within this region where WRF=0.33. This is the only other instance where the current use of WRF=0.33 would correctly apply.

Individuals in an urban area may be subjected to a combined effect of a boundary layer and a separated region. An individual located at some distance downstream from an obstruction on a clear street with buildings on either side may experience a boundary layer. If the wind/surface distance (l) along the street is 1,500 ft (457.21 m) or less, which is comparable to about two standard city blocks, then from FIG. 33, WRF<0.15. As stated previously, in situations like this, it would make sense to assume WRF=0, and in so doing provide a measure of safety in the wind chill prediction. Now if vehicle signs, lamp posts, and other obstructions exist along the street, the individual may not experience an uninterrupted boundary layer, but rather an exposure to multiple turbulent regions. Determining a WRF here would be nearly impossible. Unless the individual manages to become completely sheltered, in which case the WRF=1, the actual wind reduction would be quite small if these turbulent regions are, relatively speaking, far from the individual. Again, assuming WRF=0 would be the preferred choice.

There are two situations where a wind reduction at head level is the result of a modification of the NWS 10 m velocity value and not the result of the individual being exposed to a wind-generated boundary layer. The first is an increase in the NWS 10 m free-stream value that could occur in a large urban area as a result of what Schwerdt referred to as "air funneling around tall buildings." This increase could be computed knowing the size, number, and layout of the buildings. The second refers to a case where the NWS 10 m value of the velocity would be decreased. Picture the previous illustration of the wind blowing down the 1,500 ft length of street and then being deflected 900 around a building and continuing to flow down a cross street. The deflected wind, including its boundary layer, would generate a turbulent region on the cross street side of the building, with a subsequent reattachment to the surface at a distance (x) downstream of the turning point. Energy losses incurred by the flow as a result of this turning would be reflected as a reduced value in the free-stream velocity after the turn, as compared with its NWS 10 m value. As before, at distances of $1 < l_{max}$ downstream of the reattachment point (x), WRF=0 from FIG. 32. Therefore, in these cases there would be no wind reduction due to boundary layer immersion. However, there would be a reduction due to a decrease in the velocity of the reattached flow. This decrease depends upon the magnitude of the velocity (V) before the turn and the radius of the turning flow around the obstruction. In this instance, the decrease in velocity due to turning should be accounted for, but its actual determination might be difficult. Couple this situation with the possibility of the turned flow being accelerated by the above-mentioned funneling, and there is a possibility that the velocity of the turned flow may come back to its original NWS 10 m value, or even exceed it. In that case, the actual value of the velocity at head level may not be too different from the NWS 10 m value. In this situation, where the conventional WRF=0 as far as the wind/surface boundary layer is concerned, there might be a wind reduction or even a wind increase at head level due to changes in the magnitude of the NWS 10 m value. Unless absolutely necessary in a specific evaluation of wind chill within the confines of a city, it is suggested that the actual value of the NWS 10 m value be used at all times.

Finally, there are cases where an individual is exposed to an equivalent wind speed due to his motion even when calm wind (V=0 mph) conditions prevail. These cases include motorcycle riders, snowmobile riders, and downhill skiers. Facial freezing could occur at low ambient temperatures and high speeds of motion in the absence of facial protection such as a helmet. In each case, there is no boundary layer and consequently no wind reduction, therefore, WRF=0 at all times.

Based on the above discussions, the following statements and comments can be made concerning the concept of wind reduction: The WRF=0.33 corresponding to the currently assumed 50% reduction in the NWS 10 m wind speed value is correct only if (a) the wind-generated boundary layer thickness during the Saskatoon velocity profile measurements was $\delta$=33 ft (10.1 m) and if (b) the same boundary layer thickness exists at the location of the individual being considered. This is a singular and highly unlikely situation. It emphasizes the fact that the usage of WRF=0.33 for all calculations of the wind chill temperature, without regard for the individual's position relative to the wind, is inaccurate. A WRF=0.33 will correctly and uniquely apply to an individual at some point within the separation region on the leeward side of an obstruction. This is the only instance, in realistic situations, in which the current wind chill model would come close to predicting the correct wind chill temperature ($T_{wc}$). A WRF=1.0 represents the special case where the individual in the above separation region is adjacent to the obstruction such that the latter completely blocks him from the oncoming flow.

Calculations of boundary layer values of the WRF as a function of the velocity (V) and an individual's distance (D) from an obstruction assuming Steadman's value of the velocity profile exponent (1/4.76), shows that for: (a) V=20 mph: (1) WRF=0, for D<600 ft and (2) WRF–0.055 (average) for 600 ft<D<1,500 ft. For (b) V=70 mph: (1) WRF=0, for D<850 ft and (2) WRF=0.072 (average) for 850 ft<D<1,500 ft.

The distance range, 600 ft<D<850 ft, may reflect situations in an urban area, while the range 600 ft<D<1,500 ft might be considered as those in a more rural area. Since it is anticipated that these two areas encompass more than 95% of the populace, and since the WRF values are very small or non-existent, it emphasizes the importance and need to remove the equivalent correction (WRF=0.33) used in the current wind chill model.

The above calculations of WRF were based on Steadman's velocity profile exponent (1/4.76). If the usage of this exponent is found to be incorrect, then a more appropriate one of lower value (1/8, 1/9, 1/10, etc.), which is consistent with higher velocities and Reynolds numbers, should be used. Decreasing the value of this exponent decreases the values of WRF even further; this emphasizes the advisability of assuming WRF=0 when catering to the public at large.

It is suggested that the actual NWS 10 m velocity value be used at all times, although the local value of the free-stream velocity in an urban environment may be somewhat larger or smaller. And finally, the WRF=0 for all motion-driven sport activists such as cyclists and skiers under calm conditions (V=0 mph), because of the absence of a wind-generated boundary layer.

The above results show that, except for a few special cases, the WRF=0 or is only slightly greater than zero for almost everybody in the listening area. Where WRF takes on small positive values of D between 600 ft and 1,500 ft from an obstruction, the recommendation is made that WRF=0 in this region also. Doing so could, in cases where facial freezing is a possibility, provide the listener with a degree of safety by informing him of a time to freeze before it actually occurs. For values of D greater than 1,500 ft, WRF may become quite large as shown in FIG. 33. In these cases, WRF should be considered in the calculation of the wind chill temperature ($T_{wc}$).

The inventors suggest the following recommendations be considered for implementation of the wind chill model of the present invention to provide the listening public with a more accurate wind chill temperature ($T_{wc}$) at the moment of exposure, facial temperature ($T_f$) at any time during the exposure and the time to freeze ($t_f$): (1) Determine the latitude (LAT) for the entire listening area from Table 2; (2) Determine the average altitude (H) of the listening area; (3) Determine from Table 1 the most likely physical activity ($M_{act}$) of the inhabitants within the listening area. For large urban or rural areas, the most likely activity would probably be "walking about" so that $M_{act}$=31 Btu/hr-ft$^2$ (97.79 W/m$^2$); (4) With the likelihood that 95% of the people in the listening area will experience a wind reduction factor (WRF) equal to or less than 0.072, assume WRF=0. This is not only convenient, but also beneficial to the listeners, since it affords them added safety by informing them of a time to freeze ($t_f$) before it actually occurs. For other situations where individuals are at a known distance from an obstruction, the WRF could be determined and used in the calculations; (5) Unless sunshine is a certainty over the entire listening area and for the entire prediction period, assume G=0 Btu/hr-ft² (0 W/m²). This too provides the listener with a degree of safety by again informing him of a time to freeze ($t_f$) before it actually occurs. If sunshine is expected to be present over the entire prediction period, G is determined from Table 2; and (6) The meteorologist needs to clarify to the public the real meaning of wind chill. Years of mystifying statements on the subject, such as the erroneous statement that the reason we experience wind chill is due solely to evaporation from the skin surface, has left the public confused. This confusion still reigns as evidenced by a recent (2005) statement by a well-known network TV news commentator that wind chill is a "phony number", Andy Rooney of CBS 60 min., January 2005. The public needs to be informed that wind chill is not just seasonal, but rather a year-round phenomenon.

Figure 35:
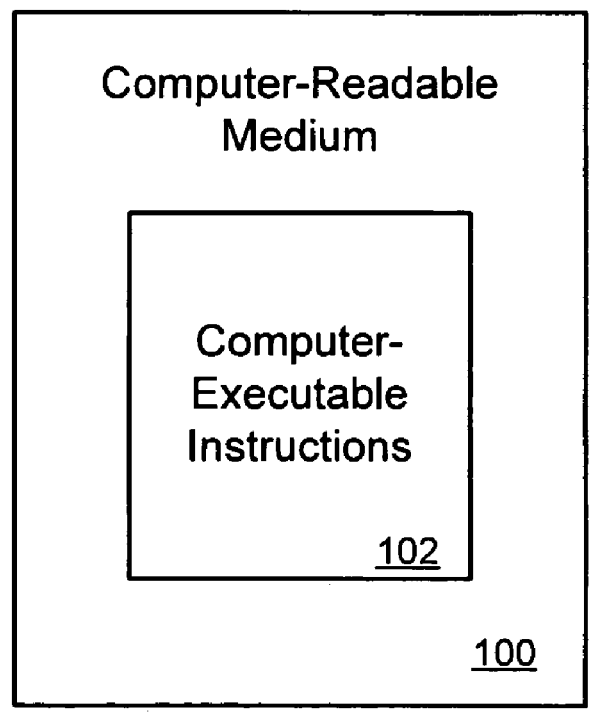
FIG. 35 is a block diagram of an embodiment of a computer-readable medium suitable for storing computer-executable instructions for calculating wind chill temperature, $T_{wc}$, equivalent temperature, $T_{eq}$, and time to freeze, $t_f$, and any other related calculations according to the present invention.

The methods and procedures for calculating wind chill temperature, $T_{wc}$, equivalent temperature, $T_{eq}$, time to freeze, $t_f$, facial temperature, $T_f^{m+\Delta t}$, as a function of time, altitude correction factor, $\Delta t_f/1000$, and any other related calculations as disclosed herein, may be practiced as a computer program, i.e., computer-executable instructions, suitable for processing by a processor based on selected input variables. Such computer-executable instructions may, of course be stored on any suitable computer-readable medium. FIG. 35 is a block diagram of an embodiment of a computer readable medium 100 suitable for storing computer-executable instructions 102 for calculating wind chill temperature, $T_{wc}$, equivalent temperature, $T_{eq}$, and time to freeze, $t_f$, and any other related calculations according to the present invention.

Figure 36:
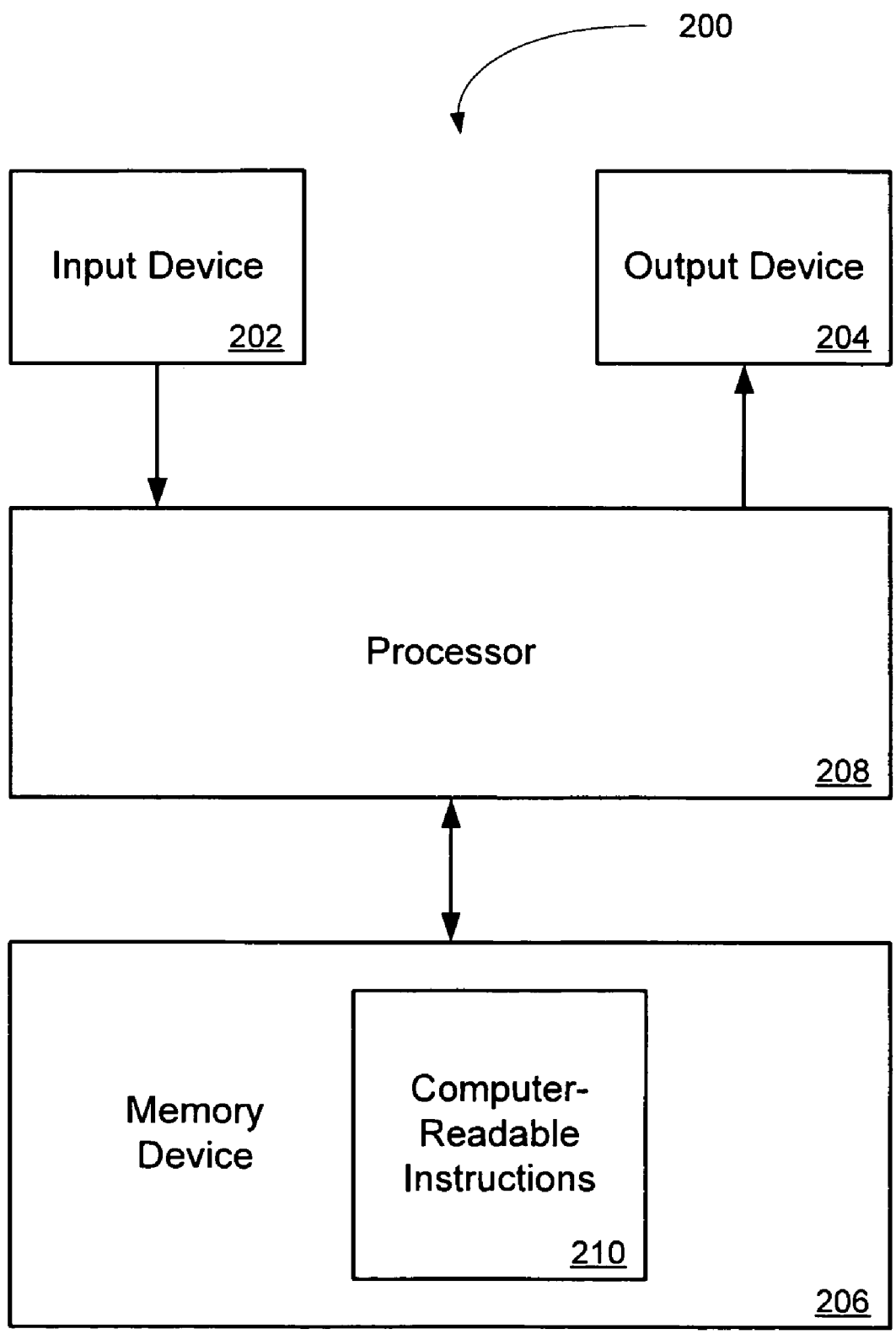
FIG. 36 is a system for determining wind chill temperature, $T_{wc}$, equivalent temperature, $T_{eq}$, and time to freeze, $t_f$, and any other related calculations according to the present invention.

FIG. 36 is a system 200 for determining wind chill temperature, $T_{wc}$, equivalent temperature, $T_{eq}$, time to freeze, $t_f$, facial temperature, $T_f^{m+\Delta t}$, as a function of time, altitude correction factor, $\Delta t_f/1000$, and any other related calculations disclosed herein according to the present invention. System 200 may include an input device 202, an output device 204, a memory device 206, and a processor 208 in communication with the input device 202, the output device 204, and the memory device 206. The processor 208 may be configured to execute computer-readable instructions 210 stored on the memory device 206. The memory device 206 may further include computer-readable instructions 210 for implementing any of the methods disclosed herein. According to one embodiment of system 200, the memory device 206 may include computer-readable instructions 210 for implementing a method for determining the wind chill temperature, $T_{wc}$, according to the methods of the present invention. According to another embodiment of system 200, the memory device 206 may include computer-readable instructions 210 for implementing a method for determining an equivalent temperature, $T_{eq}$, of a two-dimensional object, according to the methods of the present invention. According to still another embodiment of system 200, the memory device 206 may include computer-readable instructions 210 for implementing a method for determining time to freeze, $t_f$, according to the methods of the present invention. Of course, one of skill in the art will recognize that system 200 may be used to calculate selected or all of the wind chill related parameters disclosed herein.

While the foregoing advantages of the present invention are manifested in the detailed description and illustrated embodiments of the invention, a variety of changes can be made to the configuration, design, and construction of the invention to achieve those advantages. Hence, reference herein to specific details of the structure and function of the present invention is by way of example only and not by way of limitation.

What is claimed is:

1. A method for determining an equivalent temperature, $T_{eq}$, of a two-dimensional object, comprising calculating, $$T_{eq} = T_s - \left\{ \frac{L^\phi}{C_1} \left[ \begin{array}{l} \frac{0.00963(PV)^{0.5}}{[0.5(T_s+T_a)]^{0.04} L^{0.5}} (T_s - T_a) + \\ \sigma\varepsilon(T_s^4 - T_a^4) + \dot{w}l_e - \alpha G - \frac{k}{s}(T_b - T_s) \end{array} \right] \right\}^{1/(1+\phi)}$$

wherein $T_s$ comprises surface temperature, L comprises length of the object, $\phi$ comprises a function of heat source, $C_1$ comprises a function of the surface temperature and the ambient temperature, P comprises ambient pressure, V comprises free-stream wind velocity, $T_a$ comprises ambient temperature, $\sigma$ comprises Stefan-Boltzmann constant, $\varepsilon$ comprises emissivity of the object, $\dot{w}$ comprises water evaporation flux rate, $l_e$ comprises latent heat of evaporation, $\alpha$ comprises thermal absorptivity, G comprises insolation value, k comprises thermal conductivity, s comprises thickness of the object and $T_b$ comprises object internal temperature.

2. The method according to claim 1, wherein the equivalent temperature, $T_{eq}$, further comprises:

$$T_{eq}(V=0) = T_s - \left\{ \frac{L^\phi}{C_1} \left[ \begin{array}{l} \varepsilon\sigma(T_s^4 - T_a^4) + \\ \frac{k}{s}(T_b - T_s) + \alpha G - \dot{w}l_e \end{array} \right] \right\}^{1/(1+\phi)}$$

when the wind velocity, V, is approximately zero.

3. A computer-readable medium storing computer-executable instructions for performing the method according to claim 1.

4. A method for determining facial temperature, $T_f^{m+\Delta t}$, as a function of time, comprising calculating, $$T_f^{m+\Delta t} = T_f^m + \left( \frac{2}{\rho C_p s} \right)$$

$$(\Delta t) \left[ \begin{array}{l} K(T_{CR} - T_f^m) + \alpha G - \\ \frac{(1.8062)\{(1-WRF)V[1-(6.92\times 10^{-6})H]^{5.21}\}^{0.5}}{[0.5(T_f+T_a)]^{0.04} D^{0.5}} (T_f - T_a) - \\ \sigma\varepsilon(T_f + T_a)(T_f^2 + T_a^2)(T_f - T_a) - \dot{w}l_e \end{array} \right]$$

wherein $T_f^m$ comprises initial facial temperature, $\rho$ comprises skin density, $C_p$ comprises skin's specific heat at constant pressure, s comprises total skin thickness, $\Delta t$ comprises time increment, K comprises thermal conductance, $T_{CR}$ comprises core temperature, $\alpha$ comprises thermal absorptivity, G comprises insolation value, WRF comprises wind reduction factor, V comprises wind velocity at NWS 10 m level, H comprises location altitude, $T_f$ comprises facial temperature, $T_a$ comprises ambient temperature, D comprises head diameter, $\sigma$ comprises Stefan-Boltzmann constant, $\epsilon$ comprises skin's emissivity, $\dot{w}$ comprises water evaporation flux rate and $l_e$ comprises latent heat of evaporation.

5. A computer-readable medium storing computer-executable instructions for performing the method according to claim 4.

6. A method for determining time to freeze, $t_f$, comprising calculating $$t_f = \frac{\{a + b\ln(V) + c[\ln(V)]^2 + d[\ln(V)]^3 + eT_a\}}{\{1 + f\ln(V) + g[\ln(V)]^2 + hT_a + i(T_a)^2\}}$$

wherein V comprises wind velocity at NWS 10 m level, $T_a$ comprises ambient temperature, a comprises approximately 12.2, b comprises approximately −4.73, c comprises approximately 0.714, d comprises approximately −0.0404, e comprises approximately 0.00203, f comprises approximately −0.0428, g comprises approximately 0.00480, h comprises approximately −0.0162 and i comprises approximately −2.37×10$^{-5}$.

7. The method for determining time to freeze, $t_f$, according to claim 6, further comprising calculating an altitude correction factor, $\Delta t_f/1000$, $$\frac{\Delta t_f}{1000} = a + b\ln(V) + cT_a + d[\ln(V)]^2 + eT_a^2 +$$
$$fT_a\ln(V) + g[\ln(V)]^3 + hT_a^3 + iT_a^2\ln(V) + jT_a[\ln(V)]^2$$

wherein a comprises approximately 0.170, b comprises approximately −0.0377, c comprises approximately 0.00118, d comprises approximately 0.00225, e comprises approximately 6.16×10$^{-6}$, f comprises approximately −9.66×10$^{-5}$, g comprises approximately 3.34×10$^{-6}$, h comprises approximately 1.79×10$^{-8}$, i comprises approximately 1.21×10$^{-9}$, j comprises approximately −1.41×10$^{-7}$; and adding $\Delta t_f/1000$ to $t_f$ for each 1000 feet above sea level.

8. A computer-readable medium storing computer-executable instructions for performing the method according to claim 7.

9. A computer-readable medium storing computer-executable instructions for performing a method for determining wind chill temperature, $T_{wc}$, the method comprising: calculating $$T_{wc} = T_f - \left\{\frac{L^\phi}{C_1}\left[\frac{(1.8062)\{(1-WRF)V[1-(6.92\times10^{-6})H]^{5.21}\}^{0.5}}{[0.5(T_f+T_a)]^{0.04}D^{0.5} +} (T_f - T_a)\right.\right.$$
$$\left.\left.\sigma\varepsilon(T_f+T_a)(T_f^2+T_a^2)(T_f-T_a) + \dot{w}l_e - \alpha G - K(T_{CR}-T_f)\right]\right\}^{1/(1+\phi)}$$

wherein $T_f$ comprises facial temperature, L comprises human face length, $\phi$ comprises a function of heat source, $C_1$ comprises a function of the facial temperature and the ambient temperature, WRF comprises wind reduction factor, V comprises wind velocity at NWS 10 m level, H comprises location altitude, $T_a$ comprises ambient temperature, D comprises head diameter, $\sigma$ comprises Stefan-Boltzmann constant, $\epsilon$ comprises skin emissivity, $\dot{w}$ comprises water evaporation flux rate, $l_e$ comprises latent heat of evaporation, $\alpha$ comprises thermal absorptivity, G comprises insolation value, K comprises thermal conductance and $T_{CR}$ comprises core temperature.

\* \* \* \* \*